United States Patent [19]
Horie

[11] Patent Number: 5,739,992
[45] Date of Patent: Apr. 14, 1998

[54] MULTIPLE DISC CARTRIDGE DISC MAGAZINE

[75] Inventor: Fumio Horie, Tokyo, Japan

[73] Assignee: Sony Corporation, Tokyo, Japan

[21] Appl. No.: 628,197

[22] Filed: Apr. 5, 1996

Related U.S. Application Data

[62] Division of Ser. No. 379,220, Jan. 27, 1995, Pat. No. 5,640,288.

[30] Foreign Application Priority Data

Jan. 31, 1994 [JP] Japan .................... 6-025900

[51] Int. Cl.⁶ .................... G11B 23/03; G11B 17/08
[52] U.S. Cl. .................... 360/133; 360/98.04; 360/98.06; 360/99.07
[58] Field of Search .................... 360/98.06, 98.05, 360/98.04, 92, 133, 99.07

[56] References Cited

U.S. PATENT DOCUMENTS

| | | | |
|---|---|---|---|
| 4,271,489 | 6/1981 | Siryj et al. | 369/38 |
| 4,599,716 | 7/1986 | Shimbo | 369/36 |
| 4,614,474 | 9/1986 | Sudo | 414/281 |
| 4,633,452 | 12/1986 | Shimbo et al. | 369/39 |
| 4,701,900 | 10/1987 | Hasegawa et al. | 369/36 |
| 4,730,291 | 3/1988 | Ikedo et al. | 369/36 |
| 4,734,814 | 3/1988 | Fujino et al. | 360/133 |
| 4,742,504 | 5/1988 | Takasuka et al. | 369/36 |
| 4,749,081 | 6/1988 | Carlson et al. | 206/309 |
| 4,755,978 | 7/1988 | Takizawa et al. | 369/37 |
| 4,773,058 | 9/1988 | Petruchik et al. | 369/77.2 |
| 4,800,554 | 1/1989 | Yamasaki et al. | 369/291 |
| 4,817,079 | 3/1989 | Covington | 369/291 |
| 4,853,916 | 8/1989 | Tomita | 369/36 |
| 4,864,551 | 9/1989 | Tomita et al. | 369/36 |
| 4,878,137 | 10/1989 | Yamashita et al. | 360/98.05 |
| 4,879,615 | 11/1989 | Teranishi et al. | 369/34 |
| 4,901,172 | 2/1990 | Nakazawa et al. | 360/98.04 |
| 4,903,252 | 2/1990 | Tanaka et al. | 369/36 |
| 4,910,619 | 3/1990 | Suzuki et al. | 360/92 |
| 4,912,575 | 3/1990 | Shiosaki | 360/98.04 X |
| 4,937,690 | 6/1990 | Yamasha et al. | 360/92 |
| 4,969,138 | 11/1990 | Ikedo et al. | 369/36 |
| 4,972,277 | 11/1990 | Sills et al. | 360/92 |
| 4,980,883 | 12/1990 | Mutou et al. | 369/291 |
| 4,984,108 | 1/1991 | Grant et al. | 360/92 |
| 4,984,228 | 1/1991 | Agostini | 369/37 |
| 4,998,232 | 3/1991 | Methlie et al. | 369/36 |
| 5,001,582 | 3/1991 | Numasaki | 360/98.06 |
| 5,010,536 | 4/1991 | Wanger et al. | 369/36 |
| 5,025,436 | 6/1991 | Crain et al. | 369/77.2 |
| 5,040,159 | 8/1991 | Oliver et al. | 369/34 |
| 5,043,962 | 8/1991 | Wanger et al. | 369/36 |
| 5,045,958 | 9/1991 | Leonard et al. | 360/92 |
| 5,056,073 | 10/1991 | Fitzgerald et al. | 369/36 |
| 5,059,772 | 10/1991 | Younglove | 235/383 |
| 5,062,093 | 10/1991 | Christie et al. | 369/36 |
| 5,084,859 | 1/1992 | Ishibashi et al. | 369/34 |
| 5,101,387 | 3/1992 | Wanger et al. | 369/36 |

(List continued on next page.)

FOREIGN PATENT DOCUMENTS

| | | | |
|---|---|---|---|
| 5-12821 | 1/1993 | Japan | 360/92 |

*Primary Examiner*—John H. Wolff
*Attorney, Agent, or Firm*—Limbach & Limbach L.L.P.

[57] ABSTRACT

A recording/reproducing apparatus includes a plurality of toroidally arranged housing sections housing a plurality of disc cartridges in a stacked condition. Each housing section has apertures on its opposite lateral sides for taking out or housing the disc cartridges in the fore-and-aft direction parallel to the stacking direction of the disc cartridges. A lift mechanism supports and lifts the recording/reproducing units in the stacking direction of each of the recording/reproducing units. A transfer mechanism lifted by the lift mechanism along with the recording/reproducing units is adapted for taking out or housing the disc cartridges housed within the housing sections via one of the apertures of one of the housing sections facing each recording/reproducing unit.

5 Claims, 43 Drawing Sheets

U.S. PATENT DOCUMENTS

| | | | |
|---|---|---|---|
| 5,119,354 | 6/1992 | Umesaki | 369/36 |
| 5,123,001 | 6/1992 | Nakamichi et al. | 369/36 |
| 5,128,912 | 7/1992 | Hug et al. | 369/38 |
| 5,161,138 | 11/1992 | Caspers | 369/36 |
| 5,164,934 | 11/1992 | Kase et al. | 369/77.1 |
| 5,177,722 | 1/1993 | Nakamichi et al. | 369/36 |
| 5,195,078 | 3/1993 | Ikedo et al. | 369/75.2 |
| 5,228,016 | 7/1993 | Menke | 369/36 |
| 5,255,251 | 10/1993 | Fitzgerald et al. | 369/36 |
| 5,274,620 | 12/1993 | Sipos | 369/77.2 |
| 5,280,467 | 1/1994 | Wanger et al. | 369/275.5 |
| 5,282,183 | 1/1994 | Arifuku et al. | 369/36 |
| 5,329,516 | 7/1994 | Hoshi et al. | 369/77.1 |
| 5,373,489 | 12/1994 | Sato et al. | 369/36 |
| 5,414,679 | 5/1995 | Menke | 369/36 |
| 5,438,534 | 8/1995 | Sakiyama | 369/36 |
| 5,477,518 | 12/1995 | Hiatt | 369/75.1 |
| 5,498,116 | 3/1996 | Woodruff et al. | 360/92 |
| 5,548,567 | 8/1996 | Sawai | 360/98.05 |

MULTIPLE DISC CARTRIDGE DISC MAGAZINE

This is a divisional of application Ser. No. 08/379,220, filed Jan. 27, 1995, now U.S. Pat. No. 5,640,288.

BACKGROUND OF THE INVENTION

This invention relates to a recording and/or reproducing apparatus having a disc exchange function. More particularly, it relates to a recording and/or reproducing apparatus in which plural disc cartridges are housed within each of plural toroidally arranged housing sections, and in which desired ones of the disc cartridges are sequentially selected and taken out for recording and/or reproducing music signals on or from discs contained in the selected disc cartridges.

There has hitherto been employed a disc player apparatus in which plural disc cartridges are contained in a main member of the apparatus and in which desired ones of the disc cartridges are sequentially selected and loaded on a disc driving unit so that information signals, such as music signals, recorded on the discs housed within the disc cartridges, will be reproduced continuously.

This type of the disc player apparatus has a cartridge housing sections for housing plural disc cartridges and a cartridge transporting mechanism for selectively taking out a desired one of the disc cartridges out of the cartridge housing sections for loading on a disc driving unit.

With the conventional disc player apparatus, having the disc exchange function, the cartridge housing sections are fixedly arranged within the main body of the apparatus. Consequently, for accommodating a large number of the disc cartridges, the cartridge housing sections need to be increased in size, thus increasing the size of the apparatus. On the other hand, if a large number of the disc cartridges are housed within each of the cartridge housing sections, the cartridge housing sections are increased in size. In addition, the disc cartridge transporting distance from the cartridge housing sections to the disc driving unit is increased, such that the cartridge transporting mechanism has to be increased in size. As a result, it becomes difficult to reduce the size of the disc player apparatus.

OBJECTS AND SUMMARY OF THE INVENTION

It is therefore an object of the present invention to provide a recording and/or reproducing apparatus having the disc exchange function, in which a large number of the disc cartridges may be efficiently accommodated within a small housing space to render it possible to reduce the size of the apparatus.

It is another object of the present invention to provide a recording and/or reproducing apparatus having the disc exchange function, in which a desired one of the disc cartridges may be correctly selected and the thus selected disc cartridge may be positively loaded on the disc driving unit.

It is yet another object of the present invention to provide a recording and/or reproducing apparatus having the disc exchange function, in which the disc cartridges housed within the main member of the apparatus may be exchanged easily.

The apparatus for recording and/or reproducing information signals includes a plurality of toroidally arranged housing sections each housing a plurality of recording media in a stacked condition. Each housing section has apertures on opposite lateral sides thereof for taking out or housing the recording media in the fore-and-aft direction parallel to the stacking direction of the recording media. The recording/reproducing apparatus also includes a plurality of recording/reproducing units arranged at a center position of the toroidally arranged housing sections in a direction along the diameter of the toroid and facing each other on both sides of the center of the toroid delimited by the plural housing sections, and a lift mechanism for supporting each of the recording/reproducing units and lifting the recording/reproducing unit in the stacking direction of each of the recording/reproducing units. The recording/reproducing apparatus further includes a transfer mechanism lifted by the lift mechanism along with the recording/reproducing units and adapted for taking out or housing the recording media housed within the housing units via one of the apertures of one of the housing sections facing each recording/reproducing unit, and a turntable carrying the toroidally arranged housing units and adapted for selectively facing one of the plural housing sections to each of the recording/reproducing units. The recording/reproducing apparatus also includes a rotating riving mechanism for rotationally during the turntable about the center of the housing section as a center of rotation. The turntable is rotatably mounted within the main member of the apparatus, in which there are also mounted the rotating driving mechanism and the lift mechanism.

The main member of the apparatus includes a takeout/housing section in or from which the recording medium may be housed or taken out via the aperture of the housing section opposite to the aperture facing the recording/reproducing unit.

The housing sections are arranged on said turntable in a radial direction from the center of a toroid defined by the housing sections with one of the apertures of each housing section being directed to the center of the center of the toroid and the other aperture of each housing section being directed outwardly from the center of the toroid.

Each of the plural housing sections or the turntable is provided with an engagement lug and the turntable or each of the plural housing sections is provided with an engagement recess and each of the housing sections is held on the turntable by interengagement of the engagement lug and the engagement recess.

The main member of the apparatus has an entry/exit section via which the housing section is taken out from the turntable out of the main member of the apparatus.

The turntable has a plurality of engagement portions and a plurality of gear portions provided between these engagement portions. The driving mechanism has a mating engagement portion inter-engaged with the engagement portions of the turntable, a driving gear having a gear portion engaged with a mating gear portion on the turntable and a driving source for driving the driving gear. The gear portions of the turntable meshes with the gear portion of the driving gear for rotationally driving the turntable. The turntable is locked by inter-engagement of the engagement portions and the mating engagement portion so that at least one of the housing sections faces one of the recording/reproducing units.

The apparatus also includes first detection means for detecting the rotational angle of the turntable and second detection means for detecting the position of locking of the mating engagement portion of the driving gear with the engagement portion on the turntable. The first detection means has plural mating detection portions for detecting the position of the engagement portions on the turntable and detection portions for detecting the mating detection portions.

The lift mechanism has a plurality of driving gears rotationally driven by a driving source and a plurality of engagement portions provided on each of the driving gears for being engaged in engagement grooves formed in each of the recording/reproducing units. Each of the driving gears is rotationally driven by the driving source for lifting each of the recording/reproducing units along a guide.

The apparatus also includes, in addition to the first detection means for detecting the rotational angle of the turntable and the second detection means for detecting the position of locking of the mating engagement portion of the driving gear with the engagement portion on the turntable, first position detection means provided on one end of a movement range of the recording/reproducing unit for detecting an initial position of the recording/reproducing unit, and second position detection means for detecting the position of the recording/reproducing unit along the stacking direction.

The recording medium housed within the housing section may be a disc cartridge containing a disc for recording information signals, such as an optical disc, or a disc itself.

With the present recording and/or reproducing apparatus, the turntable is rotated by a rotating driving mechanism for selectively directing plural housing sections arranged on the turntable to the recording/reproducing apparatus. The recording/reproducing unit facing the selected housing section and the transfer mechanism for taking out a desired one of the plural disc cartridges housed in a stacked condition in the housing section are directed to the desired disc cartridge in the selected housing section. The disc cartridge in the housing section directed to the recording/reproducing unit is taken out of the housing section by the transfer mechanism and loaded on the recording/reproducing unit for recording and/or reproducing information signals, such as music signals, on or from the disc housed within the disc cartridge.

Other objects and advantages of the invention will become apparent from the following description of the preferred embodiments and the claims.

DETAILED DESCRIPTION OF THE PREFERRED EMBODIMENTS

Figure 1:
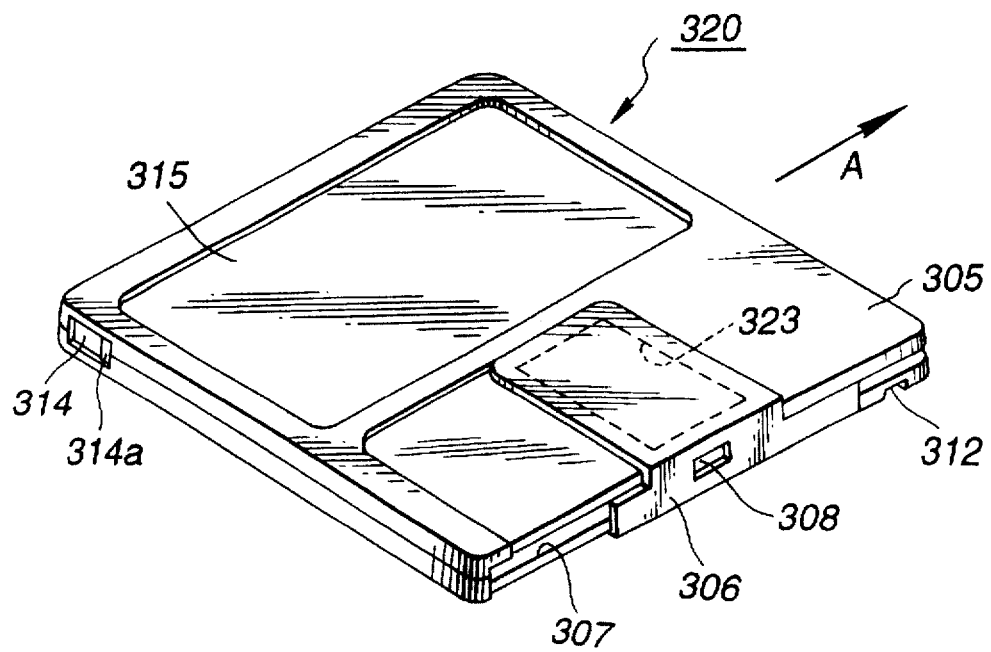
FIG. 1 is perspective view showing a disc cartridge having housed therein a magneto-optical disc for a recording and/or reproducing apparatus capable of re-recording information signals thereon, according to the present invention, when looking from its upper side.

Referring to the drawings, preferred embodiments of the present invention will be explained in detail.

The embodiment of the present invention, which is now to be described, is a disc recording and/or reproducing apparatus in which a disc cartridge having housed therein a magneto-optical disc capable of re-recording information signals, such as music signals, or disc cartridge having housed therein an optical disc capable of only reproducing pre-recorded information signals, such as music signals, is used as a recording medium.

The disc cartridge having housed therein the magneto-optical disc capable of re-recording information signals, and the disc cartridge having housed therein the optical disc capable of only reproducing pre-recorded information signals, are now explained.

The magneto-optical disc capable of re-recording information signals, such as music signals, is comprised of a disc substrate of a transparent synthetic resin, such as polycarbonate resin, about 64 mm in diameter, and a signal recording layer of a magnetic material deposited thereon. The signal recording layer is locally heated by a light beam outgoing from a light source and converged thereon by an objective lens to a temperature higher than the Curie temperature. The information signals are recorded by application to the heated region of an external magnetic field modulated in accordance with the information signals to be recorded. The information signal thus recorded on the magneto-optical disc is read by radiating a linearly polarized light, such as a laser beam, on the signal recording layer, and by detecting rotation in the direction of polarization of the return light reflected by the signal recording layer by photodetector means.

The replay-only optical disc, capable of reproducing only information signals, such as pre-recorded music signals, is formed by depositing a reflective film of a metal material, such as aluminum, on a disc substrate similar to the disc substrate of the magneto-optical disc. Recording of the information signals on the optical disc is by forming a row of micro-sized pits corresponding to the information signals by a stamper at the time of fabrication of the disc substrate. The information signals recorded on the replay-only optical disc are read by radiating a light beam on the row of pits and detecting the status of the return light from the optical disc by a photodetector.

Figure 2:
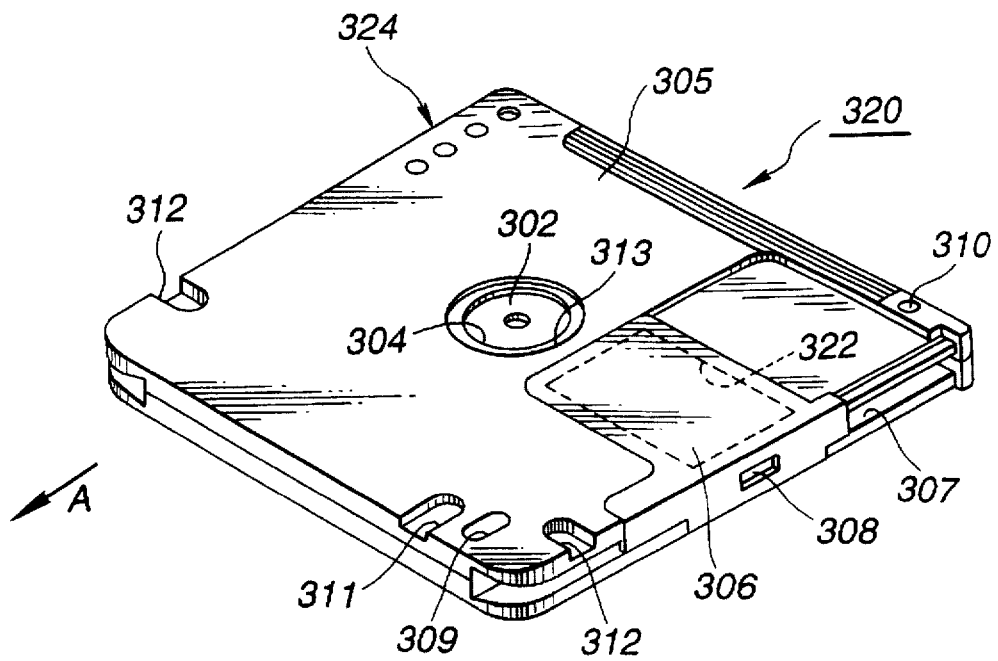
FIG. 2 is a perspective view of the disc cartridge shown in FIG. 1, when looking from its lower side.

A disc cartridge 320 having housed therein the magneto-optical disc capable of re-recording the information signals is configured as shown in FIGS. 1 and 2.

Figure 3:
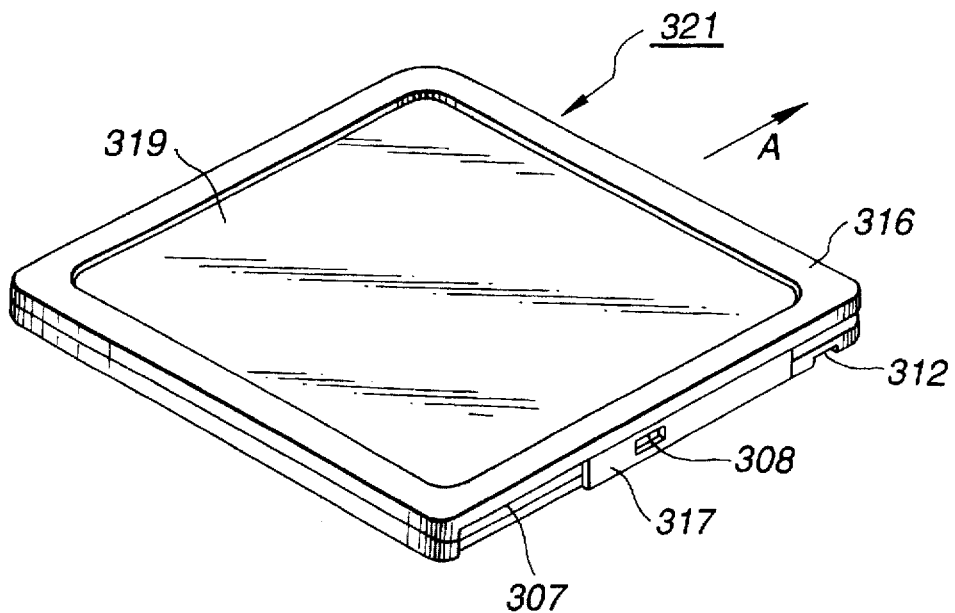
FIG. 3 is a perspective view showing a disc cartridge having housed therein an optical disc for a recording and/or reproducing apparatus capable only of reproducing information signals, according to the present invention, when looking from its upper side.
Figure 4:
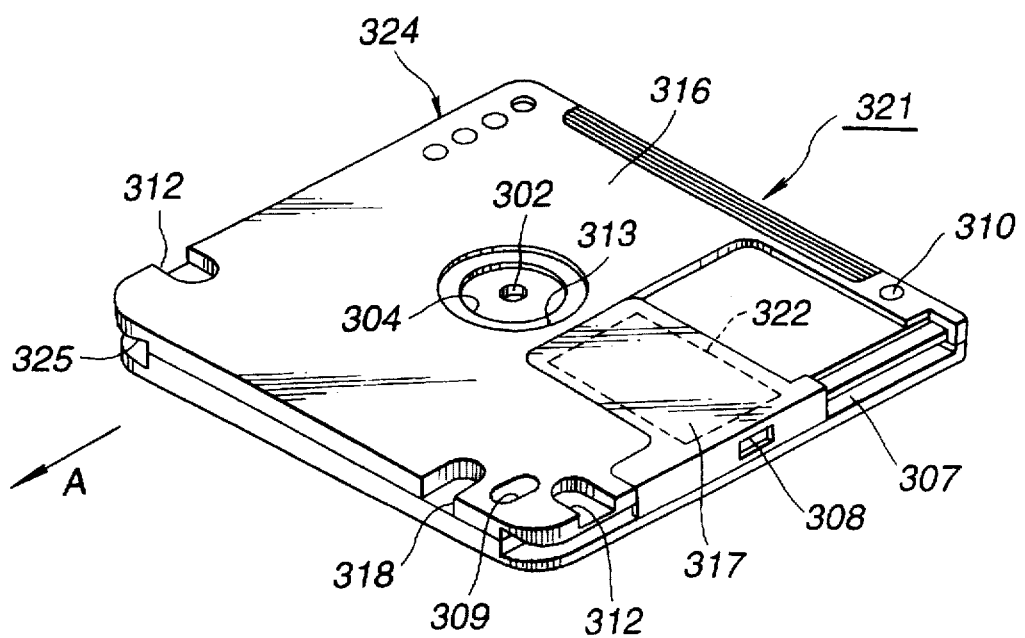
FIG. 4 is a perspective view showing the disc cartridge of FIG. 3, when looking from its lower side.

On the other hand, a disc cartridge 321 having housed therein the replay-only optical disc is configured as shown in FIGS. 3 and 4.

Figure 11:
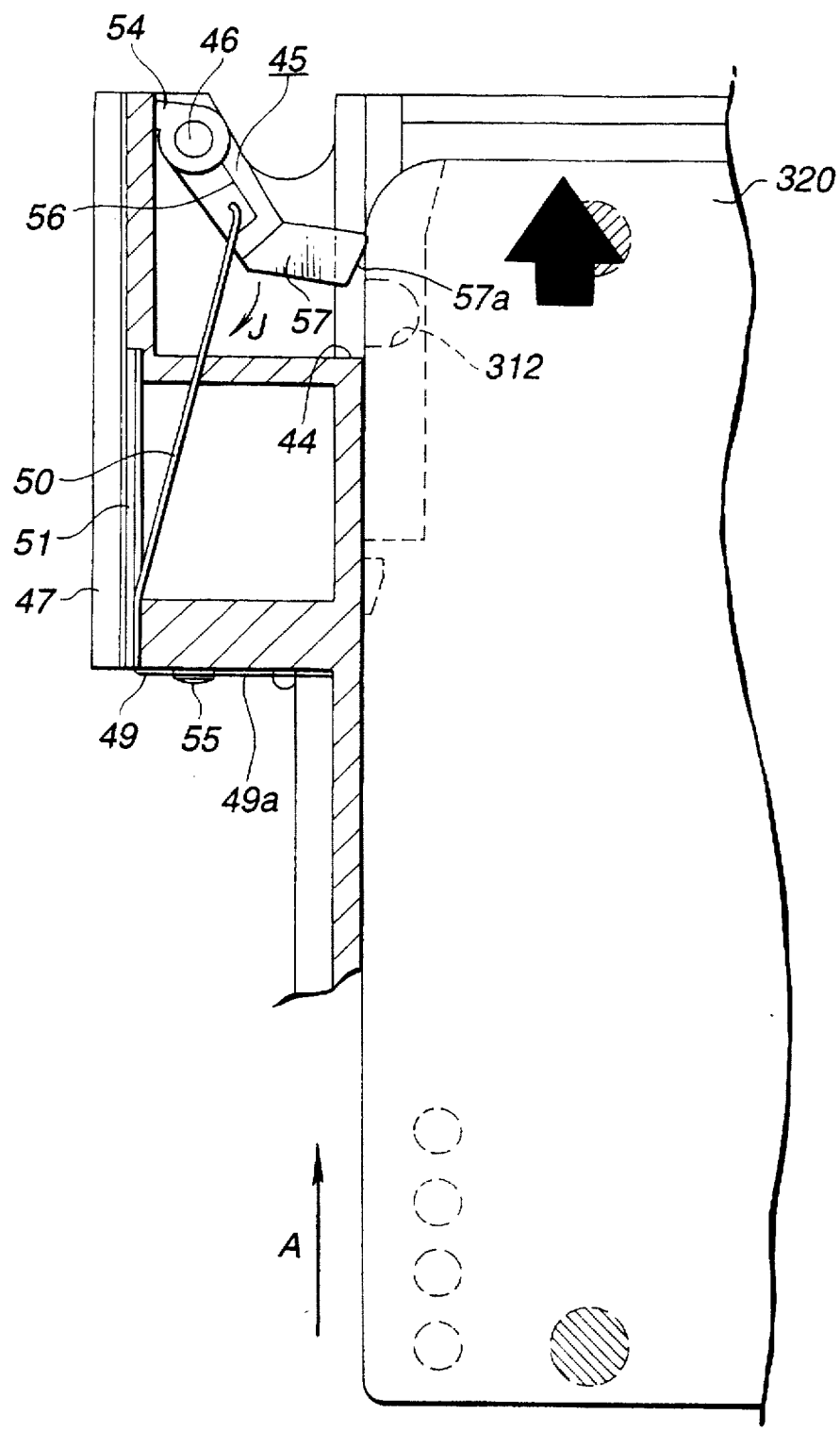
FIG. 11 is an enlarged schematic transverse cross-sectional view showing the state of the engagement member when the disc cartridge is being inserted into the magazine for the disc cartridge.

The disc cartridge 320, having housed therein the magneto-optical disc, is comprised of a main cartridge member 305, fabricated by abutting and bonding an upper cartridge half and a lower cartridge half to each other, and the magneto-optical disc housed therein. The main cartridge member 305 of the disc cartridge 320 housing the magneto-optical disc is in the form of a square inscribed by the outer periphery of the magneto-optical disc. In the upper surface of the cartridge main member 305 is formed a recording aperture 323 for exposing a portion of the magneto-optical disc housed therein to outside along the disc radius and for intruding a magnetic head, not shown, into the inside of the cartridge main body 395, as shown in FIG. 11. In the lower surface of the cartridge main member 305 is formed a recording/reproducing aperture 322 in registration with the recording/reproducing aperture 323 for exposing a portion of the magneto-optical disc housed therein to outside along the disc radius and for causing an optical pickup to face the magneto-optical disc, as shown in FIG. 2. In the lower surface of the cartridge main body 305 is formed a center aperture 313 in which is intruded a portion of a disc rotating driving mechanism for rotationally driving the magneto-optical disc.

On the cartridge main body 305 housing the magneto-optical disc is mounted a shutter member 306 for opening and closing the recording/reproducing apertures 322 and 323. The shutter member 306 is formed by punching and bowing a thin metal plate material or molding a synthetic material in the cross-section shape of a letter U, and is comprised of a pair of shutter plate portions large enough in size to close the recording/reproducing apertures 322 and 323, and a connecting portion interconnecting the proximal ends of the shutter plate portions. The shutter member 306 has its connecting portion supported within a guide groove 307 formed in a lateral side of the cartridge main member 305 so that the shutter member is movable between the position of closing the recording/reproducing apertures 322 and 323 and the position of closing the recording/reproducing apertures 322 and 323.

The disc cartridge 320 is loaded on the cartridge loading unit of the disc recording and/or reproducing apparatus, with the side thereof running at right angles to the lateral side of the cartridge main member 305 supporting the shutter member 306 as an inserting side, with the direction shown by arrow A in FIGS. 1 and 2 as the inserting direction.

On the other hand, the disc cartridge 321 housing the replay-only optical disc has a cartridge main member 316 housing the optical disc coincident in outer size to the cartridge main member 305 housing the magneto-optical disc. The cartridge main member 316 is also fabricated by abutting and bonding an upper cartridge half and a lower cartridge half together.

Meanwhile, since there is no necessity of employing a magnetic head for recording information signals for the disc cartridge 321 housing the replay-only optical disc, the upper surface of the cartridge main member 316 remains solid without being formed with the aperture as shown in FIG. 3. The lower surface of the cartridge main member 316 is formed with a reproducing aperture 322 for exposing a portion of the optical disc housed therein and for causing the optical pickup to face the optical disc, as shown in FIG. 4. In the lower surface of the cartridge main member 305 is formed a center aperture 313 in which is intruded a portion of a disc rotating driving mechanism for rotationally driving the optical disc.

On the cartridge main member 316 housing the magneto-optical disc, there is also mounted a shutter member 317 for opening and closing the recording/reproducing aperture 322. The shutter member 317 is formed by punching and bowing a thin metal plate material or molding a synthetic material in the cross-section shape of a letter U, and is comprised of a pair of shutter plate portions large enough in size to close only the recording/reproducing aperture 322, and a connecting portion interconnecting the proximal ends of the shutter plate portions. The shutter member 317 has its connecting portion supported within a guide groove 307 formed in the lateral side of the cartridge main member 305 so that the shutter member is movable between the position of closing the recording/reproducing aperture 322 and the position of closing the recording/reproducing aperture 322.

The disc cartridge 321 is loaded on the cartridge loading unit of the disc recording and/or reproducing apparatus, with the side thereof running at right angles to the lateral side of the cartridge main member 317 supporting the shutter member 306 as an inserting side, with the direction shown by arrow A in FIGS. 3 and 4 as the inserting direction.

At a mid portion of the connecting portion of each of the shutter members 306, 317 mounted on the disc cartridge 320 or 321, there is formed an engagement opening 308 engaged by a shutter closure member, not shown, adapted for displacing the shutter members 306, 317 towards the aperture closure position after the shutter members have been moved to the aperture opening position by the disc cartridges 320, 321 having been loaded on the disc recording and/or reproducing apparatus.

The magneto-optical disc and the optical disc are each formed with a circular center aperture 304. The center aperture 304 is fitted with a chuck plate 302 formed of a magnetic material, such as iron or stainless steel. The center aperture 304 and the chuck plate 302 are exposed to outside via the center aperture 313 formed in each of the lower surfaces of the cartridge main members 305 and 316.

In the lower surfaces of the cartridge main members 305, 316 are formed a pair of positioning holes 309, 310 engaged by positioning pins provided on the recording/reproducing apparatus when the disc cartridges 320, 321 are loaded on the recording/reproducing apparatus. These positioning holes 309, 310 are formed so as to be located on both sides of the recording/reproducing aperture 322, as shown in FIGS. 2 and 4. The positioning hole 309 is formed as an elongated opening having its long axis lying along the inserting direction of the disc cartridges 320, 321, while the positioning hole 310 is formed as a circular opening tightly engaged by the associated positioning pin.

In the lower surface of the lateral sides of the cartridge main members 305, 316 opposite to the lateral sides thereof carrying the shutter members 306, 317 are formed a plurality of indicating holes 324 for indicating the types of the discs contained in the cartridge main members 305, 316 and the state as to whether or not the information signals can be recorded on the discs. The disc cartridge 320 housing the magneto-optical disc capable of re-recording information signals is provided with a mistaken recording inhibiting member. The mistaken recording inhibiting member is arranged within the cartridge main member so that it partially faces the indicating hole 324 and has its finger support 314 protruded via an opening 314a formed in the rear side opposite to the front side or the inserting side of the cartridge main member 305. The mistaken recording inhibiting member opens or closes the indicating hole 324 by being moved by means of the finger support for indicating whether or not information signals may be re-recorded on the magneto-optical disc.

In portions of the lateral sides of the cartridge main members 305, 316 close to the inserting sides thereof into the recording and/or reproducing apparatus are formed a pair of engagement recesses 312, 312 engaged by portions of a cartridge entraining mechanism adapted for entraining the disc cartridges 320, 321 inserted into the recording/reproducing apparatus, as shown in FIGS. 2 and 4.

The cartridge main member 305 of the disc cartridge 320 housing the magneto-optical disc has a discrimination recess 311 for indicating that the disc contained therein is the magneto-optical disc. On the other hand, the cartridge main member 316 of the disc cartridge 321 housing the optical disc has a discrimination recess 318 for indicating that the disc contained therein is the optical disc. These discrimination recesses 311, 318 are respectively formed in the lower surfaces of the cartridge main members 305, 316 for being opened on the inserting sides of the cartridge main members 305, 316, and are designed to indicate the disc type by difference in depth.

The disc recording and/or reproducing apparatus according to the present invention is capable of housing a plurality of, e.g., 80, disc cartridges 320, 321, and is adapted to select a desired one of these disc cartridges 320, 321 in order to permit information signals to be recorded on or reproduced from the magneto-optical disc or the optical disc housed within the selected disc cartridges 320, 321.

Figure 5:
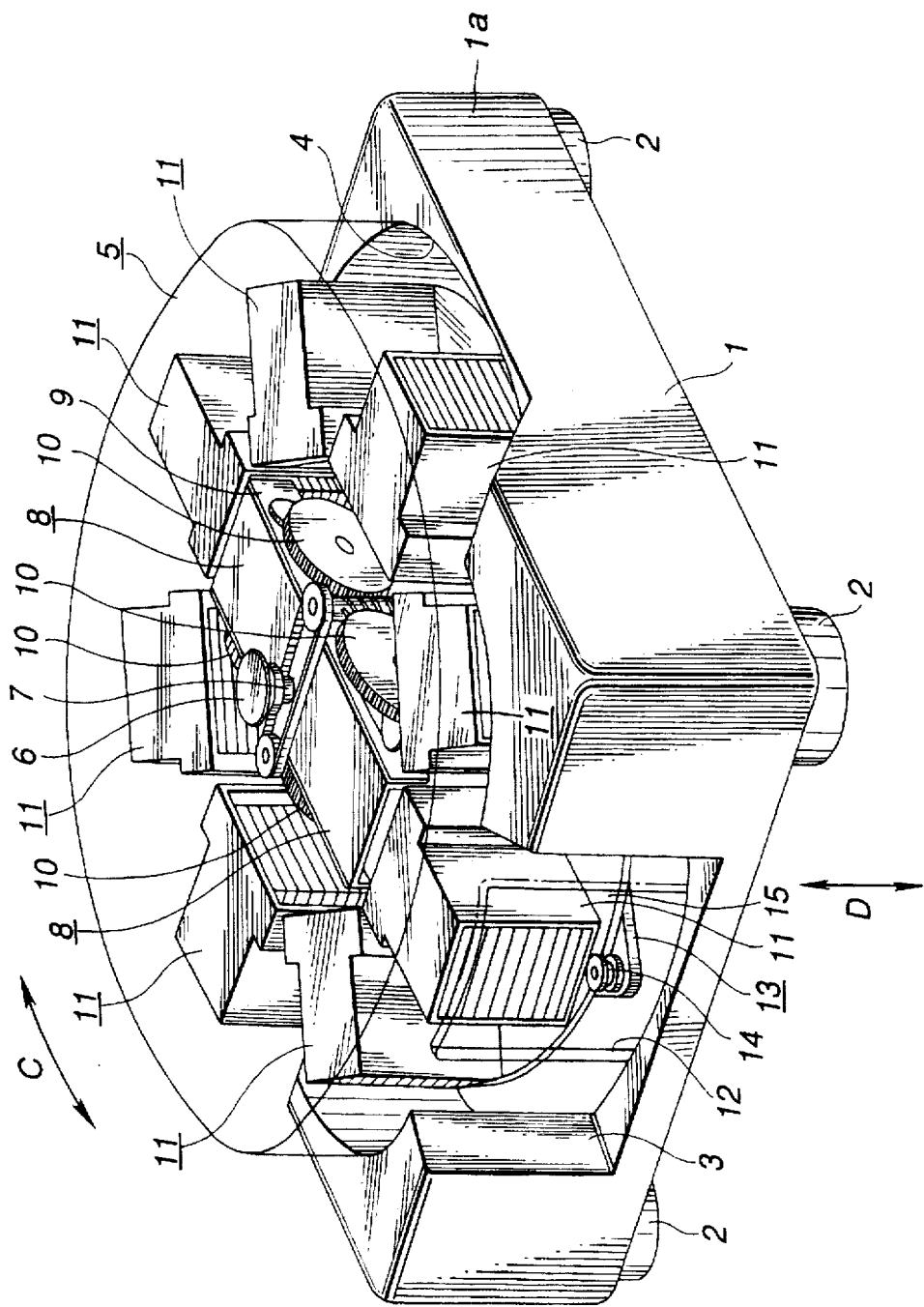
FIG. 5 is a perspective view showing a disc recording and/or reproducing apparatus according to the present invention.

The disc recording and/or reproducing apparatus has a base 1, constituting the main member of the apparatus, as shown in FIG. 5. The base 1 is formed as a square casing and has a bottom surface at each corner of the lower surface of which is mounted a post 2 for installing the apparatus in place. In the upper surface of the base 1 is formed a circular recess 4 delimited by a sidewall section 1a. The sidewall section 1a delimiting the recess 4 has a cut-out 3 for partially opening the recess 4 to outside. The recess 3 is formed at the position of the base 1 facing the front side of the completed disc recording and/or reproducing apparatus.

Within the recess 4 is fixedly mounted a main chassis 13 via a bottom plate of the base 1. A support pillar 7 is set upright at a center position of the main chassis 13. A cover member 7 is mounted on the upper end of the support pillar 7 via a bearing member 6. The cover member 5 is rotatable about the support pillar 7 as indicated by arrow C in FIG. 5. The cover member 5 is formed of transparent synthetic resin or glass and is formed as a bottomed cylinder having a circular top plate coextensive as the recess 4 and a peripheral wall depending from the periphery of the top plate.

The bearing member 6 is mounted at a center position of the top plate of the cover member 5 and supported for rotation about the support pillar 7. Thus the cover member 5 is rotatable about the supporting pillar 7 as the center of rotation. The cover member 5 is adapted for closing the recess 4 from the upper side by being mounted on the support pillar 7.

The peripheral wall of the cover member 5 is formed with an aperture 12. The cover member 5 is rotated about the support pillar 7 for facing the aperture 12 to the cut-out 3 for opening the recess 4 to outside of the main member of the apparatus. With the aperture 12 of the cover member 5 thus facing the cutout 3, the disc cartridge 320 or 321 and a magazine 11 for the disc cartridge as later explained may be introduced into or taken out of the recess 4 via the cut-out 3. The cut-out 3 formed in the main member of the apparatus facing the aperture 12 formed in the cover member 5 serves as the entry/exit opening of the disc cartridge 320 or 321 into and out of the magazine for the disc cartridge 11.

On a main chassis 13 set on the base 1 is rotatably mounted a toroidally-shaped turntable 15 constituting a turntable mechanism as later explained. On the turntable 15 are removably arranged eight magazines for the disc cartridges 11 so as to complete a toroidal shape about the center of the turntable 15 as the center. Each of these magazines 11 for the disc cartridges is adapted for housing ten disc cartridges 320 or 321.

On the main chassis 13 are arranged a pair of disc driving units 8, 8 making up a recording/reproducing unit of the recording/reproducing apparatus supported on the support pillar 7 via the lift mechanism serving as a transport mechanism as later explained. These disc driving units 8, 8 are lifted along the support pillar 7 by the lift mechanism, while the magazines for the disc cartridges 11 are rotated by the turntable mechanism for selecting a desired one of the disc cartridges 320 or 321 from the magazine 11. The disc driving units 8, 8 extract the selected disc cartridge out of the magazine 11 and load the selected disc cartridge on the driving unit 8 for recording and/or reproducing information signals, such as music signals, on the disc housed within the disc cartridge 320 or 321. Each of the disc driving units 8 includes a disc rotating driving mechanism for rotating the disc, and an optical head as well as a magnetic head for recording and/or reproducing information signals on or from the disc.

The magazine for the disc cartridge 11, employed in the disc recording and/or reproducing apparatus according to the present invention, is now explained.

The magazine for the disc cartridge 11 has a substantially parallelepipedic-shaped main magazine member 11a within which is defined a housing section 39 for stacking up a plurality of the disc cartridges 320, 321 so that the major surfaces of the disc cartridges run parallel to one another. The housing section 39 is dimensioned to hold ten disc cartridges 320 or 321 in a stacked-up position.

Figure 7:
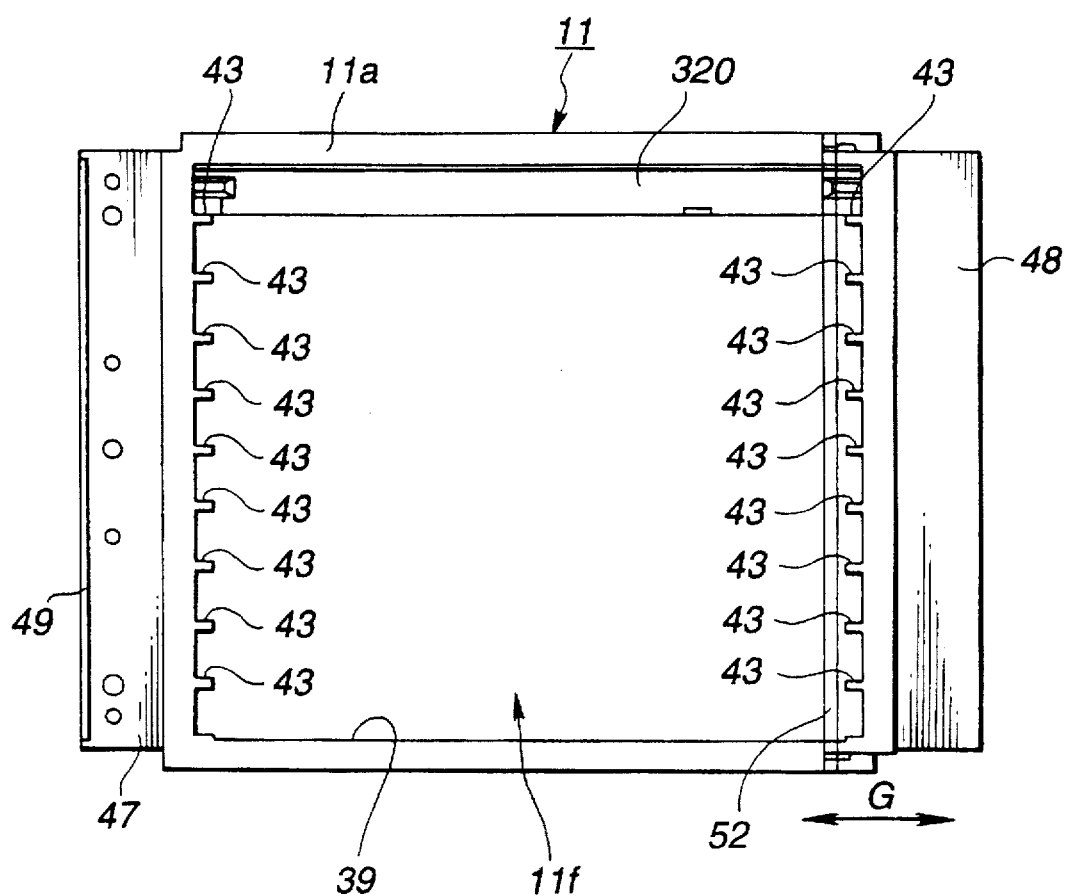
FIG. 7 is a back side view showing a magazine for a disc cartridge.
Figure 8:
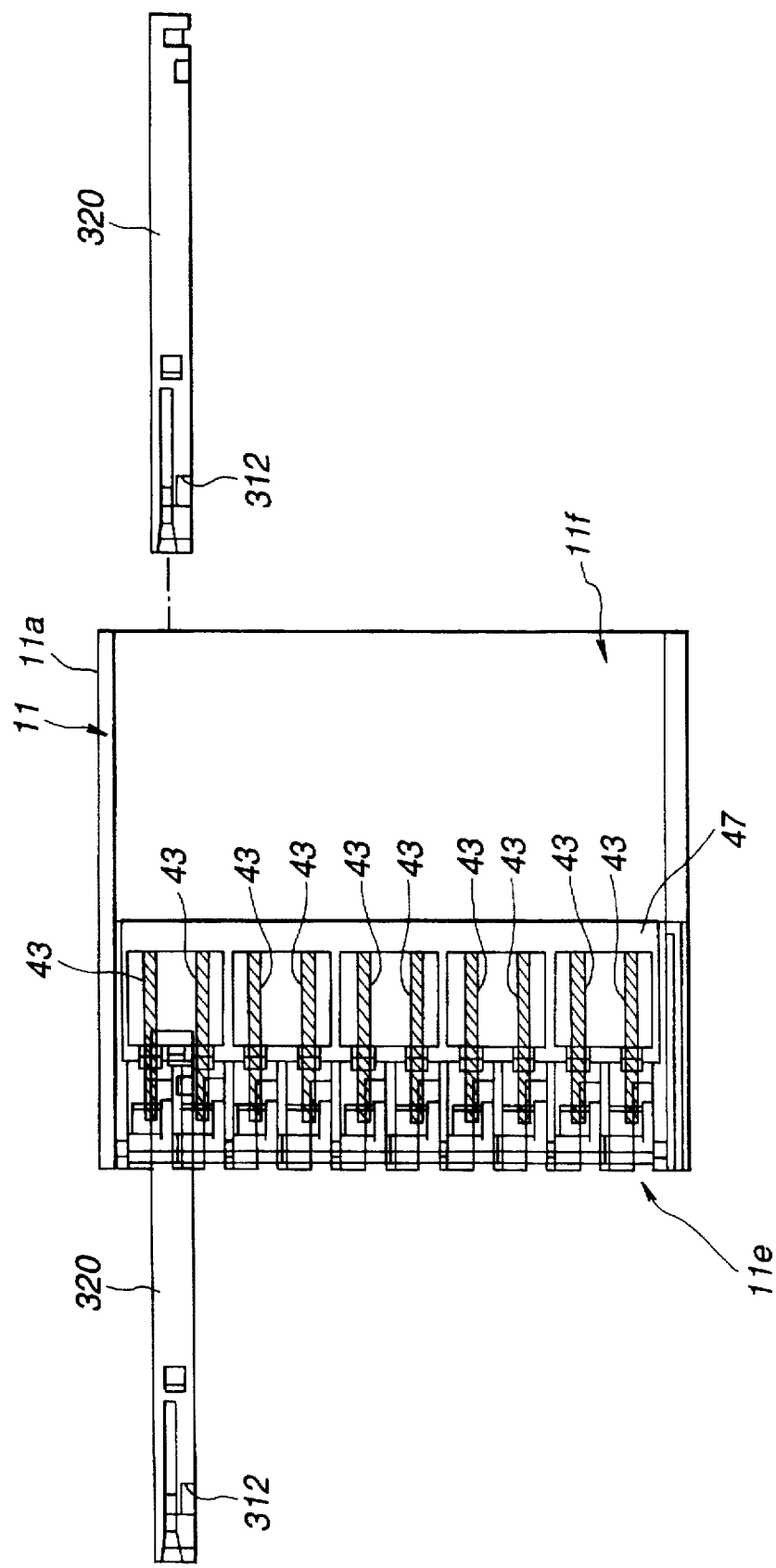
FIG. 8 is a side view showing the state in which the disc cartridge is inserted into and detached from the magazine for the disc cartridge, with a portion of the magazine being broken away.

On the inner lateral surfaces of opposite side plates 11b and 11c of the main magazine member 11a defining the housing section 39 are formed a plurality of, herein ten, shelf-shaped protrusions 43, in plural tiers, as shown in FIG. 7. These protrusions 43 are formed horizontally from the front side towards the rear side of the main magazine member 11a. The protrusions are separated by an equal distance from one another. The disc cartridges 320 or 321, housed within the housing section 39, are inserted across a pair of opposing shelf-shaped protrusions 43, 43 so that the disc cartridges are stacked in a horizontal position by having both lateral sides supported by the shelf-shaped protrusions 43.

The magazine main member 11a has its front and rear sides opened with the rear-side opening serving as an entry/exit area of the disc cartridges 320 or 321 into and out of the housing section 39. The disc cartridges 320 or 321 are inserted into the housing section 39 via the rear opening in the magazine main member 11a so as to be supported across the opposite shelf-shaped protrusions 43. The disc cartridge 320 or 321 is inserted into the housing section 39 with the inserting front side thereof into the recording/reproducing apparatus as the inserting side into the housing section 39. That is, the disc cartridge 320 or 321 is inserted into the housing section 39 with the direction shown by arrow A in FIGS. 1 and 3 as the inserting direction. The disc cartridge 320 or 321 thus housed within the housing section 39, is taken out via apertures 11e, 11f formed in the front and rear sides of the magazine main member 11a, respectively. That is, the disc cartridge 320 or 321, thus housed within the housing section 39, may be taken out from the front side or the rear side of the magazine main member 11a, as desired.

On the rear side of the magazine main member 11a is mounted a stop member 52 for preventing descent of the disc cartridge 320 or 321 housed within the housing section 39. The stop member 52 is formed as a rod having U-shaped pivots 52a at both ends. The stop member has its pivots 52a pivotally mounted on the upper and lower surfaces of the magazine main member 11a so that the stop member may be rotated between a position facing the rear aperture of the magazine main member 11a and a position receded from the rear aperture. When the stop member 52 has been rotated to the position facing the aperture, it supports the rear end face of the disc cartridge 320 or 321 inserted into the housing section 39 to inhibit descent of the disc cartridge from within the housing section 39. When the stop member 52 has been rotated to the position receded from the aperture, it opens the aperture in the rear surface of the stop member 52 for enabling the disc cartridge 320 or 321 to be introduced into or receded from the housing section 39.

On the front side of the magazine main member 11a having the aperture 11e are formed plural engagement members 45 adapted for being engaged with portions of the disc cartridges 320, 321 inserted into the housing section 39, or for prohibiting these disc cartridges 320 or 321 from being disengaged from the housing section 39. Each of the engagement members 45 is provided in association with each disc cartridge 320 or 321 supported across the shelf-shaped protrusions 43 facing each other. Specifically, the engagement members 45 are located on one side of the shelf-shaped protrusions 43 supporting the disc cartridges 320 or 321.

The engagement members 45 are housed within an engagement member containing section 47 provided on the outer lateral side of a side plate 11b of the magazine main member 11a. These engagement members 45 are mounted in position by having engagement end portions 57 protruded into the housing section 39 via ten cut-outs 44 formed in the side plate 11b of the magazine main member 11a in association with the shelf-shaped protrusions 43 so as to be engaged with portions of the disc cartridges 320 or 321 and by having proximal portions pivotally mounted on a supporting shaft 46 mounted for extending along the height of the engagement member housing section 47. The engagement members 45 are rotated about the supporting shaft 46 as the center of rotation for intruding or receding the engagement portions 57 into or out of the housing section 39.

An auxiliary containing section 48 having the same configuration as the containing section 47 is mounted on the outer lateral surface of the opposite side plate 11c of the magazine main member 11a such that the magazine main member 11a is symmetrically shaped in the transverse direction. If necessary, the auxiliary containing section 48 may be provided with plural engagement members 45 for prohibiting detachment of the disc cartridges 320 or 321 out of the housing section 39. By providing the engagement members 45 on both sides of the magazine main member 11a, the disc cartridges 320 or 321 housed within the housing section 39 have both ends thereof held by the engagement members 45 for assuring positive housing of the disc cartridges within the housing section 39.

Figure 9:
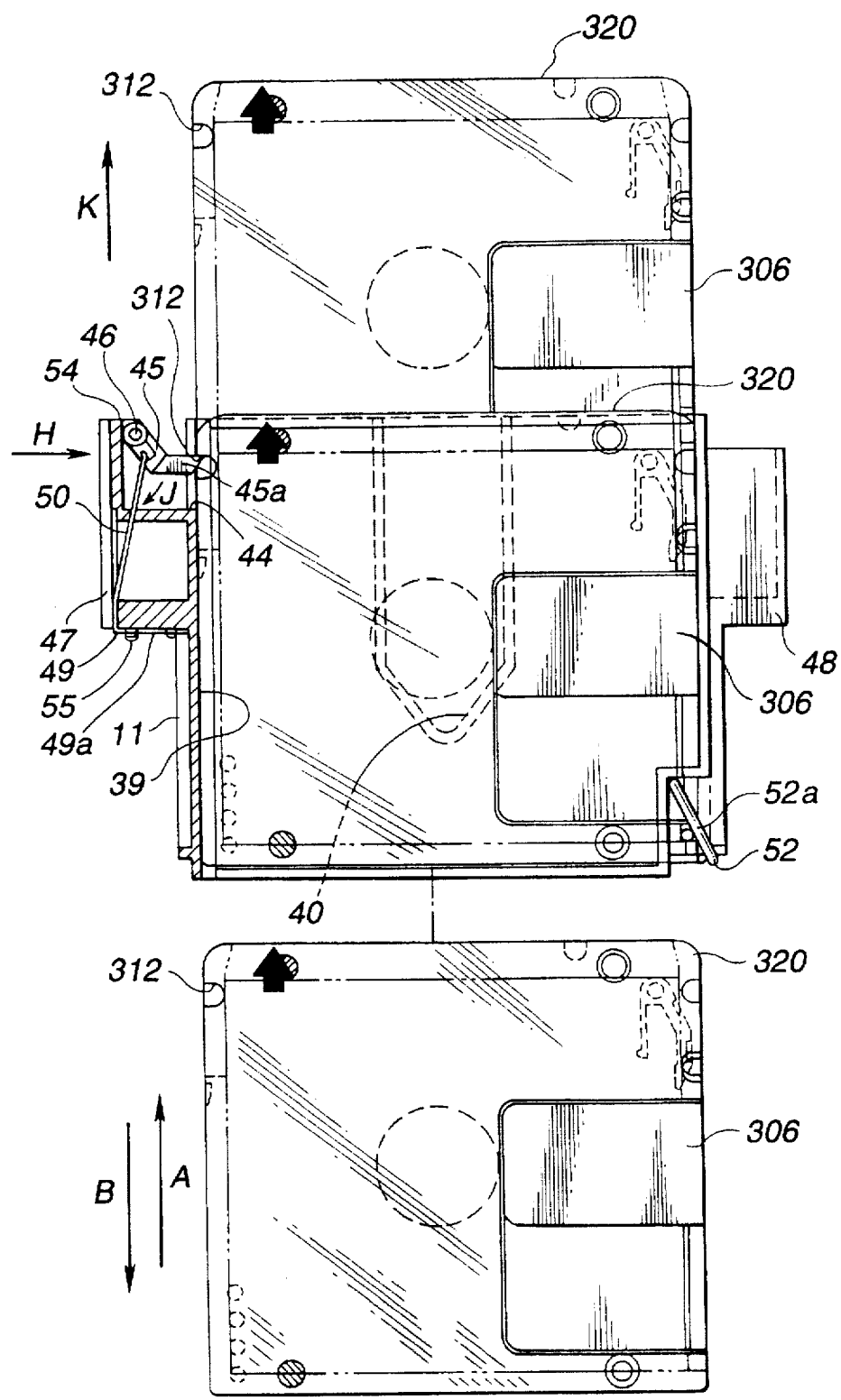
FIG. 9 is a plan view showing the state in which the disc cartridge is inserted into and detached from the magazine for the disc cartridge, with a portion of the magazine being broken away.

Each engagement member 45 is thrust by a thrusting piece 50 which is formed by segmenting and bending an end portion of a spring plate member 49 of a substantial width mounted in the containing section 47, so as to be rotationally biased about the pivot 46 as the center of rotation in the direction shown by arrow H in FIG. 9, that is in the direction in which the engagement portions 57 are protruded into the inside of the housing section 39.

The spring plate member 49, having formed thereon plural end thrusting members 50 for thrusting the engagement member 45, has its connecting portion 49a to the proximal end of each thrusting piece 50 secured to the rear wall of the containing section 47 by a set screw 55, with the end thrusting piece 50 protruded into the inside of the containing section 47 via a slit 51 formed in the side wall portion of the containing section 47, as shown in FIG. 9. Each thrusting piece 50 has its distal end engaged within the engagement recess 56 formed in the lateral surface of the engagement member 45 for rotationally biasing the engagement member 45 in the direction shown by arrow H in FIG. 9.

Figure 10:
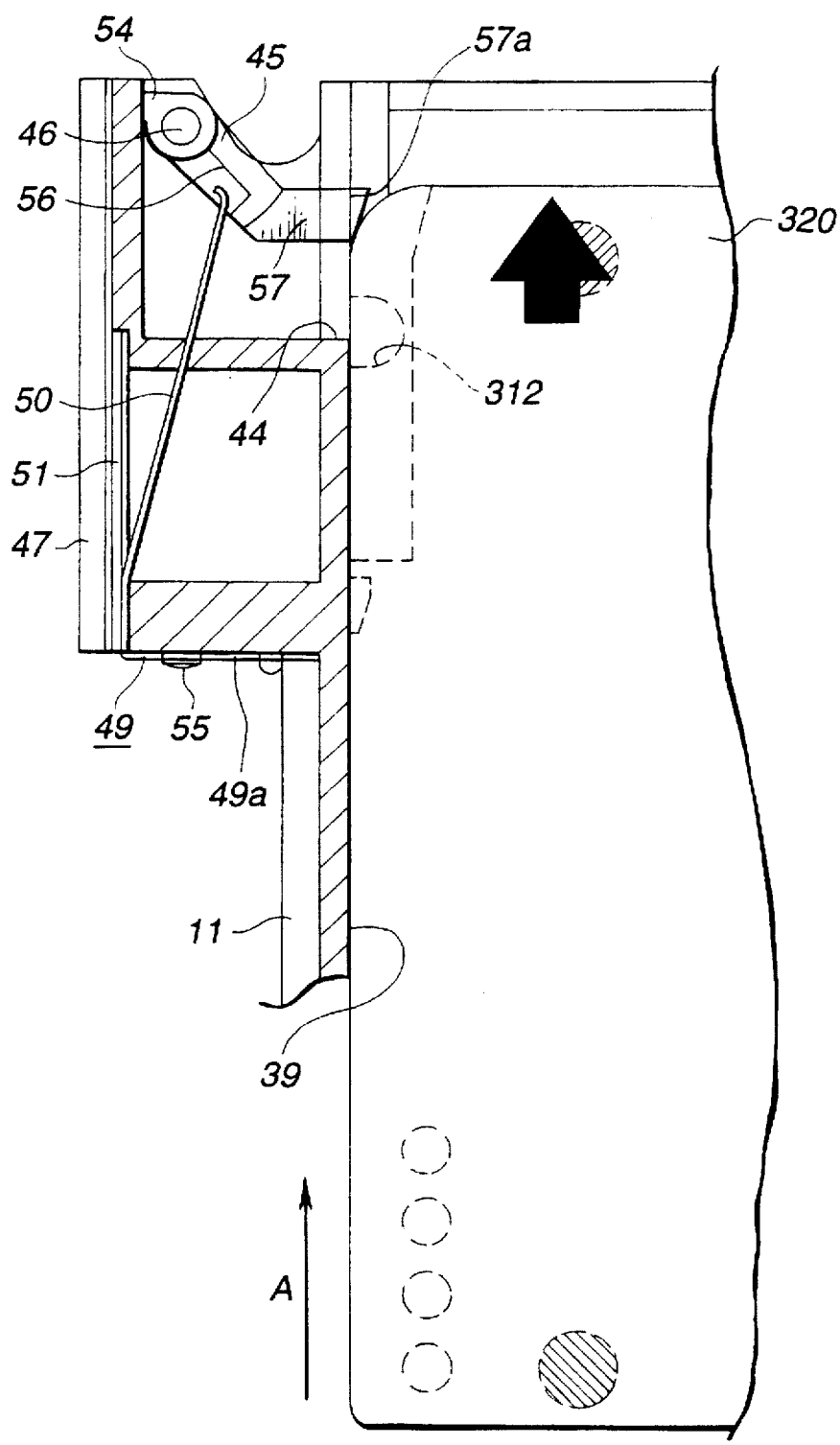
FIG. 10 is an enlarged schematic transverse cross-sectional view showing the state of an engagement member when the disc cartridge is about to be inserted into the magazine for the disc cartridge.
Figure 12:
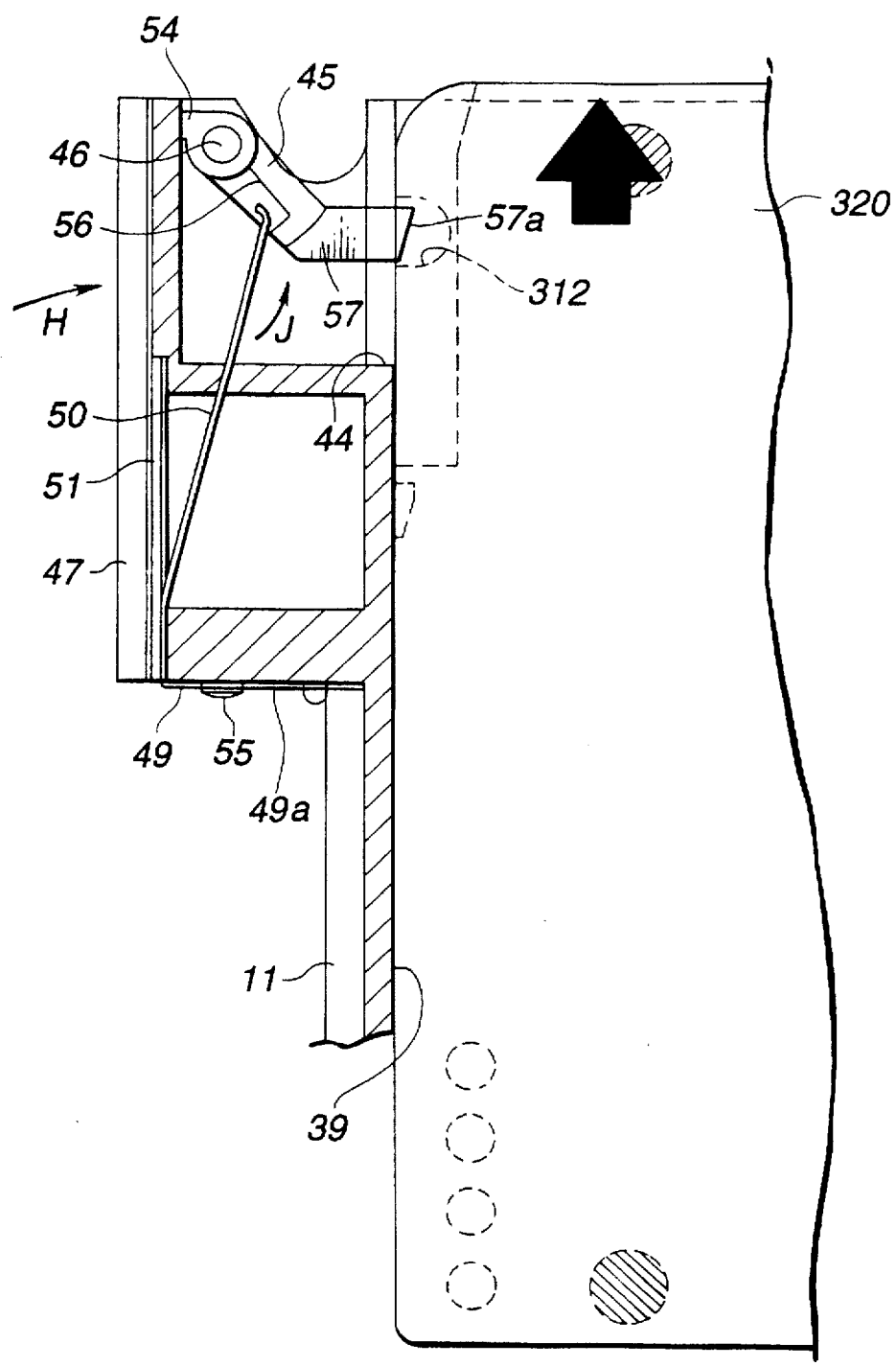
FIG. 12 is an enlarged schematic transverse cross-sectional view showing the state of the engagement member when the disc cartridge has been inserted into the magazine for the disc cartridge.

The engagement member 45, which has been rotationally biased in a direction shown by arrow H in FIG. 9 by the thrusting piece 50 protruded via the slit 51 into the containing section 47, has its retention lug 54 at its proximal end retained by the inner wall of the containing section 47, so that the engagement member has its rotational position limited in the direction shown by arrow H in FIG. 9 at a position in which the engagement portion 57 is protruded a pre-set amount into the locus of movement of the disc cartridge 320 or 321 within the housing section 39. Thus, each engagement member 45 is thrust by the thrusting piece 50 and thereby has its engagement portion 57 protruded a pre-set distance into the locus of movement of the disc cartridge 320 or 321 within the housing section 39, so that, when the disc cartridge 320 or 321 is introduced from the aperture 11f in the rear surface of the magazine main member 11a into the inside of the housing section 39, an inserting side corner of the disc cartridge 320 or 321 is caused to bear on the engagement portion 57. When the engagement member 45 is at the initial position of FIG. 10 in which the engagement member 45 has been thrust by the thrusting piece 50, the end face of the engagement portion 57 presents a surface 57a which is inclined in a direction of facing the inserting end of the disc cartridge 320 or 321 inserted via the inserting end of the disc cartridge 320 or 321 introduced via the aperture 11e of the magazine main member 11a. When the disc cartridge 320 or 321 is further introduced into the housing section 39, each engagement member 45 has its inclined surface 57a thrust so that the engagement portion 57 is rotated in a direction of being receded out of the housing section 39 against the bias of the thrusting piece 50 as shown by arrow J in FIG. 11. When the disc cartridge 320 or 321 is further introduced as shown by arrow A in FIG. 11, the engagement portion 57 formed at the distal end of the engagement member 45 faces the engagement recess 312 formed in the cartridge main member 305, 316. When the engagement portion 57 faces the engagement recess 312, the rotational bias acting against the bias of the thrusting piece 57 is reduced to zero, so that the engagement member 45 is rotationally biased in the direction shown by arrow H in FIG. 12 under the bias of the thrusting piece 50 and hence the engagement portion 57 is again engaged with the engagement recess 312.

By the engagement portion 57 engaged in the engagement recess 312, the disc cartridge 320 or 321 inserted into the housing section 39 is controlled in its movement towards the aperture 11e of the front surface of the magazine main member 11a so that the disc cartridge is held in a condition in which it is housed at a pre-set position in the housing section 39. On the other hand, the engagement member 45 is rotated by the disc driving unit 8 in a direction opposite to that shown by arrow J in FIG. 12, against the bias of the thrusting piece 50, as later explained, for disengaging the engagement portion 57 out of the engagement recess 312 of the disc cartridge 320 or 321. The disc cartridge 320 or 321, disengaged from the engagement member 45, may now be extracted via the front side aperture 11e of the magazine main member 11a, as indicated by arrow K in FIG. 9.

The magazine for the disc cartridge 11 can accommodate ten disc cartridges 320 or 321 in a stacked condition, as discussed previously. With the magazine for the disc cartridge 11, the disc cartridge 320 or 321 can be inserted into or detached out of the housing section 39 via the rear side aperture 11f of the magazine main member 11a.

The disc cartridge 320 or 321, thus housed within the housing section 39, may be extracted out of the magazine main member 11a via the front side aperture in the magazine main member 11a by rotating the engagement member 45 in the direction of receding the end engagement portion 57 out of the housing section 39. Meanwhile, the engagement member 45 may be rotated in a direction of being receded out of the housing section 39 as indicated by arrow J in FIG. 9, so that, when the disc cartridge 320 or 321 is inserted via the front side aperture 11e of the magazine main member 11a, the engagement member 45 is thrust by the disc cartridges 320 or 321 so as to be rotated against the bias of the thrusting piece 50 in a direction in which the engagement portion 57 is receded out of the housing section 39. Thus the disc cartridge 320 or 321 may be housed within the housing section 39 via the front side aperture 11e in the front side of the magazine main member 11a.

Figure 6:
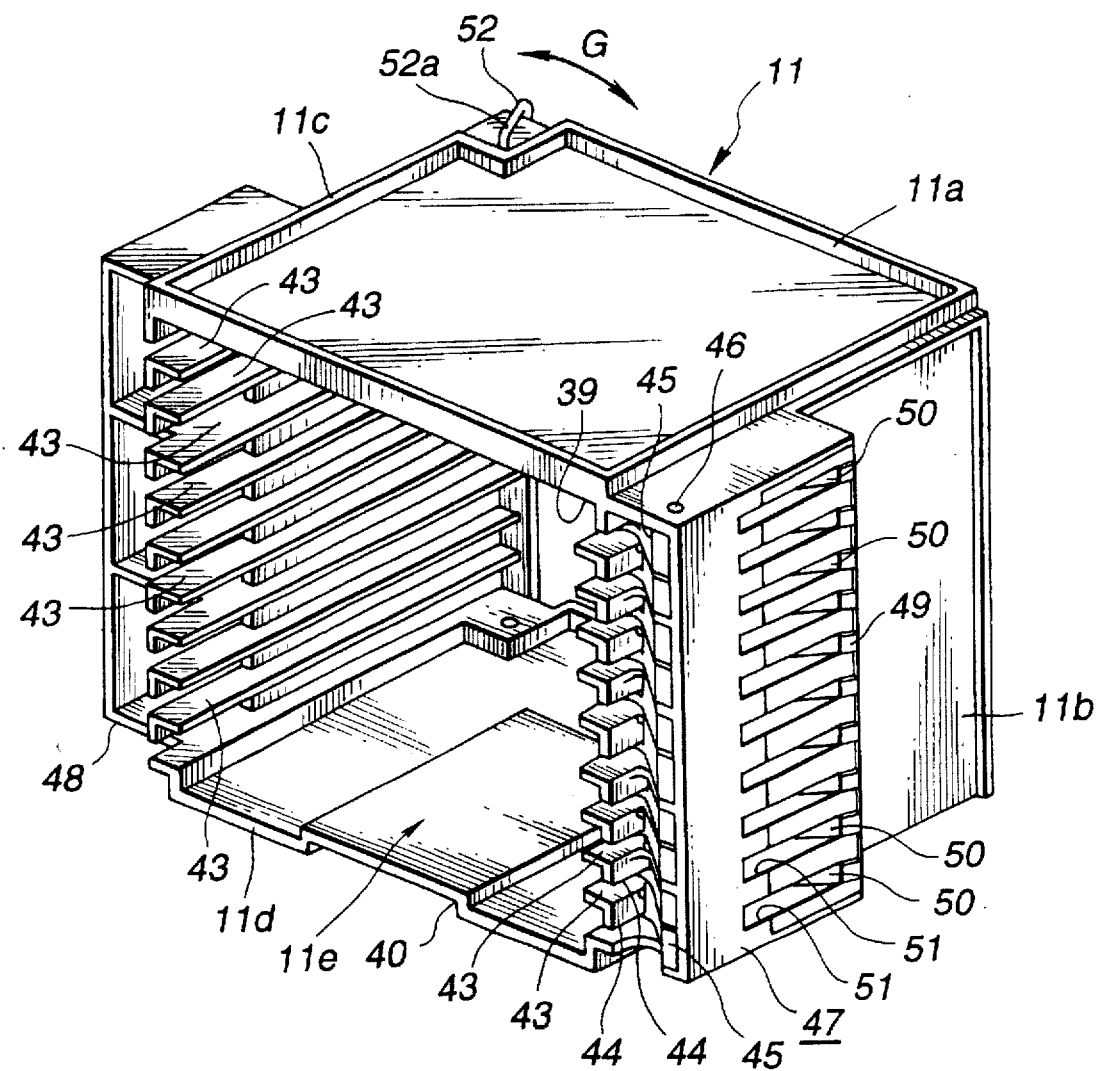
FIG. 6 is a perspective view showing a magazine for a disc cartridge constituting the disc recording and/or reproducing apparatus according to the present invention.

In a bottom surface lid of the magazine main member 11a delimiting the housing section 39 of the magazine for the disc cartridge 11 is formed an engagement recess 40 extending from the front surface as far as a mid portion on the rear surface of the casing 11a, as shown in FIG. 6. The engagement recess 40 is employed for supporting the magazine 11 on the turntable 15 by fitting a fitting portion on a support member 36 provided on the turntable 15 in the engagement recess.

If the disc cartridge 320 or 321 has been inserted in a mistaken manner into the magazine 11, that is if the disc cartridge has been inserted from a direction in which the engagement recess 312 formed on the cartridge main member 305, 316 is not in registration with the engagement portion 57 of the engagement member 45, the engagement portion 57 is not engaged with the engagement recess 312 but is protruded via the front side aperture 11e in the magazine 11, thus allowing the user to recognize that the disc cartridge is being inserted from the mistaken direction.

Figure 13:
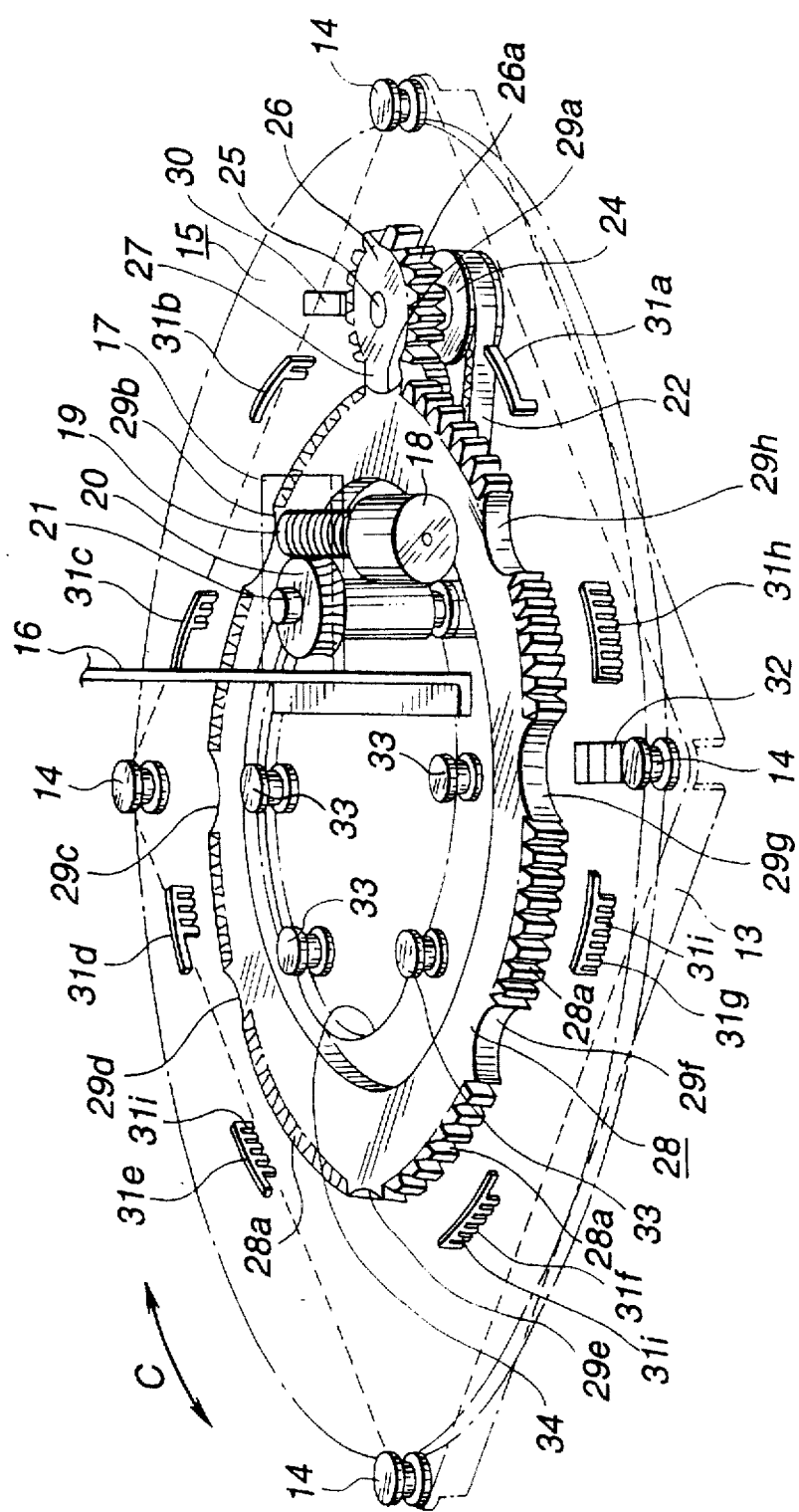
FIG. 13 is a perspective view showing a turntable mechanism on which the magazine for the disc cartridge is mounted.

The turntable 15, on which is mounted the above-described magazine for the disc cartridge 11, is disc-shaped, and is supported for rotation at four peripheral portions thereof by four supporting rolls 14 rotatably mounted via supporting shafts 35, set upright at respective corners of a main chassis 13, as shown in FIG. 13. The turntable 15 has its mid portion formed with a circular aperture 34 the inner rim of which is supported by plural support rolls 33 rotatably mounted via supporting shafts 33a set upright on the main chassis 13. Thus the turntable 15 is supported on the main chassis 13 so as to be rotated by being guided by supporting rolls 14, 33.

Figure 14:
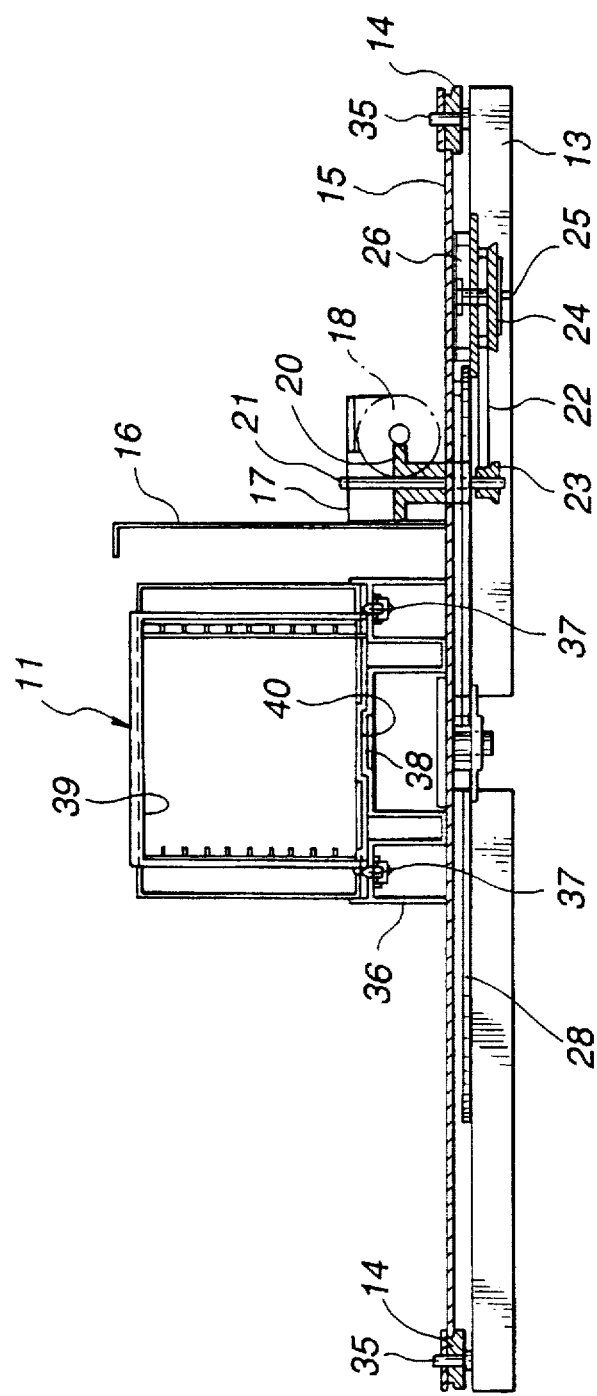
FIG. 14 is a front view of the turntable mechanism on which the magazine for the disc cartridge is mounted, with a portion of the turntable mechanism being broken away.
Figure 15:
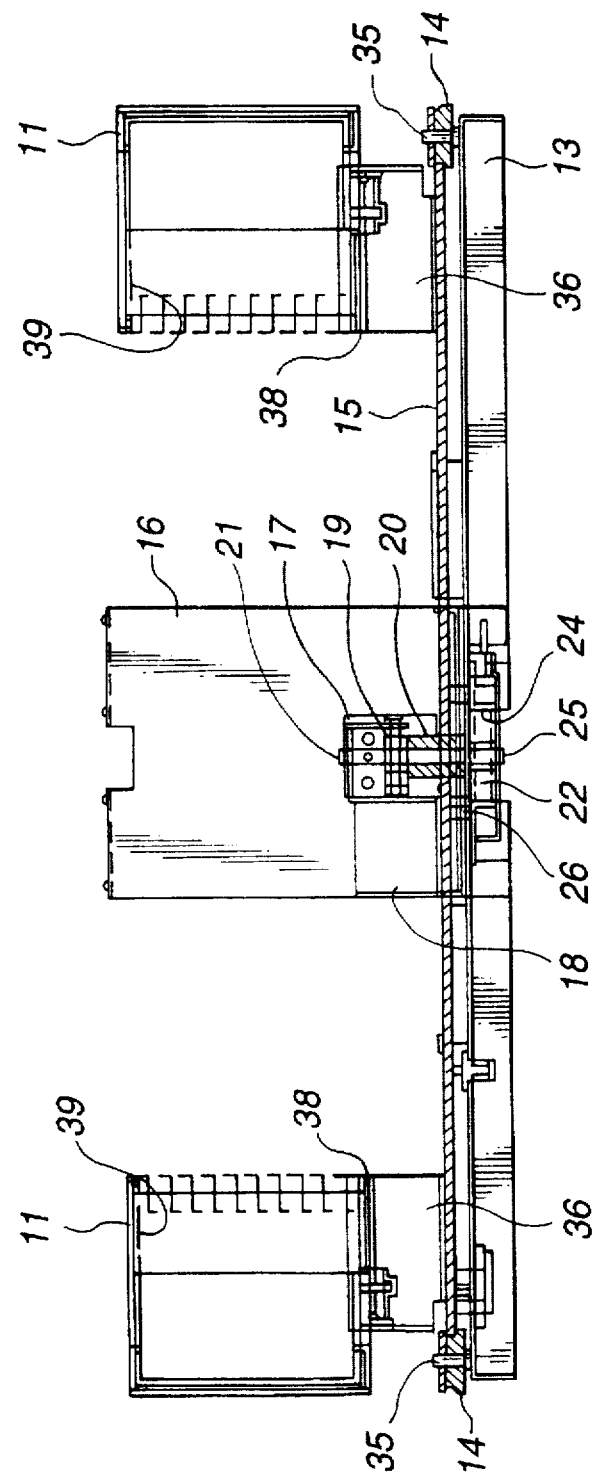
FIG. 15 is a side view of the turntable mechanism on which the magazine for the disc cartridge is mounted, with a portion of the turntable mechanism being broken away.

On the turntable 15 are mounted eight supporting members 36 at an equal interval in the circumferential direction of the turntable 15, as shown in FIGS. 14 and 15. On the upper surface of each supporting member 36 is formed an engagement protrusion 38 engaged in the engagement recess 40 formed in the magazine for the disc cartridge 11. The magazine for the disc cartridge 11 is mounted on the turntable 15 by engaging the engagement protrusion 38 in the engagement recess 40. The engagement protrusion 38 has engagement pins 37, 37 which may be emerged or receded and which are adapted for being engaged in engagement recesses in the bottom surface of the magazine for the disc cartridge 11 for positioning the magazine 11 with respect to the supporting member 36.

Figure 17:
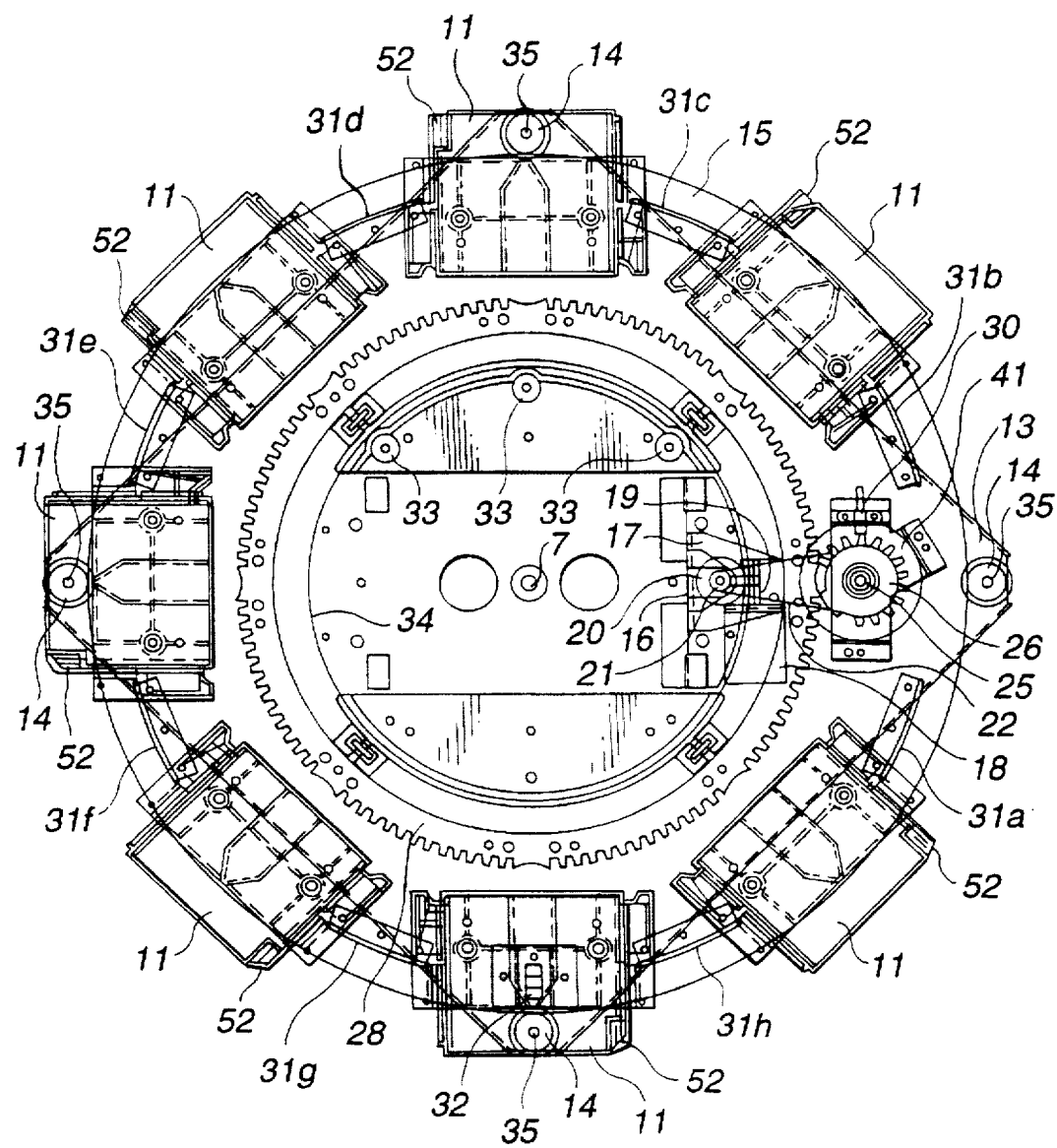
FIG. 17 is a plan view showing the state in which the magazine for the disc cartridge has been loaded on the turntable mechanism.

For supporting the magazine for the disc cartridge 11 by the supporting member 36, the magazine for the disc cartridge 11 is set on the supporting member 36 so that the front side aperture 11e of the magazine main member 11a is directed to the inner periphery of the turntable 15, and the engagement protrusion 38 is progressively engaged in the engagement recess 40. When the magazine for the disc cartridge 11 is mounted on the associated supporting member 36, the magazine for the disc cartridge 11 is oriented so that the front side aperture 11e is directed towards the inner periphery of the turntable 15 as shown in FIG. 15. In this manner, a number of the magazines 11 may be toroidally arranged on the turntable 15, as shown in FIG. 17.

The turntable 15, having the magazines 11 mounted thereon by the respective supporting members 36, is rotationally driven by a driving motor 18 mounted on the main chassis 13. The driving motor 18 is mounted via a motor attachment plate 17 set upright on the main chassis 13 so as to be protruded upwards via the circular aperture 34 in the turntable 15, as shown in FIG. 13. A pair of such support plates 16, also serving as the lift mechanism as later explained, are mounted on the main chassis 13 so as to be parallel to each other. Thus the motor attachment plate 17 is set upright on one of the supporting plates 16.

The driving motor 18 is mounted on the motor attachment plate 17 so that its driving shaft runs parallel to the major surface of the main chassis 13. The distal end of the worm gear 19 carries a worm gear 19 meshing with a worm wheel 20 rotatably mounted via a supporting shaft 21 set upright on the motor attachment plate 17. The worm wheel 20 has its rotary shaft extending at right angles to the major surface of the turntable 15 and is formed with a first spur gear 23 via a coaxial columnar portion extending to the lower side. The first spur gear 23 is protruded towards the lower side of the main chassis 13 via a through-hole formed in the main chassis 13, as shown in FIG. 14.

On the lower surface of the main chassis 1 is formed a second spur gear 24 via a rotary shaft 25 mounted near the first spur gear 23 towards the lateral edge of the main chassis 13. A timing belt 22 is mounted between the first and second spur gears 23 and 24. When the driving motor 18 is run in rotation, the second spur gear 24 is rotated via the worm gear 20, the first spur gear 23 and the timing belt 22.

The rotary shaft 25 supporting the second spur gear 24 is passed through the main chassis 13 to reach the upper surface of the main chassis 13. On the upper end of the rotary shaft 25 is mounted a driving gear 26 having its outer periphery formed with an engagement lug 27, as shown in FIG. 13. The end face of the engagement protrusion 27 is an arcuate surface having a rotary shaft 25 as the center. The driving gear 26 has a gear portion 26a in its portions other than the engagement lug 27.

Figure 16:
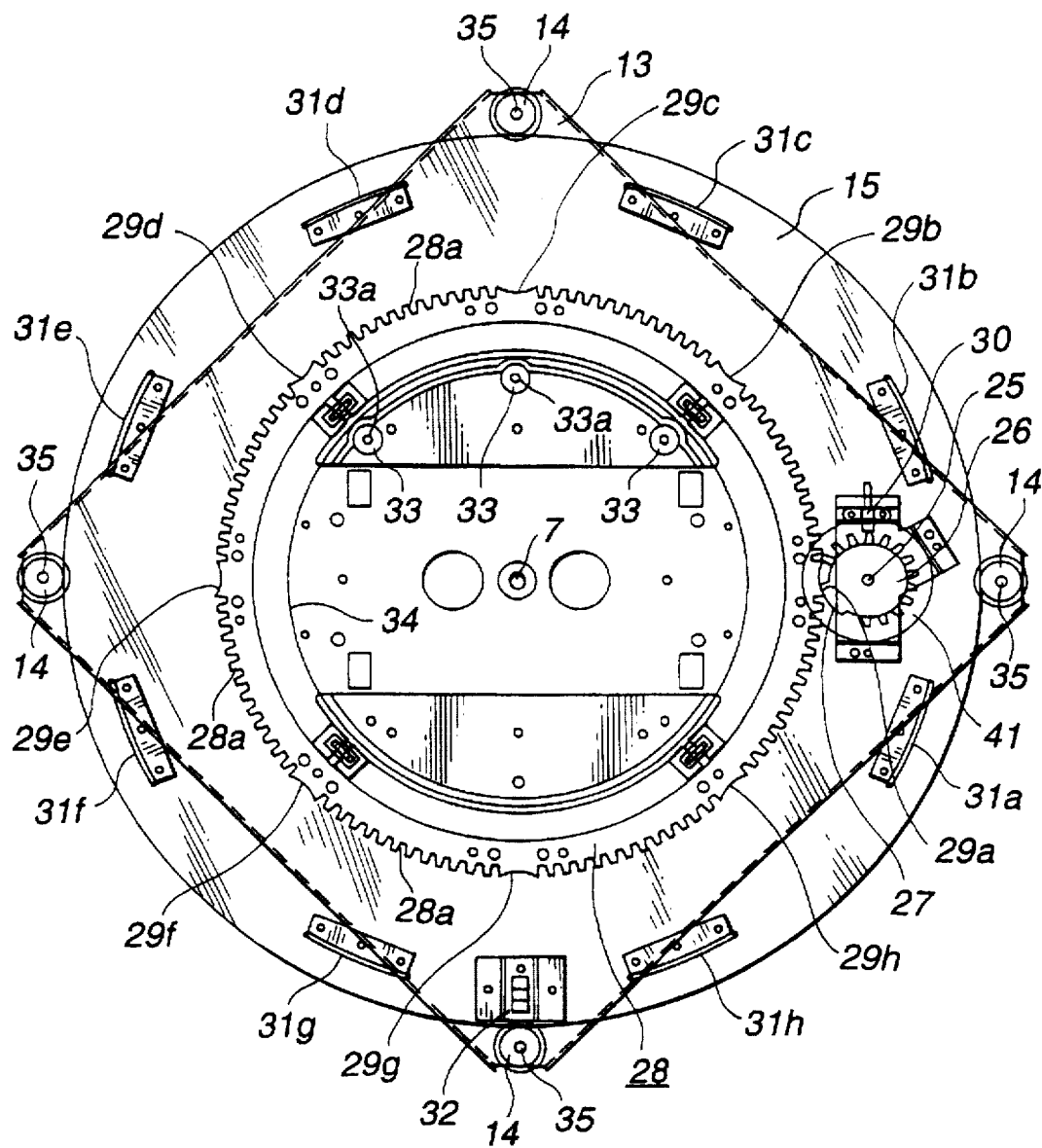
FIG. 16 is a plan view showing the turntable mechanism.
Figure 18:
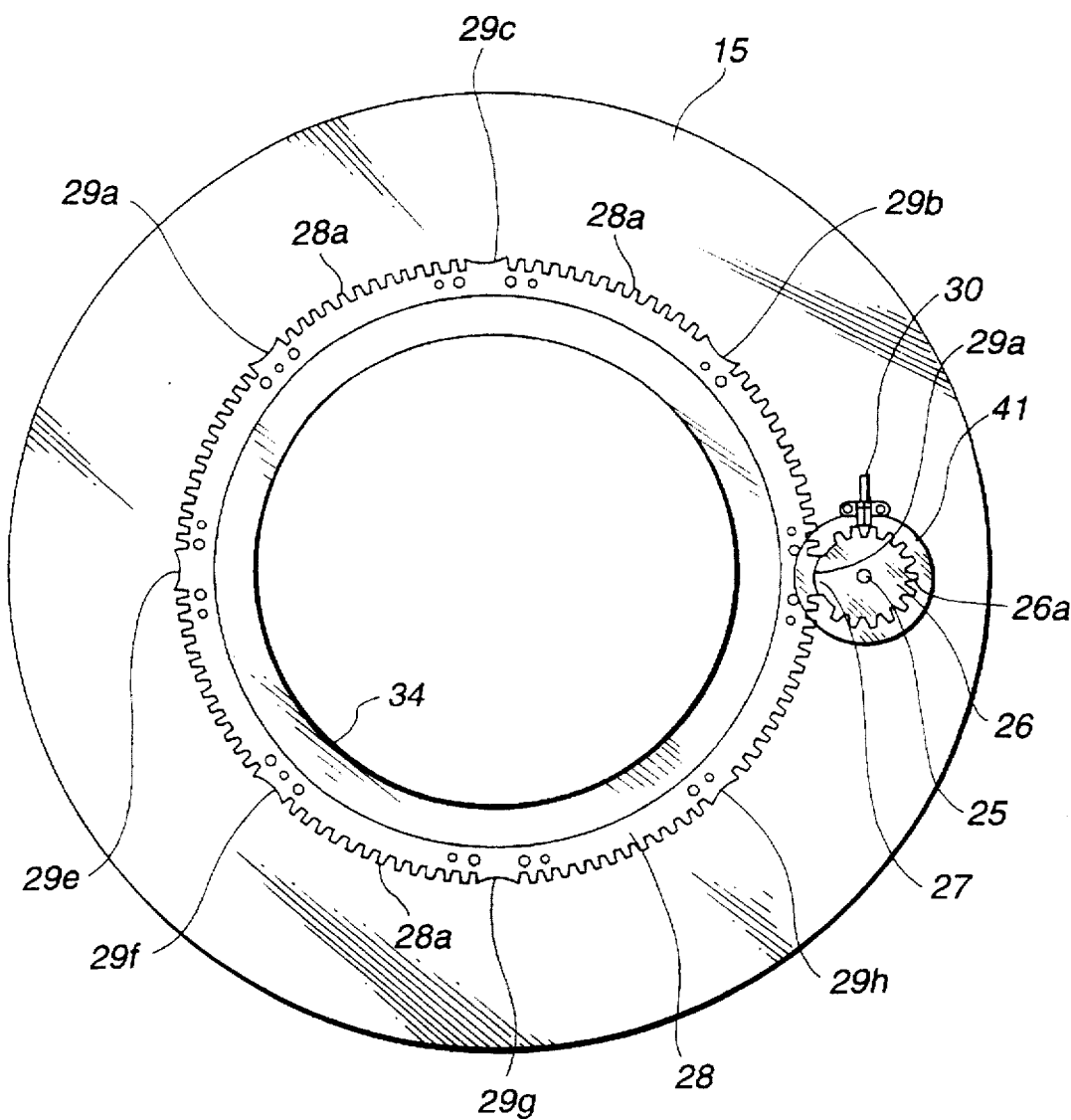
FIG. 18 is a plan view showing a driving gear and a ring gear making up the turntable mechanism.

On the lower surface of the turntable 15 is formed a ring gear 28 coaxial as the turntable 15, as shown in FIGS. 13, 16 and 17. The ring gear 28 constitutes the follower gear meshing with the driving gear 26. On the outer peripheral surface of the ring gear 28 is formed a gear portion 28a meshing with the driving gear 26 and first to eighth engagement recesses 29a to 29h engaged with an engagement protrusion 27 formed on the driving gear 26. These engagement recesses 29a to 29h are formed at an interval of 45° in the circumferential direction of the ring gear 28. These engagement recesses 29a to 29h are formed on a curved surface having the same radius of curvature as the engagement lug 27 provided on the driving gear 27. Thus, when the ring gear 28 is engaged with the driving gear 26, the engagement recesses 29a to 29h constitute a portion of a circumference of a circle centered about the supporting shaft 25 supporting the driving gear 26. In the initial state shown in FIG. 18 in which the engagement lug 27 is engaged with the first engagement recess 29a, the engagement lug 27 is engaged with the engagement recesses 29a to 29h with its arcuate end face kept in contact with the bowed bottom surface of the engagement recess 29a.

Figure 19:
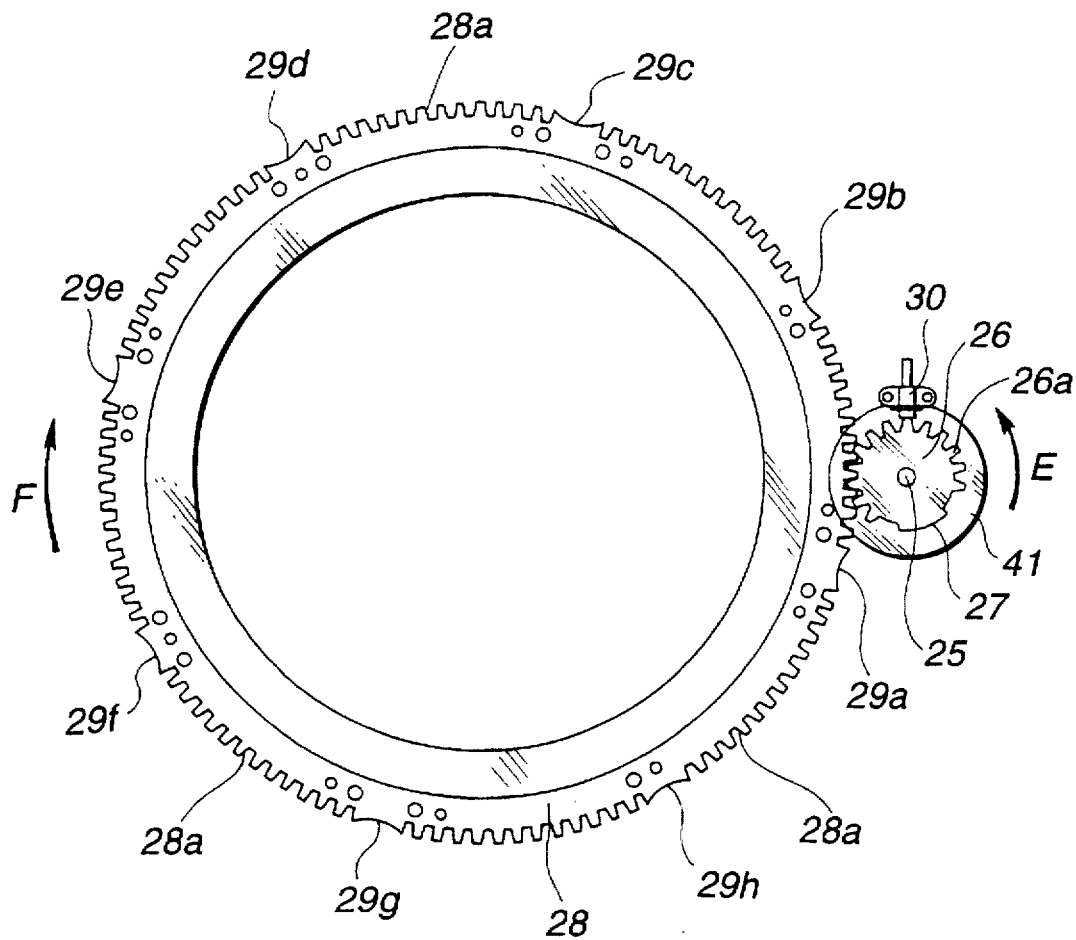
FIG. 19 is a plan view showing the ring gear having been rotated through 15°.
Figure 20:
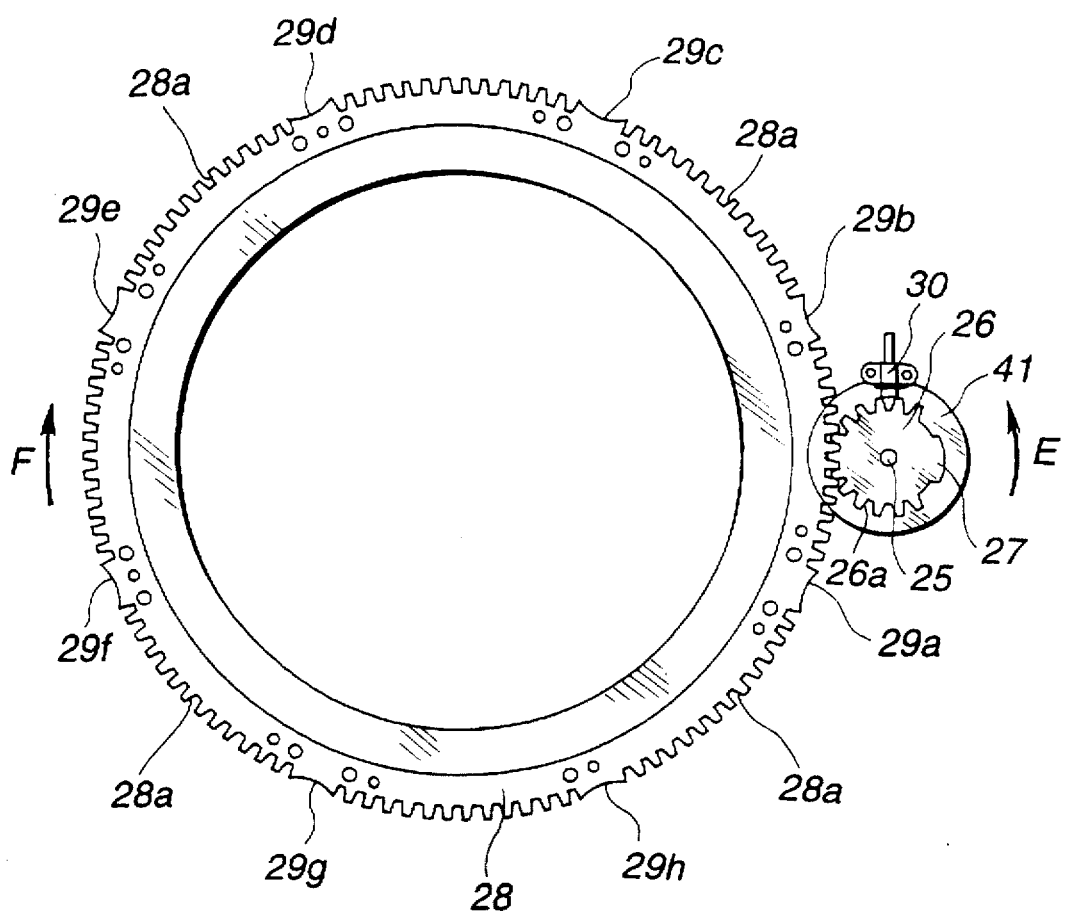
FIG. 20 is a plan view showing the ring gear having been rotated through 22.5°.
Figure 21:
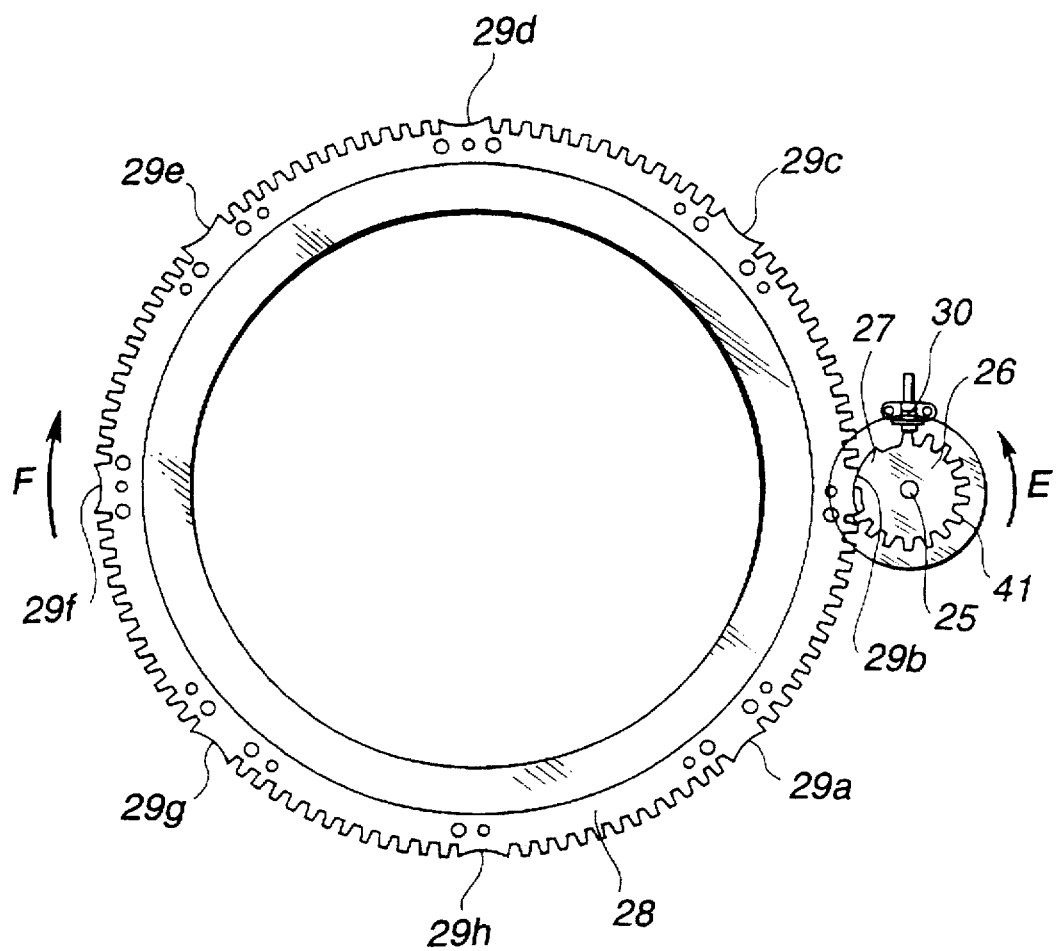
FIG. 21 is a plan view showing the ring gear having been rotated through 45°.

With the ring gear 28, the number of teeth formed between the first to eighth engagement recesses 29a to 29h is set so as to be equal to the number of teeth of the gear portion 26a of the driving gear 26. That is, when the driving gear 26 performs one complete revolution from the initial state shown in FIG. 18 in which the engagement lug 27 provided on the driving gear 26 is engaged with the first engagement recess 29a, the ring gear 28 is rotated 45° in the direction shown by arrow F in FIGS. 19 to 21 so that the engagement lug 27 on the driving gear 26 is engaged in the second engagement recess 29b. Thus the ring gear 28 is rotated 45° each time the driving gear 26 performs one complete revolution for sequentially engaging the engagement lug 27 in the first to eighth engagement recesses 29a to 29h.

When the engagement lug 27 on the driving gear 26 is engaged in one of the first to eighth engagement recesses 29a to 29h, the rotation of the turntable 15 is controlled unless the driving gear 26 is rotated by the driving motor 18.

The turntable 15 is rotated in unison with the ring gear 28, by driving rotation of the driving gear 26. By the engagement lug 27 of the driving gear 26 with one of the first to eighth engagement recesses 29a to 29h formed in the ring gear 28, the magazine 11 placed in registration with that one of the first to eighth engagement recesses 29a to 29h which is engaged with the engagement lug 27 is caused to face the disc driving unit 8. Since the disc recording and/or reproducing apparatus of the present embodiment has a pair of disc driving units 8, two of the magazines for the disc cartridges 11 are caused to simultaneously face the disc driving units 8, 8.

On the turntable 15 are provided first to eighth discrimination detection units 31a to 31h, in association with the first to eighth engagement recesses 29a to 29h formed on the ring gear 28, for discriminating these first to eighth engagement recesses 29a to 29h. These first to eighth discrimination detection units 31a to 31h are provided on the turntable 15 for facing the gear portions 28a of the ring gear 28 associated with the first to eighth engagement recesses 29a to 29h, respectively. These first to eight discrimination detection units 31a to 31h are provided with comb-shaped discrimination detection pieces 31i, as shown in FIG. 13. The number of the respective discrimination detection pieces 31i formed in the first to eighth discrimination detection units 31a to 31h differs from one discrimination detection piece to another. Specifically, the number increases sequentially by one beginning from the first discrimination detection pieces 31a, such that one discrimination detection piece 31i is formed in the first discrimination detection unit 31a and eight discrimination detection pieces 31i are formed in the eighth discrimination detection unit 31a. The first to eighth discrimination and detection units 31a to 31i are arranged so that the comb-shaped discrimination pieces 31i are located on the circumference of one and the same circle centered about the center of rotation of the turntable 15.

On the main chassis 13 is arranged a detection unit 32 constituted by a photosensor, such as a photocoupler, for detecting the first to eighth discrimination detection units 31a to 31h rotated in unison with the rotating turntable 15. The detection unit 32 is arranged on the locus of rotational movement of the first to eighth discrimination detection units 31a to 31h for detecting and discriminating the first to eighth discrimination detection units 31a to 31h travelling on the detection unit 32. The detection output of each of the first to eighth discrimination detection units 31a to 31h discriminated and detected by the detection unit 32 is inputted to a driving control circuit, not shown, for controlling the driving of the apparatus in its entirety.

On the main chassis 13 is mounted a rotation detection sensor 30 in the vicinity of the driving gear 26 for detecting the rotational angular position of the driving gear 26. The rotation detection sensor 30 detects that the engagement lug 27 provided on the driving control gear 26 is directed to the ring gear 28, that is the engagement lug 27 is engaged with one of the first to eighth engagement recesses 29a to 29h formed on the rig gear 28, and issues a detection output which is inputted to the driving control circuit.

The driving control circuit, to which detection outputs of the detection unit 32 and the rotation detection sensor 30 are inputted, is capable of determining, based on detection outputs of the detection unit 32 and the rotation detection sensor 30, which of the magazines for the disc cartridges 11 on the turntable is directed to the disc driving unit 8.

A number of engagement lugs 27, instead of one, may be provided on the outer periphery of the driving gear 26. In such case, gear porions 26a need to be provided between neighboring engagement lugs 27.

The disc driving unit 8, on which the disc cartridge 320 or 321 housed within the magazines for the disc cartridge 11 mounted on the turntable 15 is selectively loaded for recording/reproducing the information signals, such as music signals, on or from the magneto-optical disc or the optical disc, housed within the disc cartridge 320 or 321, includes a housing 8a having a top plate 126, a bottom plate 58 and a pair of side plates 123, 123 interconnecting opposing sides of the top plate 126 and the bottom plate 58. A front plate 66 is formed upright on one end of the bottom plate 58 on the left front side of the housing 8a in FIG. 22. The front plate 66 is formed with such a height defining a gap for insertion of the disc cartridge 320 or 321 between it and the top plate 126. This gap delimits an entry/exit opening for the disc cartridge 320 or 321.

On the bottom plate 58 of the housing 8a is mounted for vertical movement an attachment substrate 59 of the recording/reproducing unit substantially in the form of a flat plate. On the attachment substrate 59 are mounted a disc table 60 for loading a disc housed within the disc cartridge 320 or 321, cartridge positioning pins 63 and 64, and cartridge supporting pins 65, 65, as shown in FIGS. 23 to 28. The cartridge positioning pins 63 and 64 and the cartridge supporting pins 65, 65 are provided in registration with the corners of the lower surface of the disc cartridge 320 or 321.

The disc table 60 is mounted on a driving shaft of a spindle motor 190 mounted on the lower surface of the attachment substrate 59 for constituting the disc rotating driving mechanism. The driving shaft of the spindle motor 190 is protruded from the upper surface of the attachment substrate 59 via a through-hole bored in the attachment plate 59. The disc table 60 is substantially disc-shaped and is adapted for being intruded into the inside of the cartridge main member 305, 316 via a center opening 313 formed in the disc cartridge 320 or 321 loaded on the attachment plate 59. The disc table 60 has in its upper surface a projection engaging in a center hole 304 of the disc and has mounted thereon a magnet, not shown, for attracting the chuck plate 302. When intruded into the inside of the cartridge main member 305 or 316 via the center opening 313 in the disc cartridge 320 or 321, the disc table 60 supports the rim of the center hole 304 of the disc near its outer rim, while engaging the projection in the center hole 304. In addition, the disc table attracts the chuck plate 302 by the magnet for positioning and holding the magneto-optical disc or the optical disc housed within the cartridge main member 305 or 316. The magneto-optical disc or the optical disc thus loaded on the disc table 60 is rotated in unison with the disc table 60 by rotational driving of the spindle motor 190.

The cartridge positioning pins 63, 64, set upright on the attachment substrate 59, are conically shaped so as to be tapered towards the distal ends. When the disc cartridge 320 or 321 is loaded on the cartridge loading unit on the attachment substrate 59, the cartridge positioning pins 63, 64 are engaged in the positioning holes 310, 310 formed in the lower surfaces of the cartridge main members 305, 316 for setting the loading position of the disc cartridge 320 or 321. The cartridge positioning pins 65, 65 are columnar-shaped with planar end faces and are set on the attachment substrate 59. These cartridge supporting pins 65, 65 support the corners of the lower surface of the disc cartridge 320 or 321 loaded on the attachment substrate 59 for setting the loading height position relative to the attachment substrate 59.

On the lower surface of the recording/reproducing unit attachment substrate 59 is mounted an optical pickup 61. The optical pickup 61 includes a light source, such as a semiconductor laser, for radiating a light beam to the disc loaded on the disc table 60, an objective lens for condensing the light beam outgoing from the disc for radiating the condensed light on the disc, and a light receiving device, such as a photodetector, for detecting the return light reflected from the disc for detecting the information signals recorded on the disc. The optical pickup device 61 is movably supported on a shaft 188 arranged on the lower surface of the attachment substrate 59 and is guided by a pickup feed unit, not shown, along the shaft 188 so as to be moved along the radius of the magneto-optical disc or the optical disc loaded on the disc table 60. The optical pickup 61 causes the objective lens to face the upper surface of the attachment substrate 59 via an aperture 62 formed in the attachment substrate 59.

On the optical pickup 61, there is mounted, via a supporting arm 156, a magnetic head device 155 movable in unison with the optical pickup 61. The head supporting arm 156 is mounted via a rotary shaft 187 on the distal end of an arm supporting plate 156a mounted on the optical pickup 61 so that the distal end of the arm supporting plate is projected on the upper surface of the attachment substrate 59. Since the head arm 156 is mounted for being extended over the upper surface of the attachment substrate 59, the magnetic head device 155 mounted at the distal end of the head arm via a gimbal spring faces the objective lens of the optical pickup 61. By rotation of the head supporting arm 156 about the rotary shaft 187 as the center of rotation, the magnetic head device 155 is moved in a direction towards and away from the objective lens.

On the attachment substrate 59, the disc cartridge 320 or 321 is loaded in position with the aid of the cartridge positioning pins 63, 64 so that the magneto-optical disc or the optical disc is loaded in position on the disc table 60. When the disc cartridge 320 housing the magneto-optical disc capable of re-recording information signals is loaded on the attachment substrate 59, the objective lens of the optical pickup 61 and the magnetic head device 155 approach and face each other with the magneto-optical disc in-between. If the recording/reproducing apparatus of the embodiment illustrated is set to the recording mode, the magnetic head device 155 is intruded via the recording/reproducing aperture 323 into the inside of the main cartridge member 305 for being in sliding contact with the magneto-optical disc. On the other hand, if the disc cartridge 321 housing the replay-only optical disc is loaded on the attachment substrate 59, the magnetic head device 155 is held at a position spaced apart from the disc cartridge 321 so that only the optical pickup 61 is caused to face the optical disc via the recording/reproducing aperture 322.

Consequently, with the present disc recording/reproducing apparatus, when the disc cartridge 320 housing the magneto-optical disc capable of re-recording information signals is loaded on the attachment substrate 59, information signals may be recorded on or reproduced from the magneto-optical disc. On the other hand, if the disc cartridge 321 housing the replay-only optical disc is loaded on the attachment substrate 59, simply the information signals, such as music signals, pre-recorded on the optical disc, may be reproduced.

Figure 23:
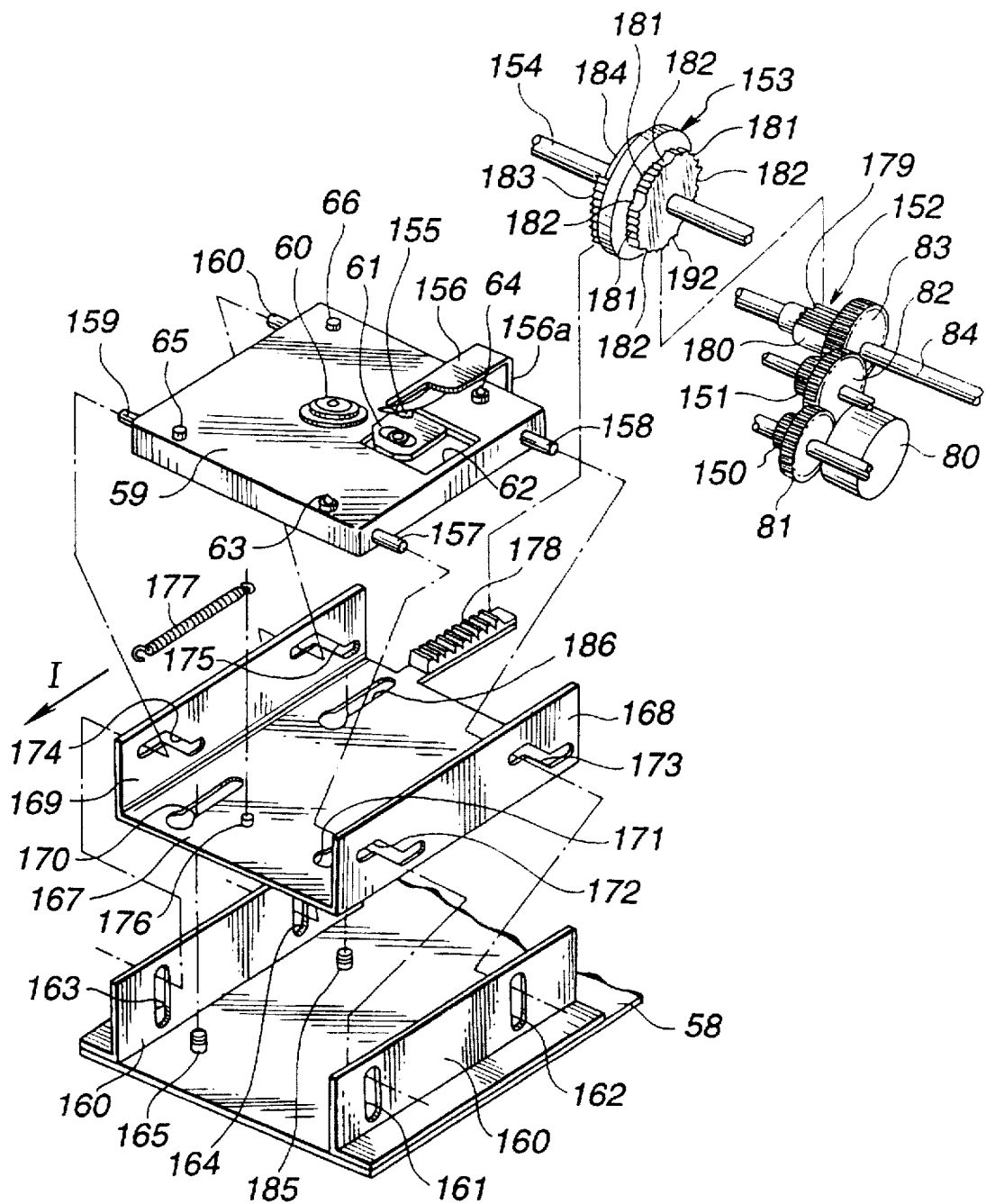
FIG. 23 is an exploded perspective view showing a recording/reproducing unit of the disc driving unit.

On opposite lateral sides of the attachment substrate 59 are protuberantly formed pairs of supporting pins 157, 158 and 159, 160, as shown in FIG. 23. These supporting pins 157, 158 and 159, 160 are introduced into guide holes 161, 162 and 163, 164 bored in guide plates 160, 160 formed upright on both opposite sides of a bottom plate 58 of the housing 8a. These guide holes are formed parallel to one another along the height of the guide plates 160. The attachment substrate 59 is movable vertically in a direction towards and away from the bottom plate 58 by shifting the supporting pins 157 to 160 through these guide holes 161 to 164.

A slide plate 167 is mounted between the bottom plate 58 and the attachment substrate 59. The slide plate 167 is formed on its opposite sides with a pair of side plates 168, 169. The slide plate 167 is formed with slide guide holes 170, 171 and 186 in which are engaged slide guide pins 165, 166, 185 set upright on the bottom plate 58. The slide plate 167 is arranged on the bottom plate 58 so as to be movable by being guided by the slide guide pins 165, 166 and 185 within the range of the slide guide holes 170, 171 and 186. The slide plate 167 is arranged on the bottom plate 58 by the side plates 168 and 169 being positioned between the attachment substrate 59 and the guide plates 160 and 160. The side plates 168 and 169 of the slide plate are formed with inclined guide grooves 172, 173 and 174, 175 passed through by supporting pins 157, 158 and 159, 160 provided on the attachment substrate 159. These inclined guide grooves 172, 173 and 174, 175 are gradually inclined from the forward ends towards the rear ends, as shown in FIG. 23, as shown in FIG. 23, so that, when the supporting pins 157, 158 and 159, 160 are positioned at the forward and rear ends of the inclined guide grooves 172, 173 and 174, 175, the attachment substrate 59 is located below the bottom plate 58 and raised above the bottom plate 58, respectively.

The slide plate 167 is biased to be moved towards the front side indicated by arrow I in FIG. 23 by a tension spring 177 mounted between a spring retainer 191 mounted on the front plate 66 and a spring retention pin 176. A rack gear 178 is mounted at the rear end of the slide plate 167 for being protruded towards the rear of the bottom plate 58.

Figure 34:
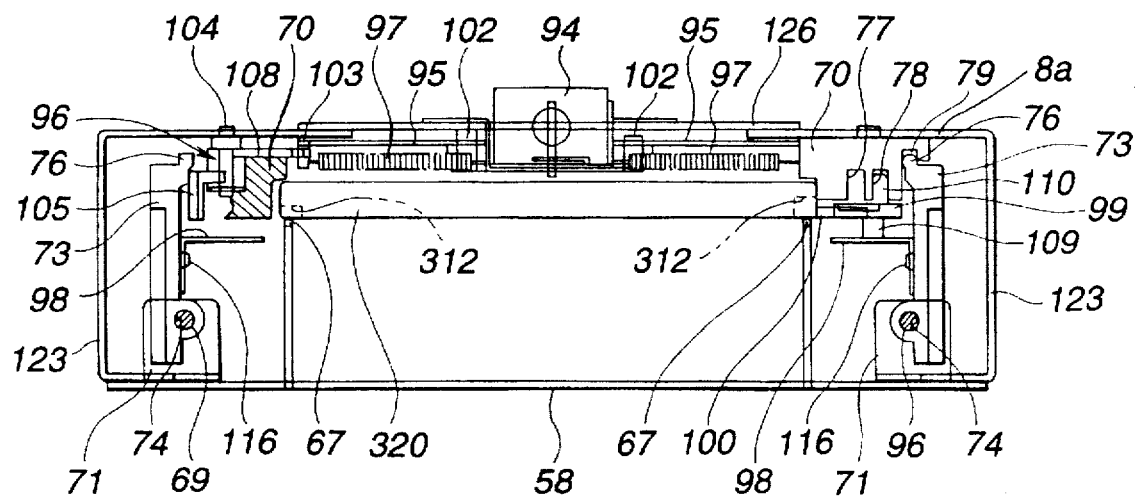
FIG. 34 is a schematic front view showing the disc cartridge transporting mechanism.
Figure 35:
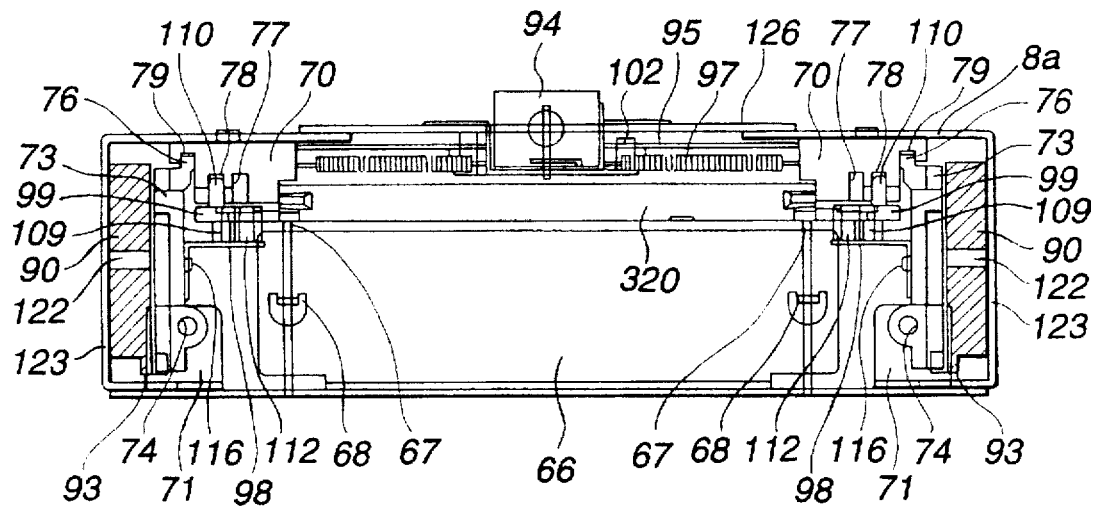
FIG. 35 is a schematic front view showing the disc driving unit, with a portion thereof being broken away.

On both sides of the attachment substrate 59 are arranged a pair of metal wires 67, 67 for extending on the bottom plate 58 in the fore-and-aft direction. The front sides of these wires 67, 67 are retained by retainers 68, 68 of the front plate 66 so as to be extended horizontally towards rear via the upper end of the front plate 66. The rear ends of the wires 67, 67 are retained by supporting pieces 72, 72 depending at the rear side of the bottom plate 58. On the wires 67, 67 is set the disc cartridge 320 or 321 inserted via the disc cartridge inserting aperture. On the lower surface of the top plate 126 are formed a pair of guide rails 70, 70 for extending in the fore-and-aft direction. The disc cartridge 320 or 321, set on the wires 67, 67, is clamped between the wires 67, 67 and the inner sides of the guide rails 70, 70 and is movable only in the fore-and-aft direction by being guided by the guide rails 70, 70, as shown in FIGS. 34 and 35.

Figure 25:
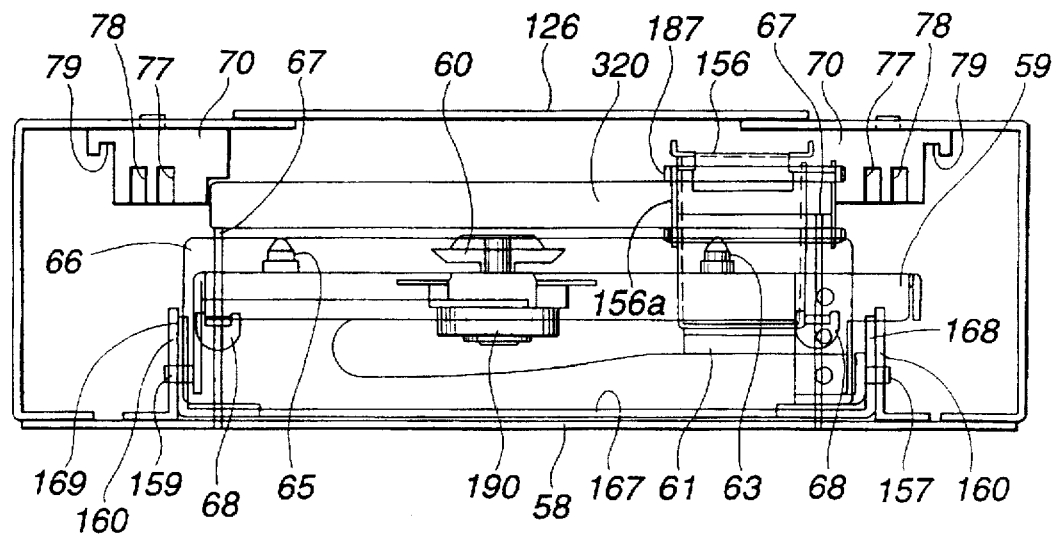
FIG. 25 is a front view showing a recording/reproducing unit of the disc driving unit.
Figure 26:
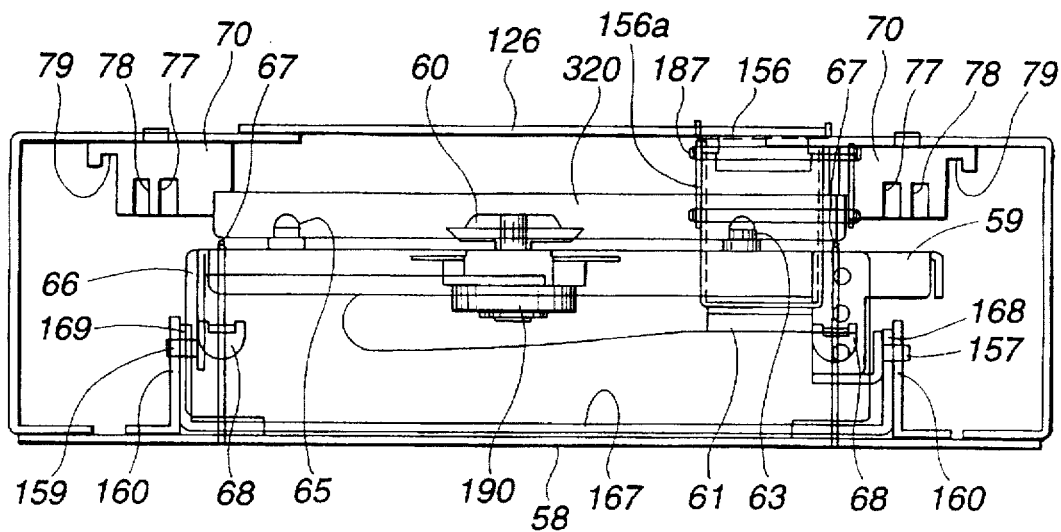
FIG. 26 is a front view showing the state in which a disc has been loaded on the recording/reproducing unit of the disc driving unit.
Figure 27:
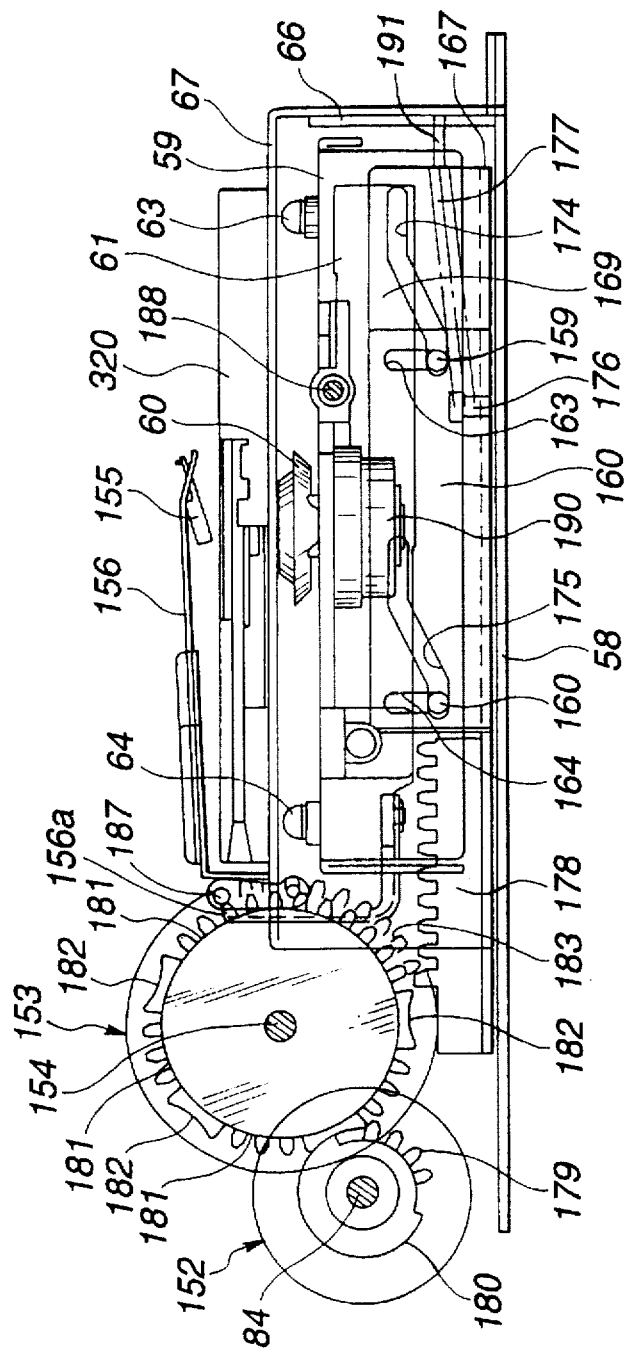
FIG. 27 is a side view showing the recording/reproducing unit of the disc driving unit.
Figure 28:
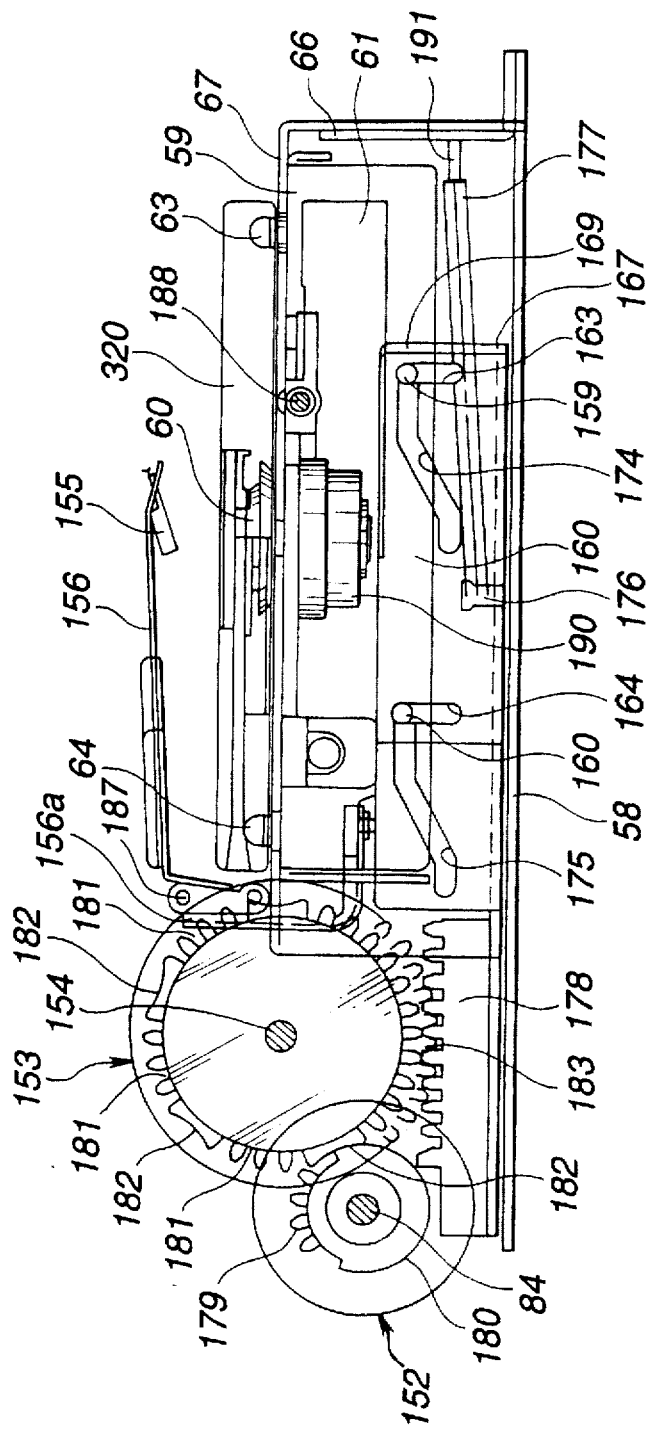
FIG. 28 is a side view showing the state in which the disc has been loaded on the recording/reproducing unit of the disc driving unit.

When at a position displaced away from the bottom plate 58, the attachment substrate 59 carrying the recording/reproducing unit is intruded into a space between the wires 67 and 67 for positioning the cartridge positioning pins 63, 64 and the cartridge supporting pins 65, 65 above the wires 67, 67. Thus, when the disc cartridge 320 or 321 is supported across the wires 67, 67, the disc cartridge 320 or 321 may be positioned and loaded on the cartridge loading unit on the attachment substrate 59, as a result of upward movement of the attachment substrate 59, as shown in FIGS. 26 and 28. When the attachment substrate 59 is moved towards the lower side of the bottom plate 58, the attachment substrate 59 is receded from the space between the wires 67, 67 for retreating the disc table 60, the cartridge positioning pins 63, 64 and the cartridge supporting pins 65, 65 to below the wires 67, 67. Consequently, the disc cartridge 320 or 321 set on the sires 67, 67 is movable on the wires 67, 67 without being set on the attachment substrate 59, as shown in FIGS. 25 and 27.

Meanwhile, the head supporting arm 156 and the magnetic head device 155 are positioned above the disc cartridge 320 or 321 set on the wires 67, 67 regardless of whether the attachment substrate 59 is at the upper position or at the lower position.

Figure 24:
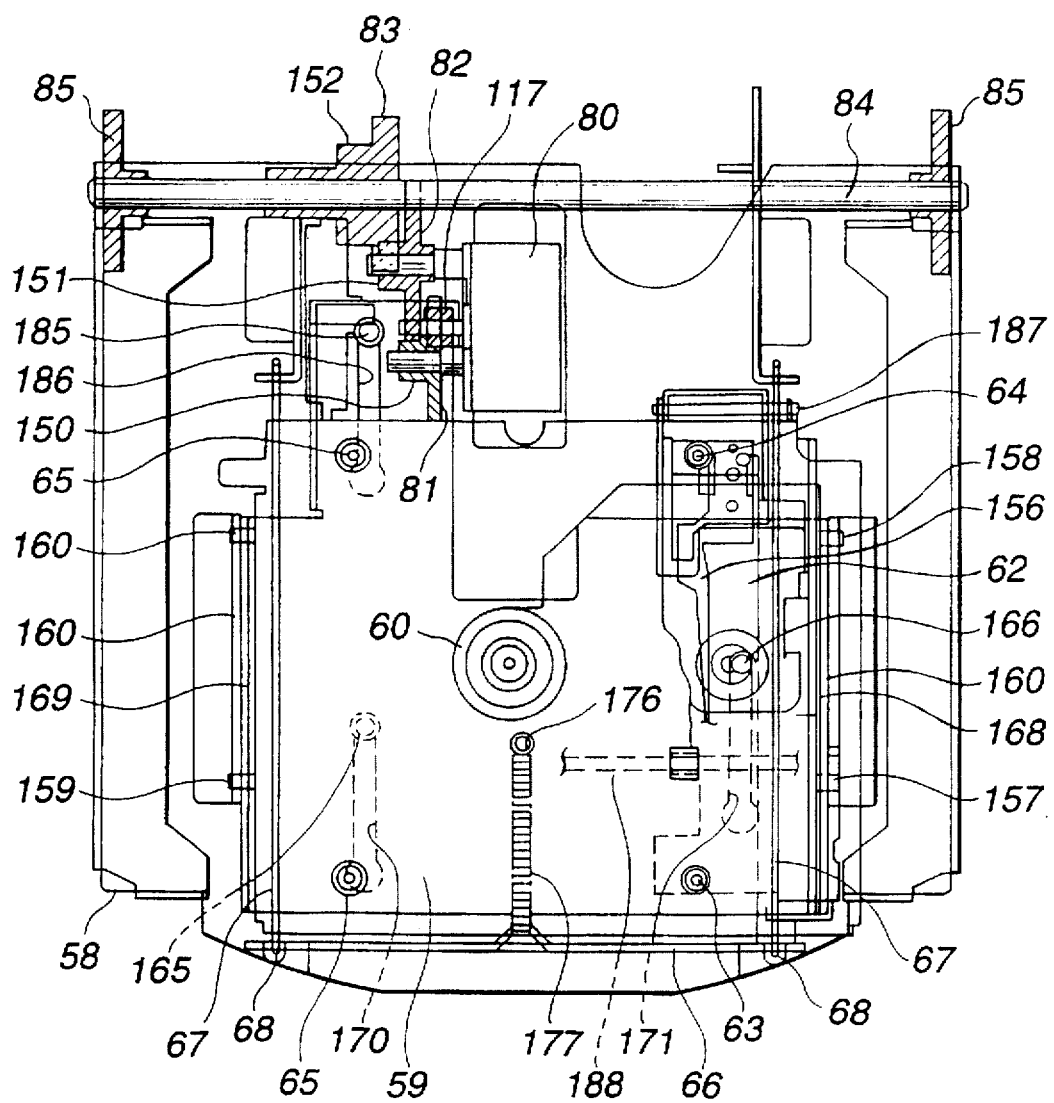
FIG. 24 is an exploded plan view showing a recording/reproducing unit of the disc driving unit.

On the bottom plate 58 is mounted a driving motor 80 for controlling the horizontal transfer movement of the disc cartridge 320 or 321 and the vertical movement of the attachment substrate 59 carrying the recording/reproducing unit, as shown in FIGS. 23 and 24. On the driving shaft of the driving motor 80 is mounted a driving gear 117 meshing with a first transmission gear 81 rotatably supported on the bottom plate 58. A second transmission gear 150 smaller in diameter than the first transmission gear 81 is coaxially and integrally mounted on the first transmission gear 81. The second transmission gear 150 meshes with a third transmission gear 82 rotatably supported on the bottom plate 58. A fourth transmission gear 151 smaller in diameter than the third transmission gear 82 is coaxially and integrally mounted on the third transmission gear 82. The fourth transmission gear 151 meshes with a fifth transmission gear 83 mounted substantially centrally of a transfer driving shaft 84 rotatably mounted on the bottom plate 83. That is, when the driving motor 80 is driven in rotation, the transfer driving shaft 84 is run in rotation. On both ends of the transfer driving shaft 84 are mounted a pair of transfer driving shafts 85, 85.

Figure 22:
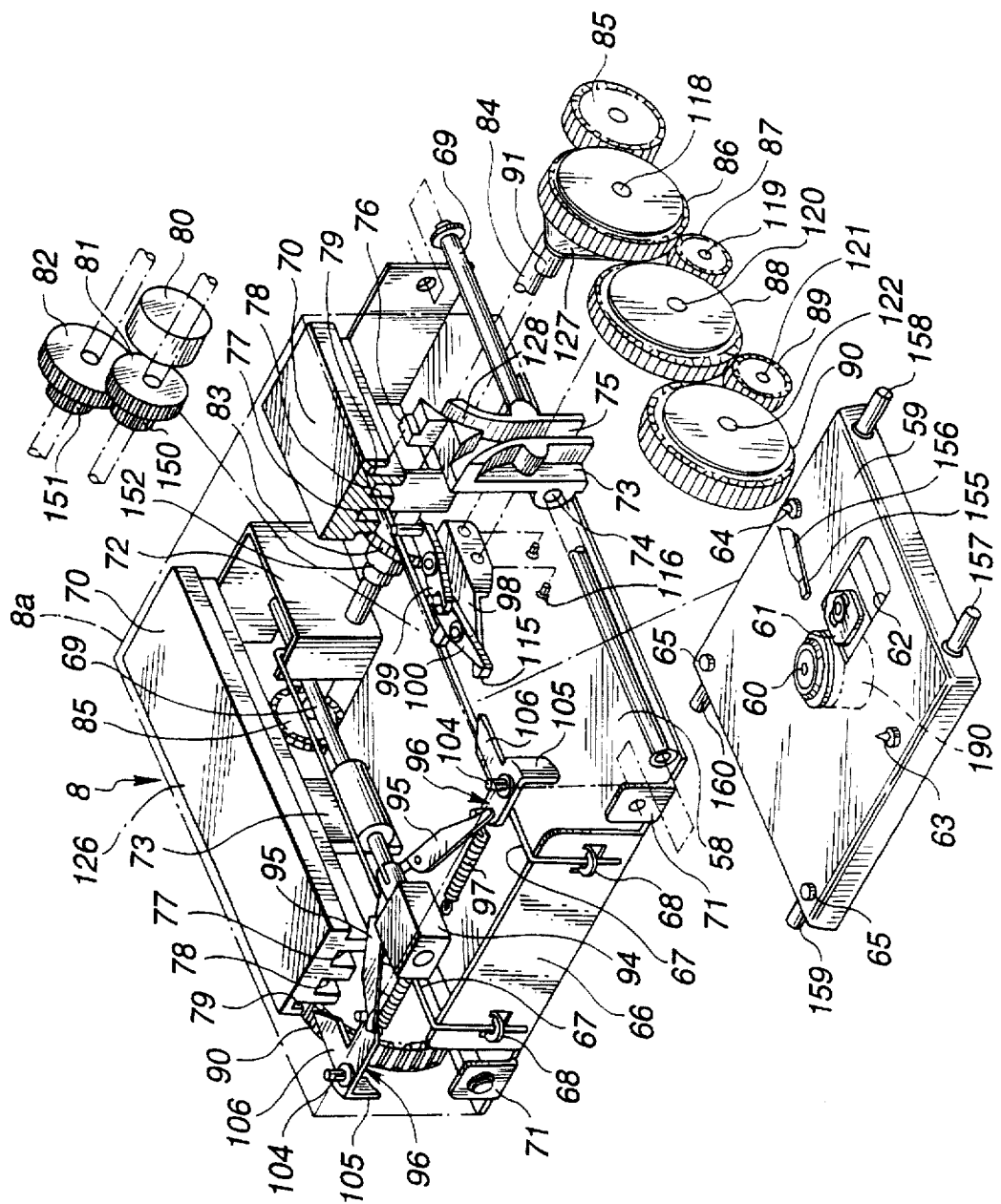
FIG. 22 is an exploded perspective view showing a disc driving unit of the disc recording and/or reproducing apparatus according to the present invention.
Figure 32:
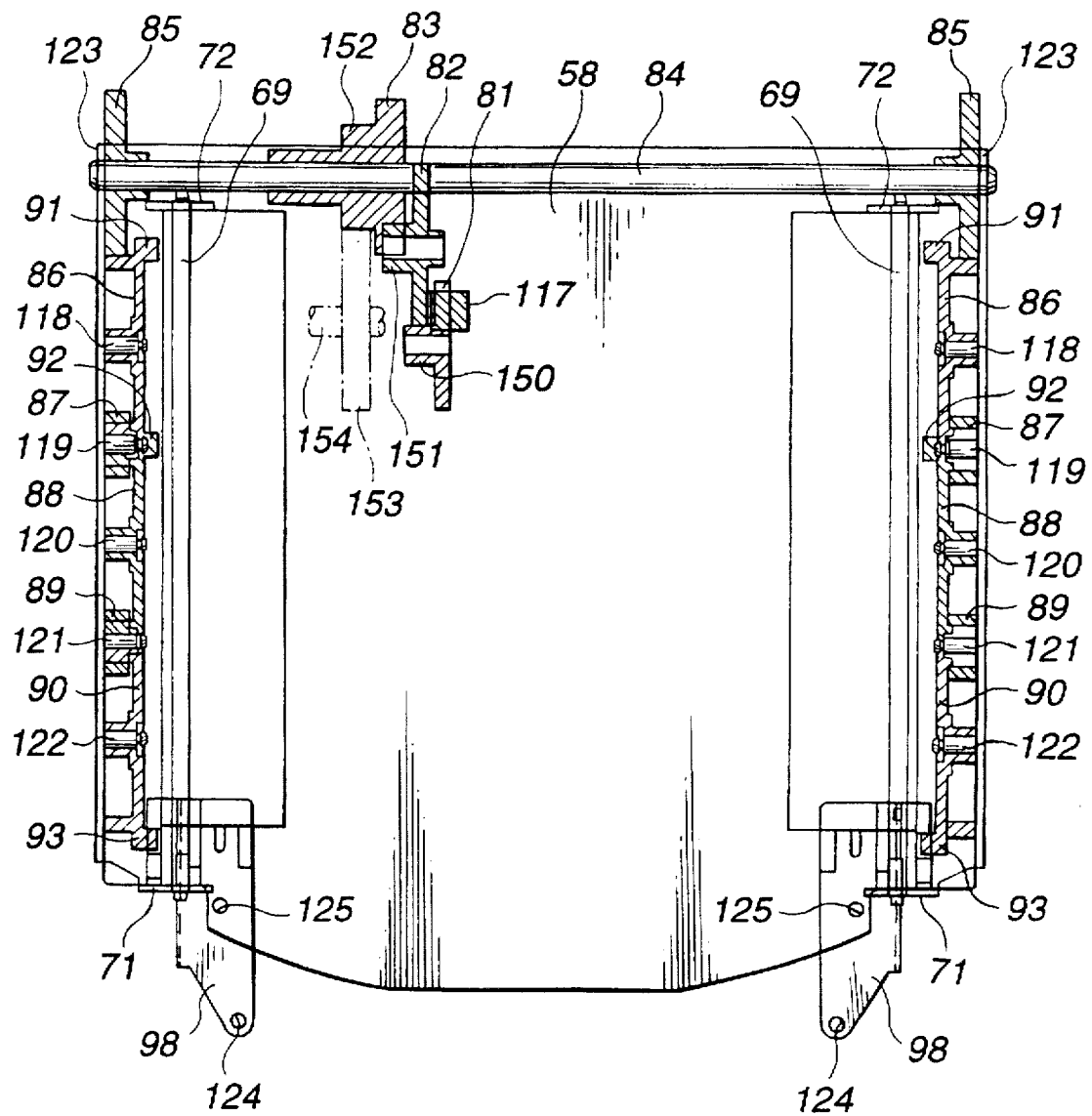
FIG. 32 is a plan view showing the driving unit of the disc cartridge mechanism.
Figure 33:
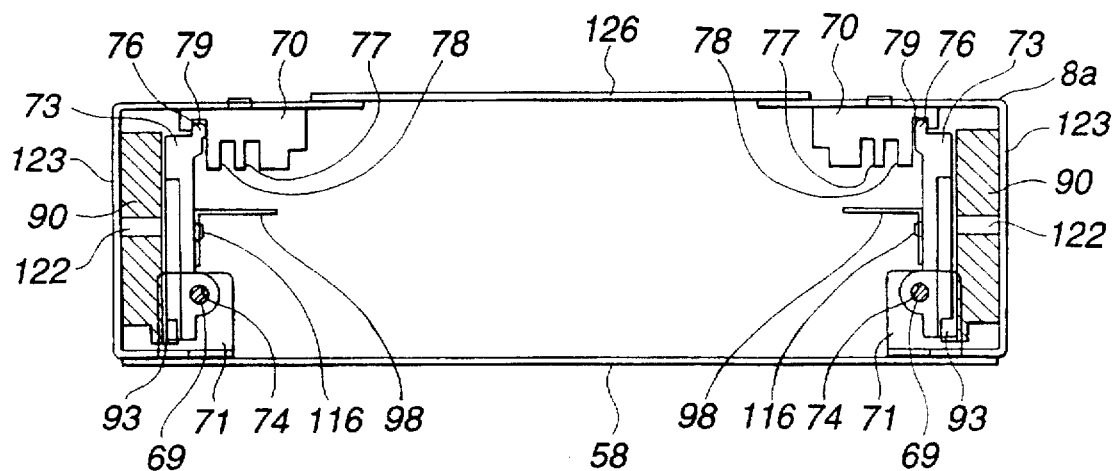
FIG. 33 is a schematic front view showing the disc cartridge transporting mechanism, with a portion thereof being broken away.

On both sides of the bottom plate 58 are arranged each one set of first to third transfer gears 86, 88 and 90 making up a first recording medium transfer mechanism, as shown in FIGS. 22 and 32. The first to third transfer gears 86, 88 and 90 of the sets, making up the recording medium transfer mechanism, are arranged symmetrically on both sides of the bottom plate 58 so as to be rotated in the same direction in a timed relation to one another. The transfer gears 86, 88, 90 and 86, 88, 90 of the respective sets are rotatably supported via supporting shafts 118, 120, 122 and 118, 120, 122 set upright on the opposite inner surfaces of the side plates 123, 123 of the housing 8a. These supporting shafts 118, 120, 122 and 118, 120, 122 are set upright on the side plates 123, 123 at the same height from the bottom plate 58 for extending along the length of the side plates 123, 123. Consequently, the transfer gears 86, 88, 90 and 86, 88, 90 of the respective sets, supported by these supporting shafts 118, 120, 122 and 118, 120, 122, are arranged in a row along the length of the side plates 123, 123.

The transfer driving gears 85, 85 mounted on both ends of the transfer driving shaft 84 mesh with the first transfer gears 86, 86 positioned at the rearmost position of the housing 8a. Between the first transfer gears 86, 86 and the second transfer gears 88, 88 are mounted reversing gears 87, 87 simultaneously meshing with these first transfer gears 86, 86 and the second transfer gears 88, 88. These reversing gears 87, 87 are rotatably supported by supporting shafts 119, 119 set on the side plates 123, 123 of the housing 8a. Between the second transfer gears 88, 88 and the third transfer gears 90, 90 are mounted reversing gears 89, 89 simultaneously meshing with these second transfer gears 88, 88 and the third transfer gears 90, 90. These reversing gears 89, 89 are also rotatably supported by supporting shafts 121, 121 set on the side plates 123, 123 of the housing 8a.

By the transfer driving gears 85, 85, mounted on both ends of the transfer driving shaft 84 for rotation in unison with the transfer driving shaft 84, being driven in rotation, the first to third transfer gears 86, 88, 90 and 86, 88, 90 of the respective sets, arranged on both sides of the bottom plate 58, are rotated in the same direction in a timed relation to one another.

Figure 36:
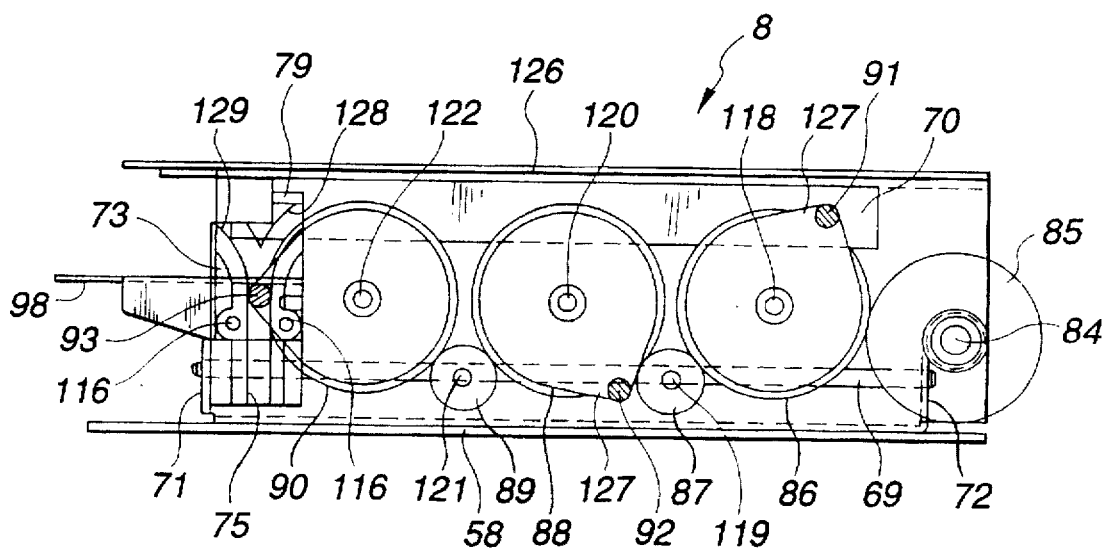
FIG. 36 is a side view showing the driving unit of the disc cartridge transporting mechanism.
Figure 37:
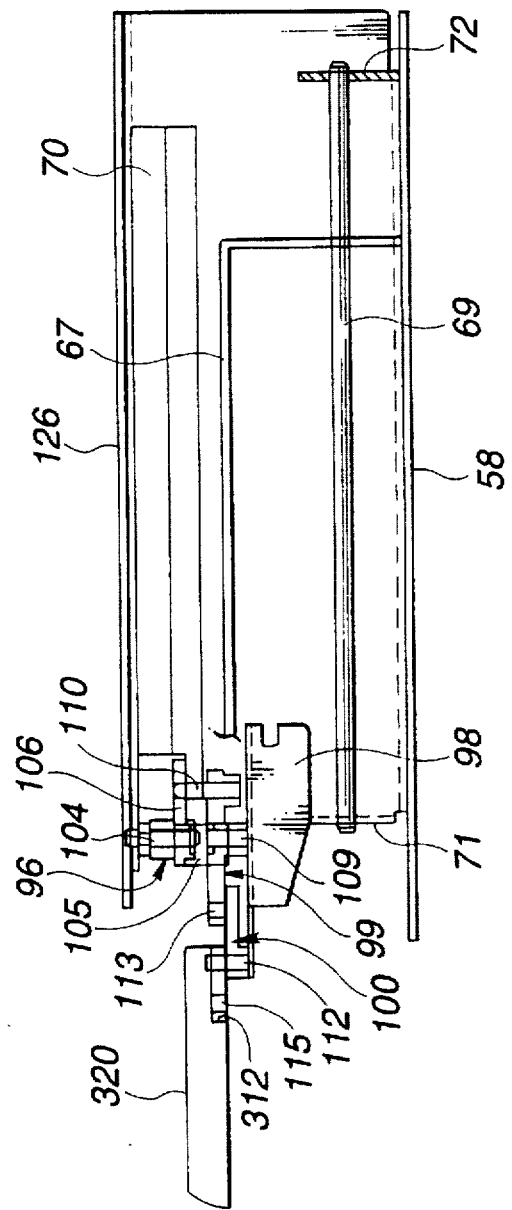
FIG. 37 is a schematic side view showing the disc cartridge transporting mechanism provided within the disc driving unit.
Figure 38:
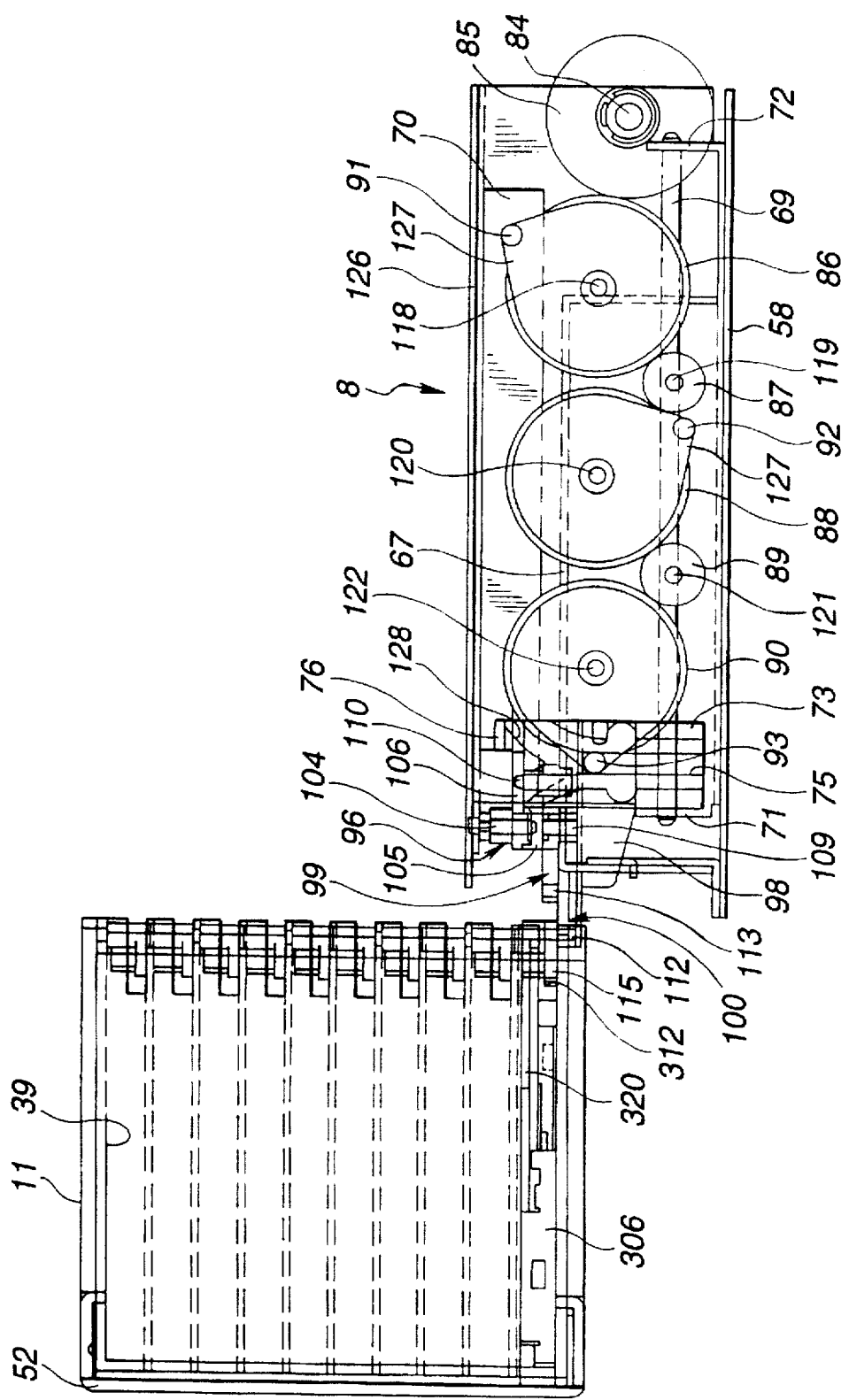
FIG. 38 is a side view showing the state in which the disc cartridge is being drawn out of the magazine for the disc cartridge by the disc cartridge transporting mechanism.

First to third engagement pins 91, 92 and 93 are mounted for being protruded towards the inner side of the housing 8a at positions offset relative to the center of rotation of the first to third transfer gears 86, 88, 90 and 86, 88, 90 of the respective sets. These engagement pins 91, 92 and 93 are set via a supporting plate 127 mounted in superposition on the respective transfer gears 86, 88 and 90, as shown in FIGS. 22 and 36. These engagement pins 91 to 93 are each of a thickness substantially equal to the interval between the engagement pins 86, 88, 90. The engagement pins 91 to 93 are protruded for facing the ends of the gear portions formed on the outer peripheral surfaces of the transfer gears 86, 88, 90.

On the bottom plate 58 are arranged movable members 73, 73 for extending along the length of the gear train of the first to third transfer gears 86, 88, 90 of the respective sets. These movable members 73, 73 are each formed with through-holes 74, 74 through which are passed a pair of movement guide shafts 69, 69 arranged parallel to each other on both sides of the bottom plate 58, and are supported for movement along the length of the gear train of the first to third transfer gears 86, 88, 90 of the respective sets by being guided by the movement guide shafts 69, 69. The movable members 73, 73 are supported for movement by the movement guide shafts 69, 69 by movement guide pieces 76, 76 mounted upright on the upper ends of the movable members 73, 73 being engaged in engagement grooves 79, 79 formed in the guide rails 70, 70 for controlling the rotation about the movement guide shafts 69, 69.

On the outer sides of the movable members 73, 73 facing the first to third transfer gears 86, 88 and 90 are formed engagement grooves 75 engaged by the engagement pins 91, 92 and 93. The engagement groove 75 is formed in a height-wise direction perpendicular to the direction of movement of the movable member 73 and is branched at its upper end into a first pin intrusion guide groove 128 and a second pin intrusion guide groove 129. These guide grooves 128, 129 are arcuate in shape in register with the locus of rotational movement of the engagement pins 91 to 93 provided at offset positions of the transfer gears 86, 88 and 90. That is, the pin intrusion guide grooves 128, 129 guide the intrusion into the engagement groove 75 of the engagement pins 91 to 93 rotated in unison with the transfer gears 86, 88, 90.

When the transfer gears 86, 88 and 90 are run in rotation, the movable member is intruded in the engagement groove 75 for the engagement pins 91 to 93 provided on the transfer gears 86, 88 and 90, and is moved with rotation of one set of the transfer gears 86, 88 and 90 by being guided by the movement guide shaft 69. As the transfer gears 86, 88 and 90 are rotated further, the one set of the engagement pins 91 to 93 engaged in the engagement groove 75 is disengaged from the engagement groove 75. Next, the other set of the engagement pins 91 to 93 provided on the other set of the transfer gears 86, 88 and 90 are engaged in the engagement groove 75. By repetition of the engagement and disengagement of the engagement pins 91 to 93 in and out of the engagement groove 75, the movable members 73, 73 are moved over the extent of the transfer gears 86, 88, 90.

That is, the engagement pins 91 to 93 are provided on the transfer gears 86, 88, 90 so as to have the rotational phase difference in which the engagement and disengagement of the movable member 73 in and out of the engagement groove 75 is repeated with rotation of the sets of the transfer gears 86, 88, 90 rotated in timed relation to each other. It is assumed that, when the engagement pins 91, 92, 93 are located on a straight line interconnecting the supporting shafts 118,120, 122 supporting the transfer gears 86, 88, 90, the rotational angular position of the engagement pins 91 to 93 is 0°. When the movable member 73 is at the left-most position in FIG. 39, the third transfer gear 90 is rotated to a position in which the third engagement pin 93 is at the 0° rotational angular position.

Figure 39:
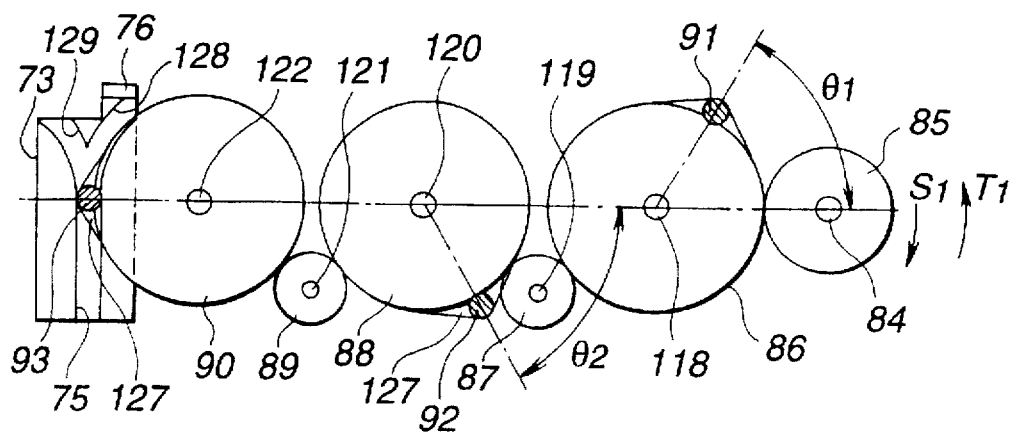
FIG. 39 is a side view of a driving unit for the disc cartridge transporting mechanism, showing its initial state.

If the counterclockwise rotational direction in FIGS. 39 to 44 of the transfer gears 86, 88, 90 provided with the engagement pins 91 to 93 is positive (+), the second transfer gear 88 is put in the initial position shown in FIG. 39 in the state in which the second engagement pin 92 has been rotated to a rotary position of (180°−Θ), while the first transfer gear 86 is put in the state in which the first engagement pin 91 has been rotated to a rotary position of (180°+Θ₁), wherein Θ₁, Θ₂, are set to 60°.

Figure 40:
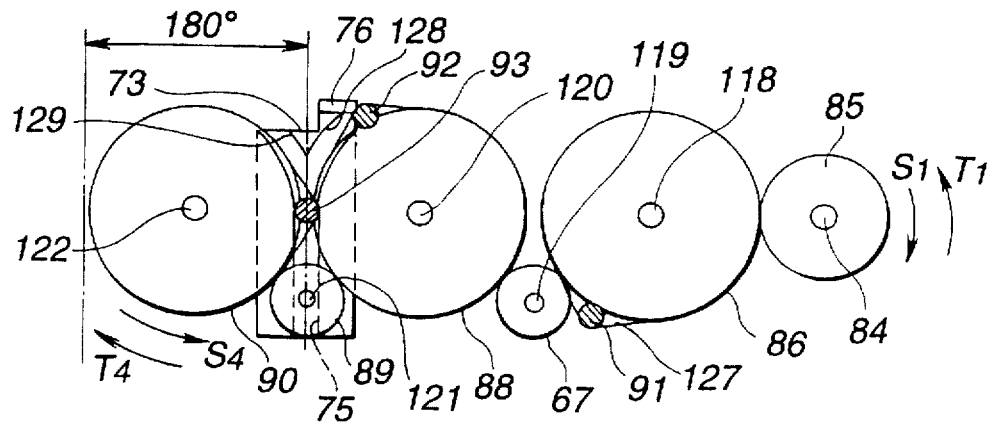
FIG. 40 is a side view of a driving unit for the disc cartridge transporting mechanism, showing the state in which each transporting gear has been rotated through 180°.

If the transfer driving gear 85 has been rotated in the negative (−) direction as indicated by arrow S₁ in FIG. 39, the third transfer gear 90 is rotated in the positive (+) direction indicated by arrow S₄ in FIG. 40. By the rotation through 180° of the third transfer gear 90 in the positive (+) direction, the movable member 73 is moved towards right rear in FIG. 40 a distance substantially equal to the diameter of the third transfer gear 90. The second transfer gear 88 is rotated in the positive (+) direction as indicated by arrow S₃ in FIG. 41, and reaches a rotational position in which it has been rotated through (360°−Θ₂) or −60°.

Figure 41:
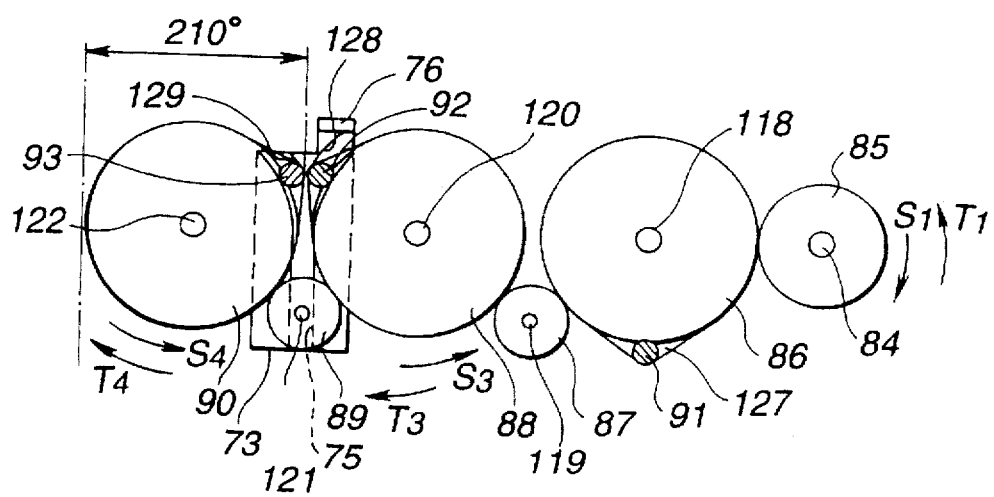
FIG. 41 is a side view of a driving unit for the disc cartridge transporting mechanism, showing the state in which each transporting gear has been rotated through 210°.

When the third transfer gear 90 reaches a position in which it has been rotated through 210°, the third engagement pin 93 is disengaged from the engagement groove 75 in the movable member 73 via a second pin intrusion guide groove 129 positioned at the left forward side in FIG. 41. The second transfer gear 88 is rotated at this time to a position in which the second engagement pin 92 is intruded via the first pin intrusion guide groove 128 into the engagement groove 75.

Figure 42:
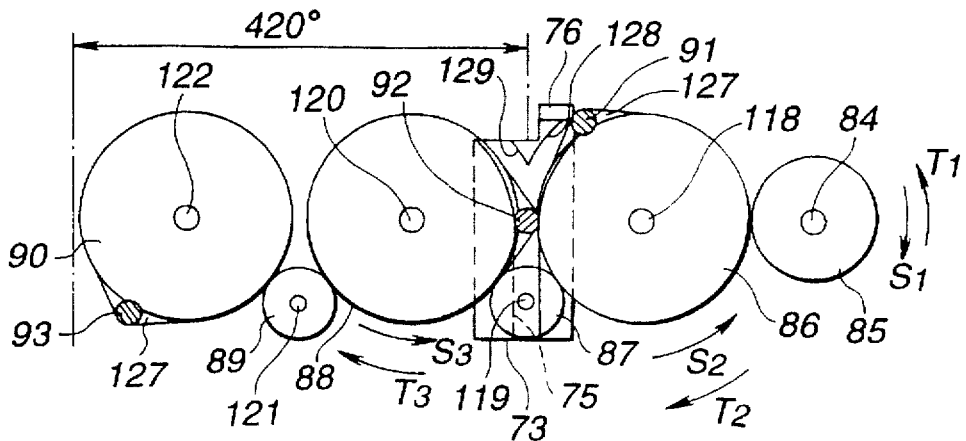
FIG. 42 is a side view of a driving unit for the disc cartridge transporting mechanism, showing the state in which each transporting gear has been rotated through 420°.

When the third transfer gear 90 is rotated to a position in which it has been rotated through 420° (one complete revolution and 60°) in the positive (+) direction, the second transfer gear 88 reaches a position in which it is rotated through 180°, while the movable member 73 is further moved towards right rear in FIG. 42 a distance substantially equal to the diameter of the second transfer gear 88. The first transfer gear 86 is rotated at this time in the positive (+) direction as indicated by arrow S₂ in FIG. 42 to a position in which it has been rotated through (360°−Θ₁) or −60°.

Figure 43:
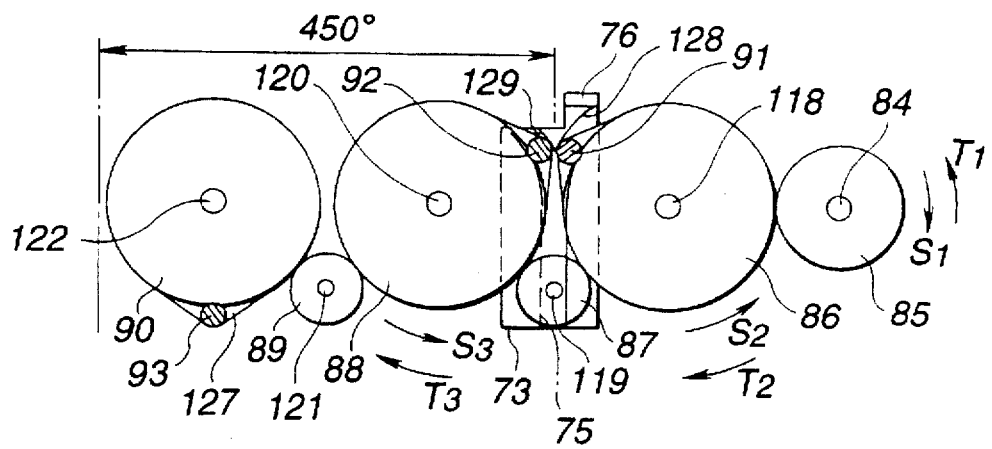
FIG. 43 is a side view of a driving unit for the disc cartridge transporting mechanism, showing the state in which each transporting gear has been rotated through 450°.

When the third transfer gear 90 is rotated to a position in which it has been rotated through 450° (one full revolution and 90°), the second engagement pin 92 formed on the second transfer gear 88 is put at a position in which the second engagement pin 92 provided on the second transfer gear 88 is disengaged from the engagement groove 75 via the second pin intrusion guide groove 129, as shown in FIG. 43. The first transfer gear 86 is rotated to a position in which the first engagement pin 91 is intruded via the first pin intrusion guide groove 128 into the engagement groove 75.

Figure 44:
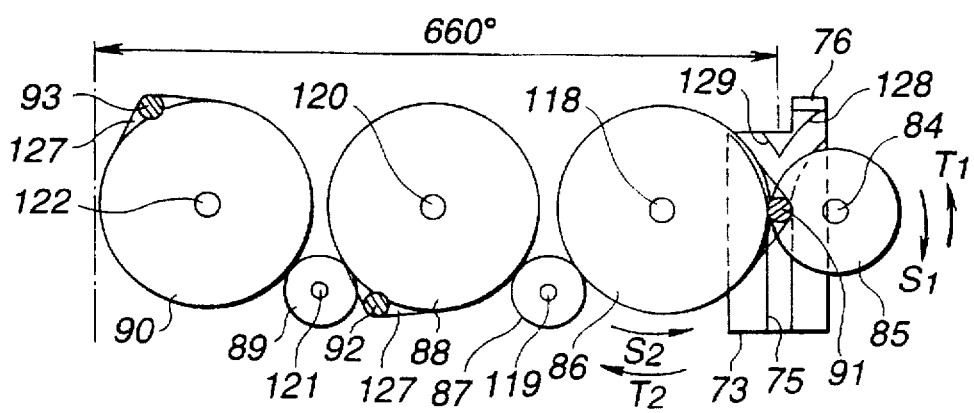
FIG. 44 is a side view of a driving unit for the disc cartridge transporting mechanism, showing the state in which each transporting gear has been rotated through 760°.

When the third transfer gear 90 is rotated to a position in which it has been rotated through 660° (one complete revolution and 300°) in the positive (+) direction, the first transfer gear 86 reaches a position in which it is rotated through 180°, while the movable member 73 is further moved towards right rear in FIG. 44 a distance substantially equal to the diameter of the first transfer gear 86 and reaches its rearmost position. The first transfer gear 86 is rotated in the positive (+) direction as indicated by arrow S₂ in FIG. 44 to a position in which it has been rotated through 180°.

If the transfer driving gear 85 has been rotated in the positive (+) direction as indicated by arrow T₁ in FIG. 39, the first to third transfer gears 86, 88, 90 are rotated as indicated by arrows T₂, T₃ and T₄ in FIGS. 40 to 44, with the movable member 73 being moved towards left forward side from the right rear side in FIGS. 40 to 44.

As described above, the movable members 73, 73 are reciprocated in synchronism with each other by being guided along a pair of movement guide shafts 69, 69 depending on the rotational driving direction of the driving motor for disc cartridge transfer 80.

On an inner lateral side of each movable member 73, 73 opposite to its lateral side carrying the engagement groove 75 is mounted the lever mounting plate 98 engaged with a portion of the disc cartridge 320 or 321 and constituting a cartridge holding mechanism holding the disc cartridge 320 or 321. The lever mounting plate 98 is L-shaped in cross-section and has its L-shaped arm secured to the inner lateral side of each movable member 73 by set screws 116, 116, as shown in FIG. 22.

The set of the positioning lever 99 and the engagement lever 100 is mounted on a lever attachment plate 98 provided on each of the left and right sides in order to make up a holding mechanism for the disc cartridge 320 or 321. The second recording medium transfer mechanism is constituted by mounting the positioning lever 99 and the engagement lever 100 making up the cartridge holding mechanism on the lever attachment plate 98 for movement in unison with the movable member 73.

The positioning lever 99 is rotatably supported on the movable plate 98 via a support shaft 109 and has on its one end an upwardly directed positioning pin 110. The positioning lever 99 carries on its opposite end an engagement pin 113 engaged in a groove 111 for engagement by the engagement lever 100. The engagement lever 100 carries on its opposite end a pawl-shaped engagement portion 115 adapted for being engaged in engagement recesses 312, 312 formed on both sides of the disc cartridge 320 or 321.

The engagement portions 115, 115 formed on left and right engagement levers 100, 100 are engaged with the rotation of the engagement levers 100, 100 in both engagement recesses 312, 312 on both lateral sides of the disc cartridge 320 or 321 facing the disc driving unit 8 for holding the disc cartridge 320 or 321.

Figure 31:
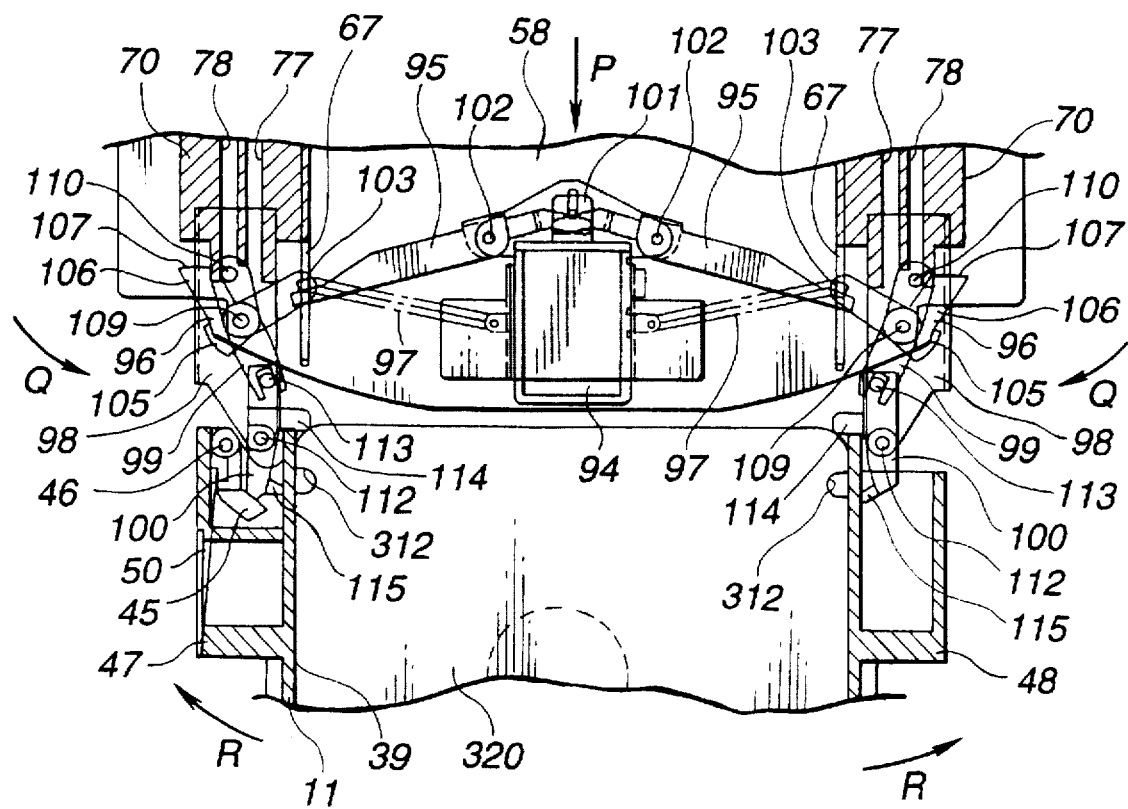
FIG. 31 is a plan view showing the state in which the disc cartridge within the housing section is about to be held by the disc cartridge transporting mechanism provided within the disc driving unit.

The positioning pins 110, 110 provided on the left and right positioning levers 99, 99 are selectively engaged in one of the first and second engagement grooves 77, 78 formed on the lower surfaces of guide rails 70, 70 in parallel with each other. When the positioning pins 110, 110 are engaged in the first engagement grooves 77, 77 formed on the oppose inner sides of the guide rails 70, 70, the engagement levers 100, 100 are rotated in the direction of being engaged in the engagement recesses 312, 312 of the disc cartridge 320 or 321 or in the direction of approaching engagement portions 115, 115 towards each other. When the positioning pins 110, 110 are engaged in second engagement grooves 78, 78 formed on the outer sides of the guide rails 70, 70, the engagement levers 100, 100 have been rotated to a position in which the engagement levers are disengaged from the engagement recesses 312, 312 of the disc cartridge 320 or 321, with the engagement portions 115, 115 being separated away from each other, as shown in FIG. 31. Further rotation of the engagement levers 100, 100 is prohibited by retention lugs 114, 114 formed upright on opposite sides of the engagement levers 100, 100 being caused to bear against the opening end of the aperture 11e formed in the front surface of the magazine main member 11a, as shown in FIG. 31.

Figure 29:
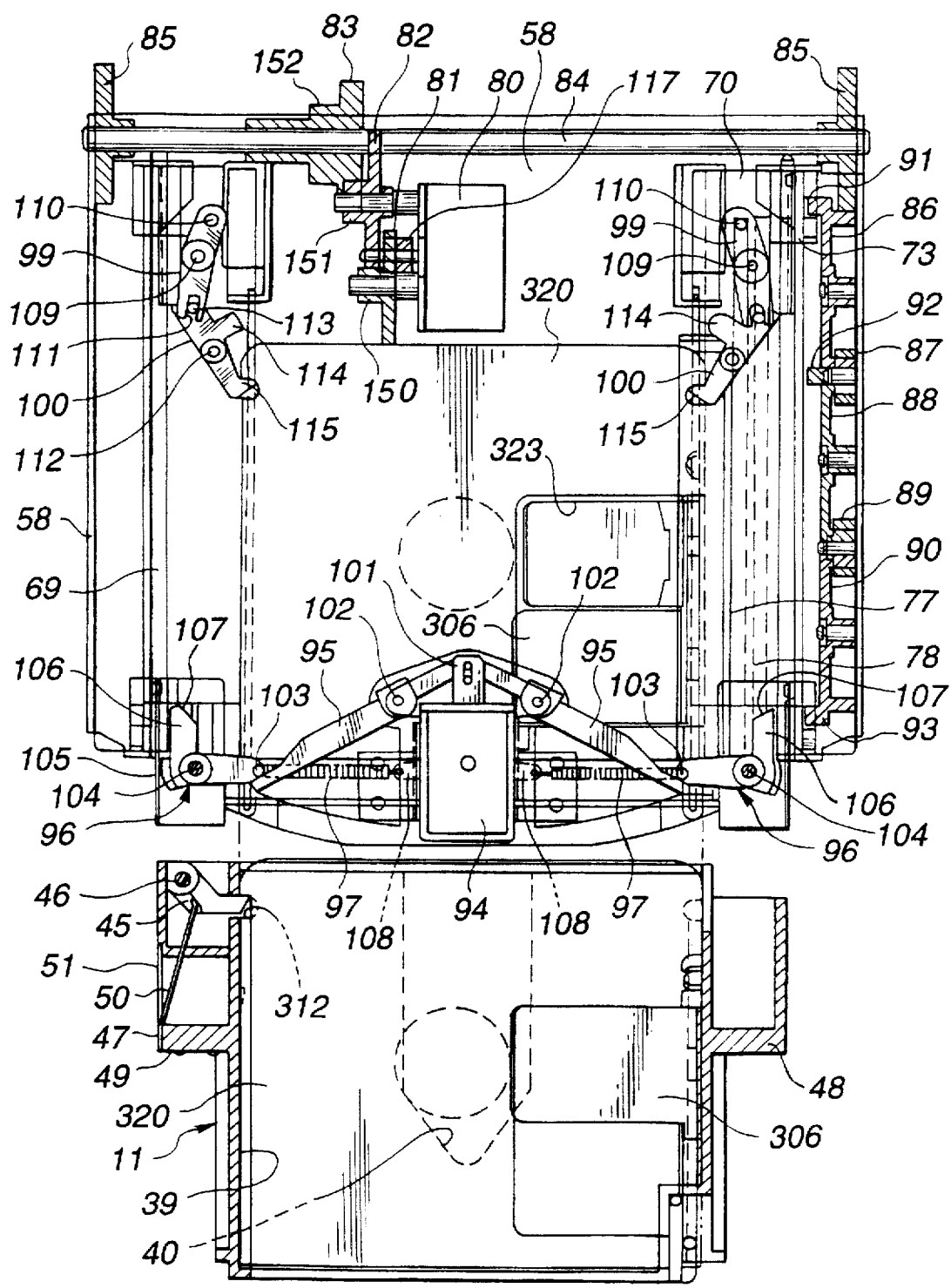
FIG. 29 is a plan view showing an arrangement of the disc driving unit and the magazine for the disc cartridge.

A pair of operating levers 96, 96 for controlling the rotation of the positioning lever 99 constituting the holding mechanism for the disc cartridge 320 or 321 is mounted facing the opened front surface of the housing 8a which is the forward end of each of the first and second engagement grooves 77, 78, as shown in FIGS. 22 and 29. Each of the operating levers 96, 96 is L-shaped and has its one end protruded into the inside of the front surface of the housing 8a, while having the distal end of its opposite side rotatably mounted via support shafts 104, 104 set upright on a top plate 126 for facing the opened front end of the second engagement groove 78. The opposite end of each operating lever 96 facing the first and second engagement grooves 77, 78 is a rotating portion 106 for rotating the positioning lever 99. The distal end face of the rotating portion 106 is designed as a pin abutment portion 107 abutted by a positioning pin 110 set upright on the positioning lever 99. In the vicinity of the portion of the operating lever 96 supported by a support shaft 104 is mounted a rotating member 105 for rotating the positioning lever 99 in a depending manner, as shown in FIG. 22.

Each operating lever 96, 96 is rotationally biased by tension springs 97, 97 mounted between spring retention pins 103, 103 set on one end of the lever 96, 96 and spring retainers 108, 108 at the mid portion of the forward side of the top plate 126 in a direction in which pin abutment portions 107, 107 at the distal ends of the rotating portions 106, 106 are located in the initial position of facing the opening ends of the second engagement grooves 78, 78. That is, each operating lever 96, 96 is rotationally biased by the tension springs 97, 97 at all times so as to be restored to their initial position when the operating levers are rotated about the pivot shafts 104, 104 as the center of rotation and subsequently freed of the rotational pressure.

At a mid position on the front end of the top plate 126 is arranged a solenoid plunger 94 adapted for rotating the operating levers 96, 96 against the bias of the tension springs 97, 97. This solenoid plunger 94 is mounted on the top plate 126 with its driving shaft 101 protruded into the inside of the housing 8a. The driving shaft 101 is engaged by one ends of a pair of rotating levers 95, 95 rotatably supported by support shafts 102, 102 set on the top plate 126, as shown in FIG. 29. The opposite ends of the rotating levers 95, 95 face spring retention pins 103, 103 set on one ends of the operating levers 96, 96.

When the solenoid plunger 94 is driven in operation, the driving shaft 101 is moved in the direction indicated by arrow P in FIG. 31 for rotating the rotating levers 95, 95 in a direction in which the rear ends of the levers 95, 95 are moved towards rear or towards the inside of the housing 8a. When the rotating levers 95, 95 are rotated by the solenoid plunger 94, the spring retention pins 103, 103 are thrust by the opposite ends of the rotating levers 95, 95, whereby the operating levers 96, 96 are rotated in a direction indicated by arrow Q in FIG. 31 against the bias of the tension springs 97, 97. By rotation of the operating lever 96, 96 in the direction indicated by arrow Q in FIG. 31, the pin abutment portions 107, 107 at the distal ends of the rotating portions 106, 106 are moved to a position which outwardly clears the position facing the initial position of facing the opening ends of the second engagement grooves 78, 78, away from the initial position in which the pin abutment portions face the opening ends of the second engagement grooves 78, 78.

When attachment plates 98, 98 attached to the movable members 75, 75 for movement in unison therewith are moved towards the front side of the housing 8a and the positioning pins 110, 110 set on one ends of the positioning levers 99, 99 mounted in position via these attachment plates 98, 98 are disengaged from the first and second engagement grooves 77, 78, the operating levers 96, 96, rotated by the rotating levers 95, 95 rotated in turn by the solenoid plunger 94, causes rotation of the positioning levers 99,99 by the rotating members 105, 105, or thrusts the positioning pins 110, 110 by the rotating portions 106, 106 for rotating the positioning levers 99, 99. That is, the operating levers 96, 96 causes rotation of the positioning levers 99, 99 for rotating the engagement levers 100, 100 for engaging or disengaging the engagement portions 115, 115 provided on the engagement levers 100, 1200 in or out of engagement recesses 312, 312 formed in the disc cartridge 320 or 321.

Figure 30:
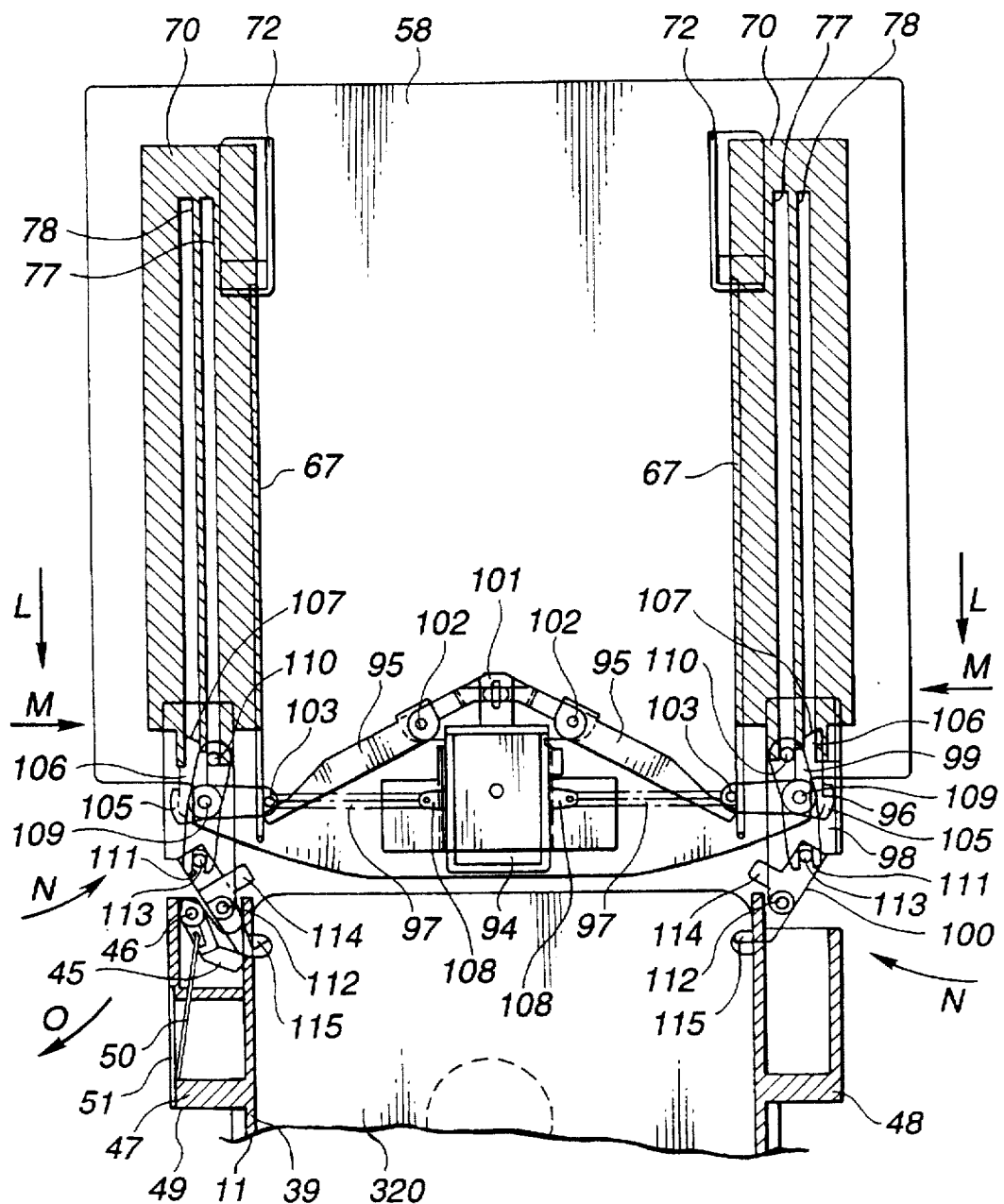
FIG. 30 is a plan view showing the state in which the disc cartridge within the housing section has been held by the disc cartridge transporting mechanism provided within the disc driving unit.

If, when the solenoid plunger 94 rotating the operating levers 96, 96 via the rotating levers 95, 95 is in an inoperative state, and the positioning pins 110, 110 are engaged in the first and second engagement grooves 77, 78, the attachment plates 98, 98 are moved in unison with the movable members 75, 75 towards the front side as indicated by arrow L in FIG. 30, and the positioning pins 110, 110 are disengaged from the front opening ends of the second engagement grooves 78, 78, these positioning pins 110, 110 are caused to bear against the pin abutment portions 107, 107 at the distal ends of the rotating portions 106, 106 for causing these rotating portions 106, 106 to clear outward in a direction opposite to arrow M in FIG. 30.

By such movement of the positioning pins 110, 110, the engagement levers 100, 100 are rotated in a direction opposite to that indicated by arrow N in FIG. 30 for approaching the engagement portions 115, 115 at the distal ends thereof towards each other. Thus the engagement portions 115, 115 are intruded via the cut-outs 44, 44 into the housing section 39 in the magazine for the disc cartridge 11 into engagement with the engagement recesses 312, 312 in the disc cartridge 320 or 321 facing the disc driving unit 8.

The engagement lever 100 is caused at this time to bear against the engagement member 45 of the magazine for the disc cartridge 11 facing the disc driving unit 8 for rotating and receding the engagement member 45 from the housing 39 against the bias of the thrusting piece 50 out of engagement with the engagement recesses 312, 312 of the disc cartridge 320 or 321 housed within the housing section 39.

That is, the operating levers 96, 96 cause the movement of the positioning pins 110, 110 provided on the positioning levers 99, 99 via the rotating portions 106, 106, and are rotationally biased at all times to their initial positions by the tension springs 97, 97 for rotationally biasing the engagement lever 100 in a direction in which the engagement portions 115, 115 are engaged in the engagement recesses 312 formed in the disc cartridge 320 or 321 housed within the housing section 39.

On the other hand, if the solenoid plunger 94 is driven in operation for rotating the operating levers 96, 96 in a direction of arrow Q in FIG. 31 against the bias of the tension springs 97, 97, the positioning pins 110, 110 cause rotation of the positioning levers 99, 99 into registration with the front opening ends of the second engagement grooves 78, 78 via the rotating members 105, 105. By such rotation of the positioning levers 99, 99, the engagement levers 100, 100 are rotated as indicated in a direction of displacing the engagement portions 115, 115 away from each other as indicated by arrow R in FIG. 31, for disengaging the engagement portions 115, 115 away from the engagement recesses 312, 312 of the disc cartridge 320 or 321.

If, as a result of rotation of the engagement levers 100, 100 via the operating levers 96, 96 and the positioning levers 99, 99, caused by the driving by the solenoid plunger 94, the engagement portions 115, 115 are disengaged from the engagement recesses 312, 312 of the disc cartridge 320 or 321, and the movable members 73, 73 are moved towards the inside of the housing section 39 in a direction opposite to that indicated by arrow L in FIG. 31, the positioning pins 110, 110 are progressively engaged into the second engagement grooves 78, 78 via the front end apertures thereof.

If, when the respective engagement levers 100, 100 have been rotated to a position in which the engagement portions 115, 115 are engaged in the engagement recesses 312, 312 in the disc cartridge 320 or 321, the movable members 73, 73 having mounted thereon the attachment plates 98, 98 are moved by being guided by the movement guide shaft 69, the disc cartridge 320 or 321 is moved on the wires 67, 67 in unison with the movable members 73, 73. When the respective movable members 73, 73 reach the rearmost position of the housing section 39 indicated in FIG. 29, the disc cartridge 320 or 321, moved in unison with the respective movable members 73, 73, reach a position of facing the cartridge loading unit on the attachment plate 59 for the recording/reproducing unit. The attachment plate 59 is raised towards the disc cartridge 320 or 321 transferred to a position facing the cartridge loading unit, whereby the disc cartridge 320 or 321 is loaded on the cartridge loading unit on the attachment plate for the recording/reproducing unit 59.

When the disc cartridge 320 or 321 is transferred on the wires 67, 67 towards rear, the shutter member 306 or 317, mounted on the disc cartridge 320 or 321, is caused to bear against the shutter opening member which then prohibits the movement of the shutter members, so that the shutter member is moved relative to the cartridge main member 305 or 316 as far as the position of opening the aperture of the shutter member. On the other hand, when the disc cartridge 320 or 321 is transferred forward on the wires 67, 67, the shutter member 306 or 317, placed at the aperture opening position, is prohibited from movement by a shutter closure member, not shown, being engaged in an engagement opening 308 formed in the shutter member 306 or 317. Thus the shutter member 306 or 317 is moved relative to the cartridge main member 305 or 316 as far as the aperture opening position.

The disc driving unit 8 has a lift gear 153 which not only transfers the disc cartridge but also lifts the attachment plate 59 by rotation of a lift driving gear 152, as shown in FIGS. 22 and 23. The lift gear 153 meshes with lift driving gear 152 mounted on a transfer driving shaft 84 rotated by a driving motor 80 controlling the vertical movement of the attachment plate 59 and lifts the attachment plate 59 by rotation of the lift driving gear 152. The lift gear 153 is rotatably supported via a support shaft 154 on the bottom plate 58 so as to mesh with a rack gear 178 provided on the slide plate 167, as shown in FIG. 35.

The driving gear 152 for rotationally driving the lift gear 153 has a gear portion 179 and an arcuate lock portion 180 devoid of gears, as shown in FIGS. 27 to 47. The lock portion 180 is arcuate in profile, with the center of the arc coincident with a center shaft of the lift driving gear 152. The lock part 180 has a height corresponding to a mid height of the gear portion 179.

Figure 45:
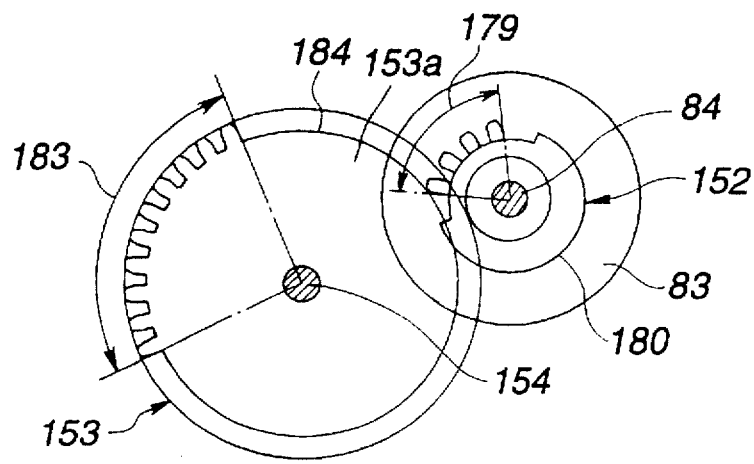
FIG. 45 is a side view showing a gearing mechanism for vertically actuating a recording/reproducing unit attachment plate.
Figure 46:
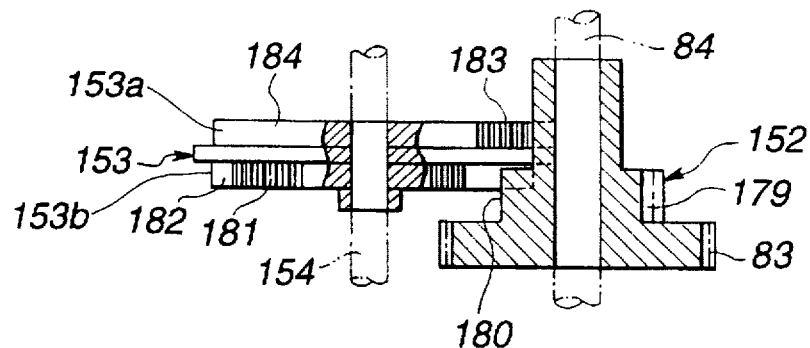
FIG. 46 is a plan view showing a gearing mechanism for vertically actuating a recording/reproducing unit attachment plate.

The lift gear 153 rotated by the lift driving gear 152 has an interrupted gearing 153a only on one of its major surfaces, with the interrupt gearing 153a having a gear portion 183 over a pre-set angular extent, as shown in FIGS. 45 and 46. A gear-free portion 184, formed in the interrupted gearing 153a, is arcuate in profile, centered about the center shaft of the lift gear 153, and has a height lower than the bottom of the valley of the gear portion 184. The lift gear 153 is arranged for engaging the interrupted gearing 153a with a rack gear 178 of the slide plate 167, as shown in FIG. 27.

Figure 47:
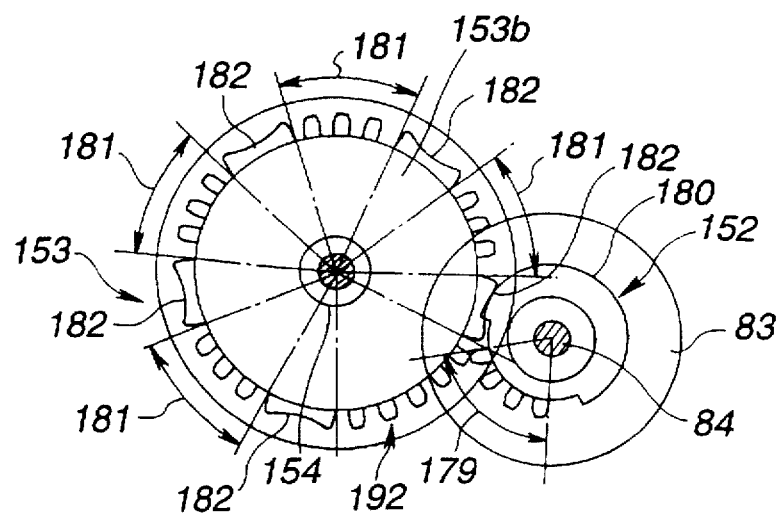
FIG. 47 is a side view showing a gearing mechanism for vertically actuating a recording/reproducing unit attachment plate.

The opposite major surface of the lift gear 153 is formed with a drive transmitting gear 153b meshing with the lift driving gear 152, as shown in FIGS. 46 and 47. The drive force transmitting gear 153b is made up of a plurality of reentrant lock portions 182, a plurality of gear portions 181 and an initial-position gear portion 192 formed intermediate between these reentrant lock portions. Each lock portion 182 formed in the drive transmitting gear 153b is designed to have a reentrant surface having the same radius of curvature as the lock portion 180 of the lift driving gear 152. Each gear portion 181 formed in the drive transmitting gear 153b has the number of teeth coincident with the number of teeth of the gear portion 179 of the lift driving gear 152. Meanwhile, the initial-position gear portion 192 is not engaged with the gear portion 179 of the lift driving gear 152, so that there is no need for the initial-position gear portion 192 to have the number of teeth coincident with that of the gear portion 170 of the lift driving gear 179.

When the movable members 73, 73 are at foremost position towards the housing section 39 shown in FIG. 30, the lift driving gear 152 has its gear portion 179 engaged with the initial-position gear portion 192 or its vicinity of the driving transmitting gear 153b of the lift gear 153. The lift gear 153 is positioned at this time so that the gear-free portion 184 of the interrupted gearing 153a faces the rack gear 178. The slide plate 167 is positioned forwardly, that is towards the housing section, under the bias of the tension spring 177. If the disc cartridge transferring driving motor 80 is rotationally driven in the positive direction for rotationally driving the transfer driving shaft 84, the movable members 73, 73 are moved towards rear as indicated by arrow L in FIG. 30, at the same time as the lift gear 153 is rotated via the gear portion 179 of the lift driving gear 152.

The rotation of the lift gear 153 by the lift driving gear 152 is by the plural gear portions 181 and the plural lock portions 182 of the drive transmitting gear 153b. As long as the movable members 73, 73 are moved towards rear away from the housing section 39, the driving force cannot be transmitted to the slide plate 167 because the gear-free portion 184 in the interrupted gearing 153a then continues to face the rack gear 178 despite rotation of the lift gear 153.

When the movable members 73, 73 reach the rearmost position, the lift driving gear 152 causes further rotation of the lift gear 153 via the drive transmitting fear 153 for engaging the gear portion 183 of the interrupted gearing 153a with the rack gear 178. By the gear portion 183 meshing with the rack gear 178, the slide plate 167 is moved towards rear for lifting the attachment plate for the recording/reproducing unit 59. The disc cartridge 320 or 321, transferred towards rear in unison with the movable members 73, 73, is loaded at this time on the cartridge loading unit on the attachment plate for the recording/reproducing unit 59. On termination of movement of the slide plate 167 towards rear, the drive motor 80 is halted, while the lift drive gear 152 is halted with the lock portion 180 being engaged with the reentrant lock portion 182 of the drive transmitting gear 153b, as shown in FIG. 28.

Since the drive motor 80 is rotationally driven until termination of rearward movement of the slide plate 167, it may be feared that further rotation may be produced after the movable members 73, 73 have been moved to the rearmost position by the first transfer gears 86, 86. However, since the first engagement pins 91, 91 are disengaged at this time from the movable members 73, 73 via the second pin intrusion guide grooves 129, 129 at the forward sides of the movable members 73, 73, the movement of the movable members 73, 73 continues to be halted. When the driving motor 80 has started to be rotationally driven in the reverse direction, the first engagement pins 91, 91 are again intruded into the engagement grooves 75, 75 via the second pin intrusion guide grooves 129, 129 at the forward sides of the movable members 73, 73 in order to permit movement of the movable members 73, 73.

If, with the slide plate 167 being moved towards rear as described above, the driving motor 80 is driven in reverse, the lift gear 153 is run in rotation. The slide plate 1678 is first restored to the forward position and the attachment plate for the recording/reproducing unit 59 is moved towards below. Subsequently, the movable members 73, 73 are moved forwards. When the movable members 73, 73 reach the foremost position towards the housing section 39, the driving motor 80 is halted.

Figure 48:
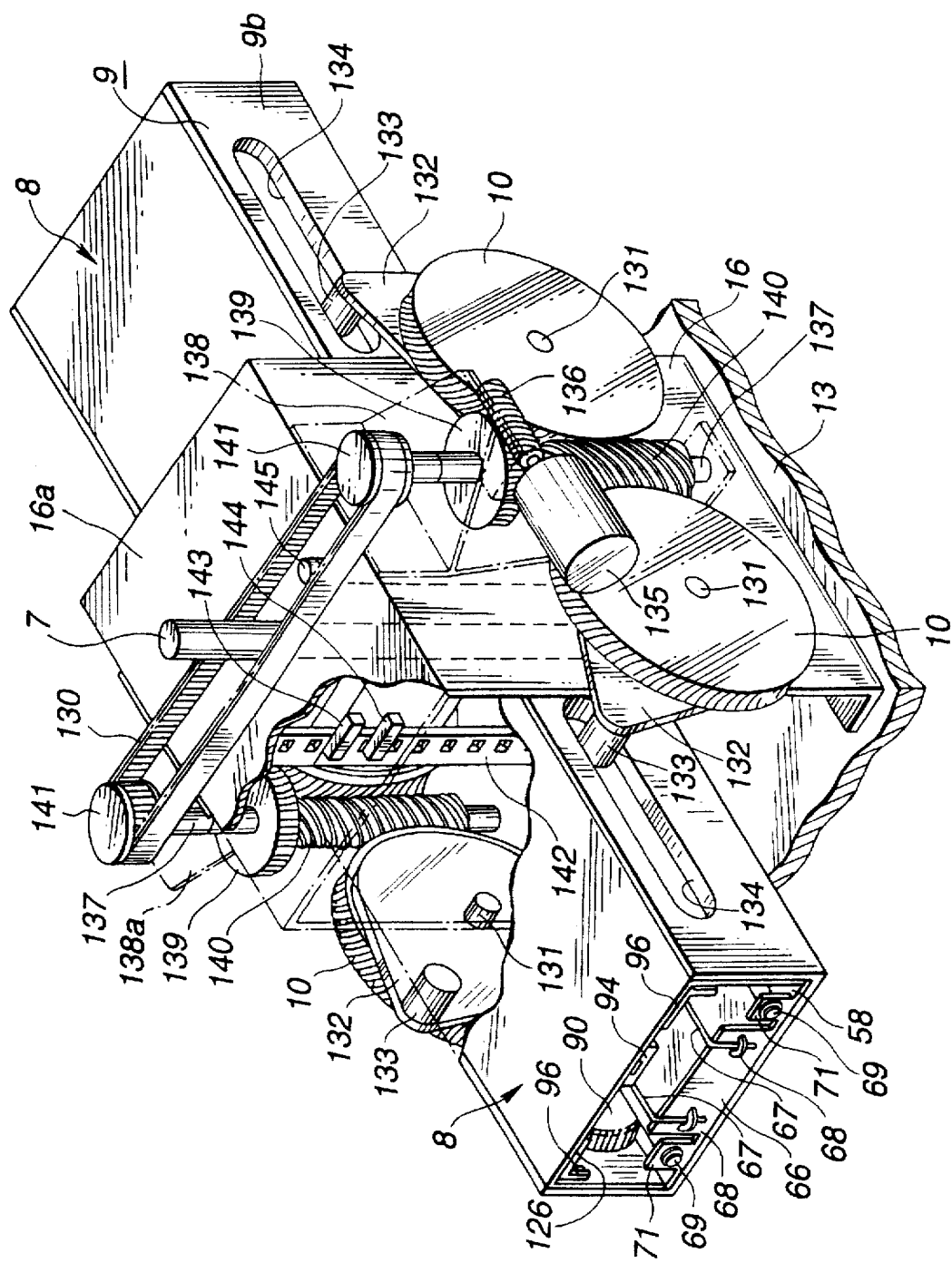
FIG. 48 is a perspective view showing an arrangement of a lift mechanism for the disc recording and/or reproducing apparatus according to the present invention.
Figure 49:
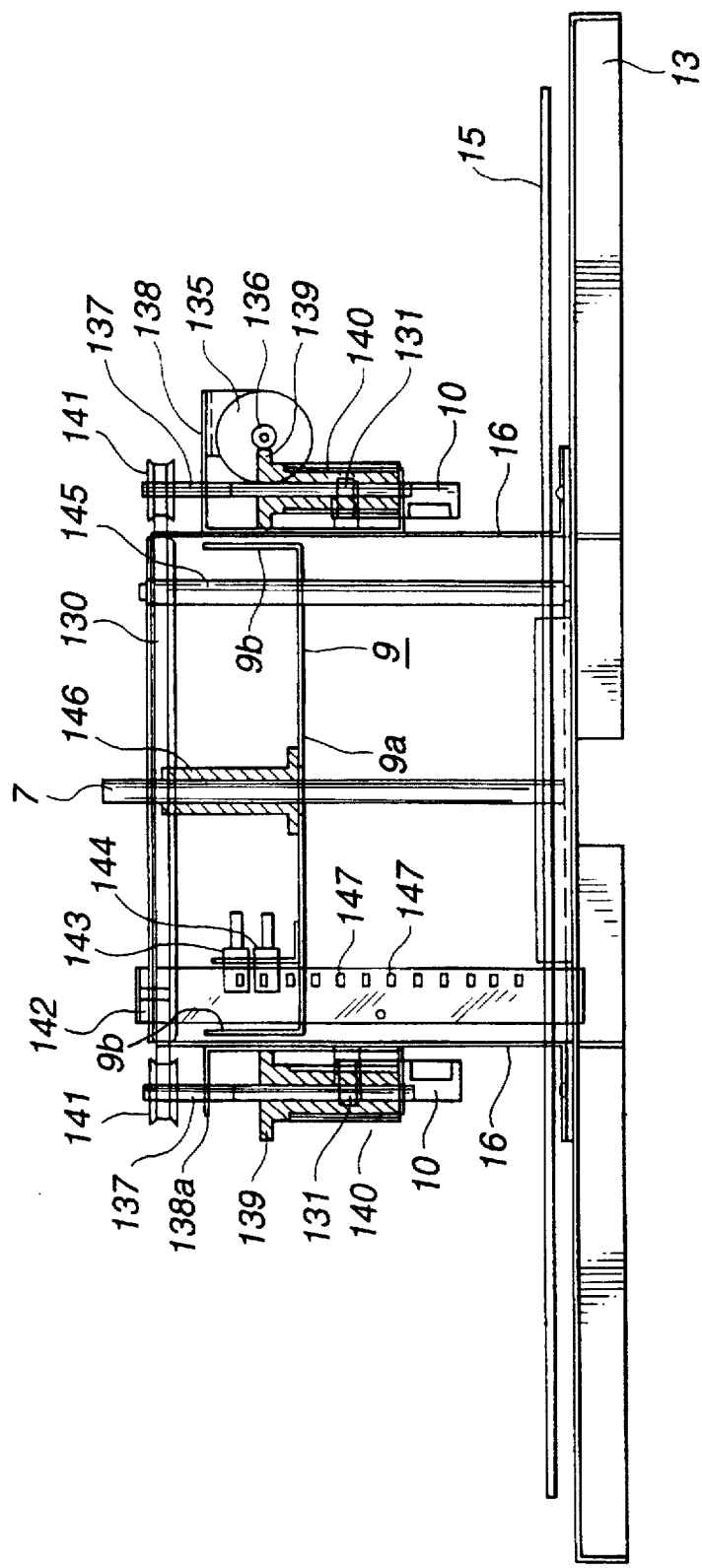
FIG. 49 is a front view showing the lift mechanism, with a portion thereof being broken away.
Figure 50:
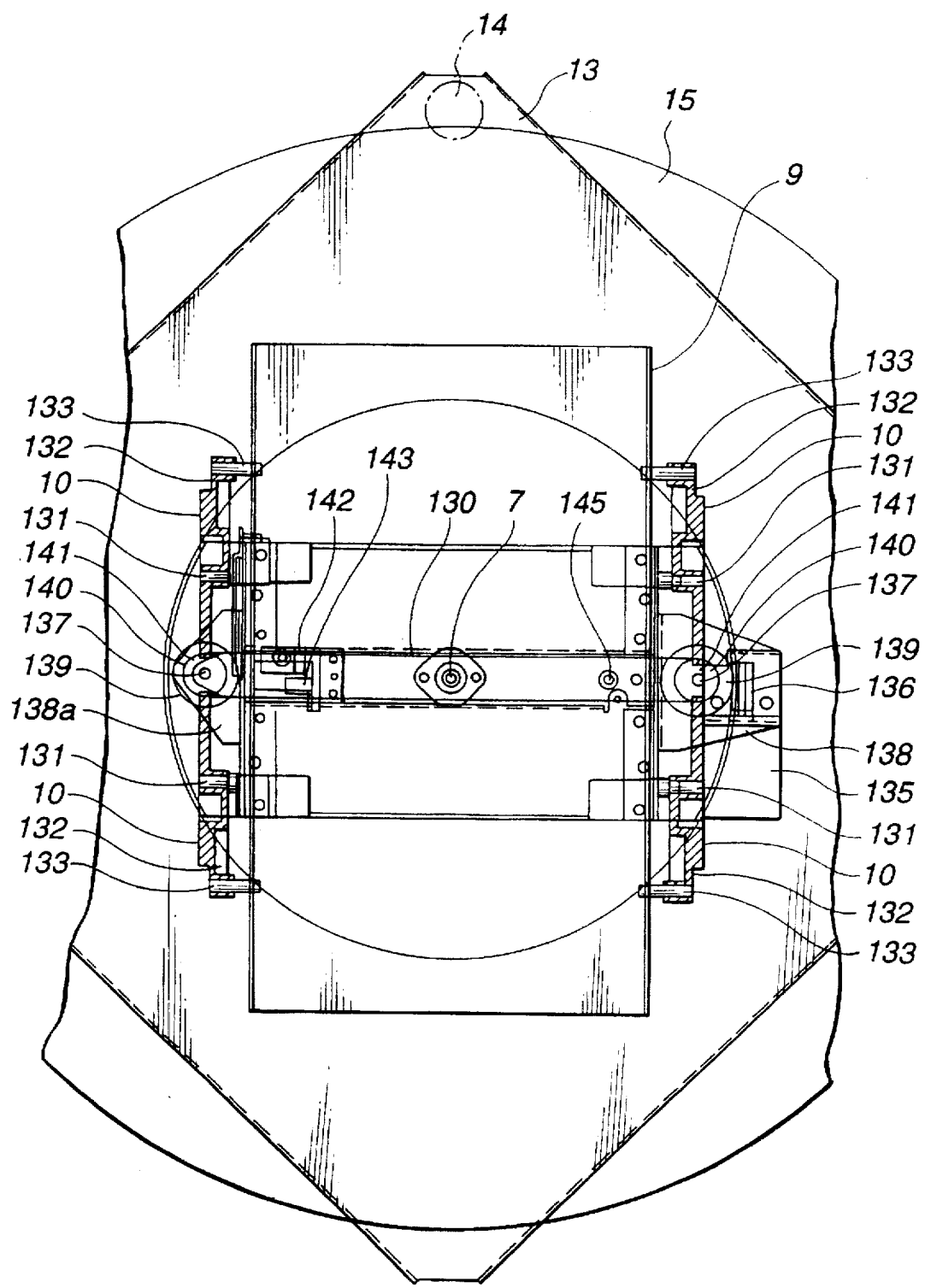
FIG. 50 is a plan view showing the lift mechanism, with a portion thereof being broken away.
Figure 51:
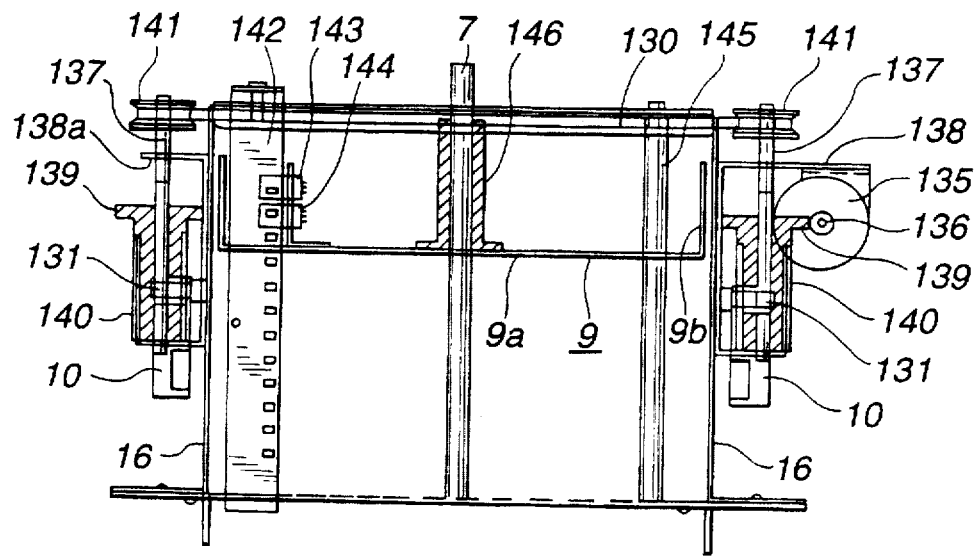
FIG. 51 is a schematic front view of the lift mechanism, with a portion thereof being broken away.
Figure 52:
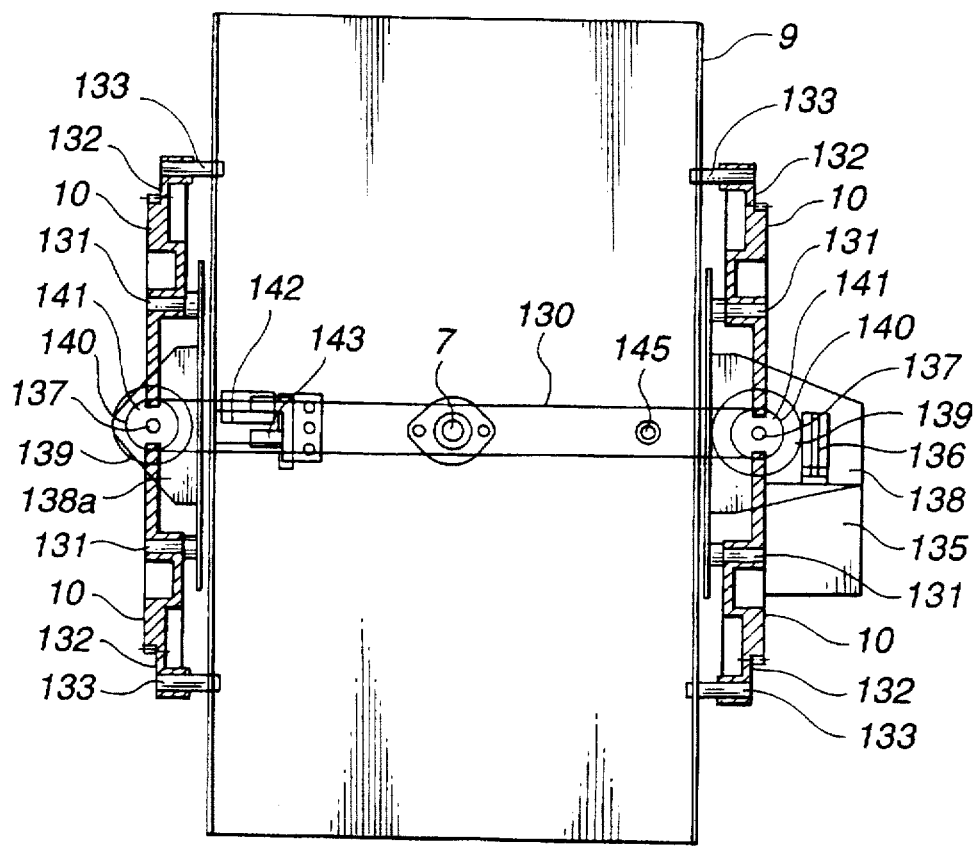
FIG. 52 is a schematic plan view of the lift mechanism, with a portion thereof being broken away.

The lift mechanism for moving the disc driving units 8, 8 along the vertical direction, which corresponds to the stacking direction of the disc cartridges 320 or 321 housed within the housing section 39, is now explained. The lift mechanism has a lift block 9 constituting a portion of the disc driving units 8, 8, as shown in FIGS. 48 to 53. The lift block 9 has a bottom plate 9a and a pair of side plates 9b, 9b formed upright on opposite sides of the bottom plate 9a, as shown in FIG. 49. The lift block is supported by the support pillar 7 via a tubular bearing 146 mounted at the center of the bottom plate 9a so that the lift block is moved vertically by being guided by the support pillar 7. The support pillar 7 not only plays the part of a support for the lift block but also plays the part of a guide for guiding the lift movement of the lift block 9.

The disc driving units 8, 8 are arranged on the lift block 9 with the pillar 7 in-between. The disc driving units 8, 8 are arranged on the bottom plate 9a of the lift block 9 so that the disc entry/exit opening sides thereof face the outer sides opposite to the sides facing the pillar 7.

The lift block 9 is arranged so that opposite sidewall sections 9b, 9b thereof run parallel to a pair of support plates 16, 16. The lift block 9 is supported by a lift guide shaft 145 set upright on the main chassis 13 parallel to the pillar 7 being introduced into a through-hole formed in the bottom plate 9a, as shown in FIGS. 48 and 49. Thus the lift block is prohibited from rotation about its own axis. The upper ends of the pillar 7 and the lift guide shaft 145 are supported by a connecting plate 16a mounted on the upper ends of the support plates 16, 16.

A driving motor 135 for lifting the lift block 9 along the pillar 7 is mounted via a motor attachment plate 138 mounted on the support plate 16 so that its driving shaft is parallel to the main chassis 13. A worm gear 136 for transmitting the driving force is mounted on a driving shaft of the driving motor 135. The worm gear 136 meshes with a worm wheel 139 supported for rotation on a motor attachment plate 138 via a support shaft 137. The support shaft 137 supporting the worm wheel 139 carries a worm gear 140 arranged below the worm wheel 139. The worm gear 140 has two strings of gears.

The worm gear 140 meshes with a pair of worm wheels 10, 10 rotatably mounted on the support plate 16 via support shafts 131, 131. These worm wheels 10, 10 are arranged on both sides of the worm gear 140. Thus the worm wheels 10, 10 are positioned with the major surfaces thereof lying on the same plane.

On the worm wheels 10, 10 are mounted engagement pins 133, 133 as paired engagement members via identically shaped connecting plates 132, 132. These engagement pins 133, 133 are protuberantly formed towards the lift block 9, that is towards the pillar 7, so that the engagement pins run parallel to each other. The engagement pins 133, 133 are at the same height by adjusting the meshing position of the worm wheels 10, 10 with the worm gear 140. Since the worm gear 140 has two strings of gears, the position of the crests and valleys of the two gear strings are coincident on both sides of the central axis. Thus the engagement pins 133, 133 engaged with the two gear strings of the worm gear 140 may be coincident as to the axial engagement height of the worm gear 140.

The engagement pins 133, 133 are engaged in a pair of engagement grooves 134, 134 formed in one of the side plates 9b of the lift block 9. These engagement grooves 134, 134 are symmetrically formed in the left-and-right direction as elongated holes each having the horizontal direction perpendicular to the lift direction of the lift block 9 as the long diameter, with the support pillar 7 as the center.

A spur gear 141 is mounted on the upper end of a support shaft 137 carrying the worm wheel 139. A gear attachment plate 138a having the same configuration as the motor attachment plate 138 mounted on the support plate 16 is mounted on the opposite side support plate 10. The gear attachment plate 138a has the spur gear 141 and the rotatable support shaft 137 carrying the worm gear 140 at its upper end and at its lower end, respectively. The worm gear 140 has two gear strings which are the same as those provided on the worm gear mounted on the motor attachment plate 138.

Similarly to the support plate 16, the opposite support plate 16 carries a pair of rotatable worm wheels 10, 10 via support shafts 131. These worm wheels are engaged with the worm gear 140 from both sides. On the worm wheels 10, 10 are mounted a pair of engagement pins 133, 133 as engagement members via the identically shaped connecting plates 132, 132. The engagement pins 133, 133 are mounted parallel to each other and protuberantly formed towards the lift block 9, that is towards the pillar 7. In addition, the engagement pins 133, 133 are maintained at the same height by adjusting the meshing positions of the worm wheels 10, 10 with the worm gear 140. These engagement pins 133, 133 are engaged in a pair of engagement grooves 134, 134 formed in the opposite side plate 9b of the lift block 9 as elongated openings each having the horizontal direction extending at right angles to the lift direction of the lift block 9 as the long axis.

A timing belt 130 is placed between put gears 141, 141 mounted at the upper ends of supporting shafts 137, 137 mounted in turn on the motor attachment plate 138 and a gear attachment plate 138a respectively mounted on a pair of supporting plates 16, 16. That is, the spur gears 141, 141 are rotated in synchronism with each other at the same speed and in the same direction. The pairs of the engagement pins 133, 133 positioned on both sides of the lift block 9 are maintained at the same axial height along the support pillar 7 by adjusting the rotational position of the spur gears 141, 141.

Figure 53:
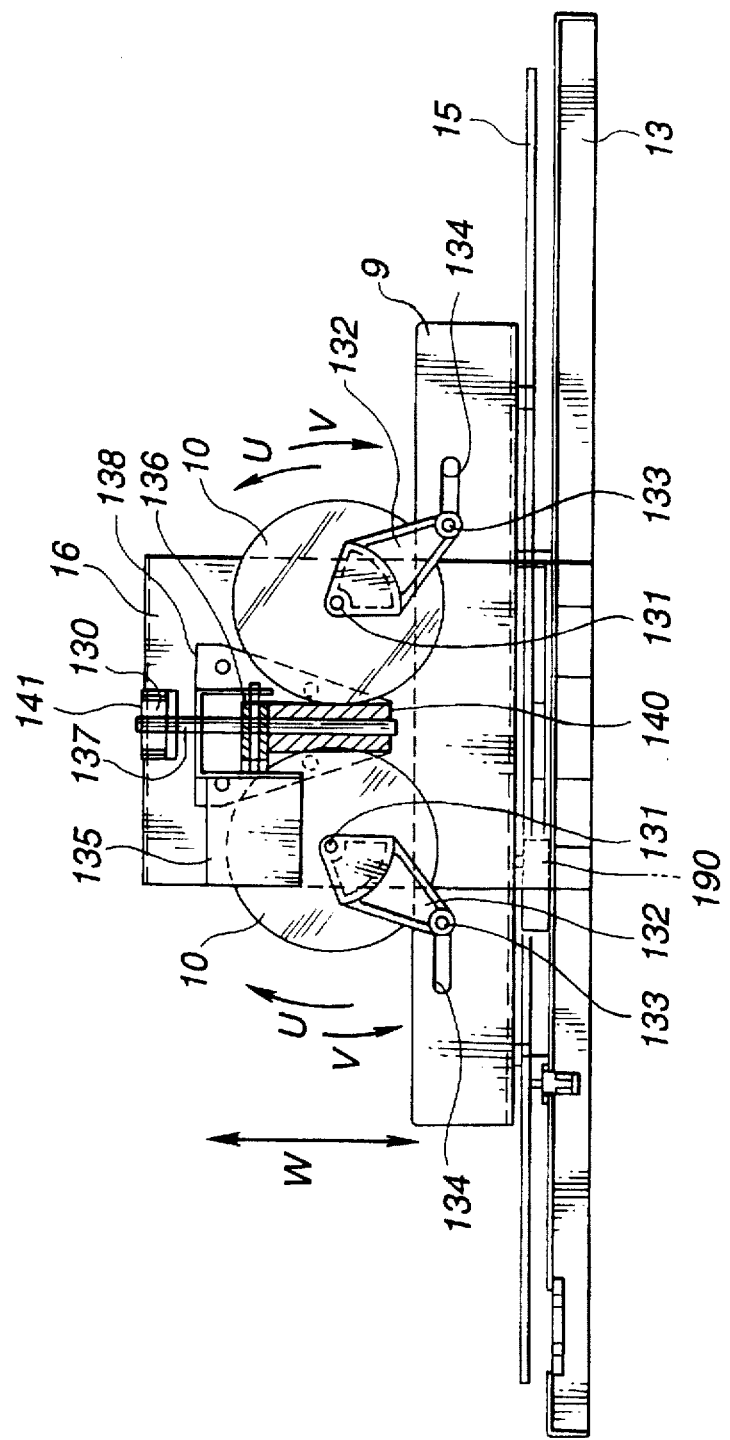
FIG. 53 is a side view showing the lift mechanism, with a portion thereof being broken away.

With the above-described lift mechanism, the worm wheels 10, 10 are rotated in the directions indicated by arrows U and V in FIG. 53 by operation of the driving motor 135 whereby the lift block 9 is lifted along the support pillar 7 in the vertical direction as indicated by arrow W in FIG. 53. Since the engagement pins 133, 133 are engaged at this time in the engagement grooves 134, 134 provided in the lift block 9 at the symmetrical position in the transverse direction with respect to the support pillar 7, the lift block 9 is moved in a translatory movement in the vertical direction.

On the main chassis 13 is arranged a reset switch 190 for detecting that the lift block 9 and the disc driving units 8, 8 supported by the lift block 9 are at the lower most position towards the main chassis 13. The reset switch 190 may be a thrust type switch which is actuated by being thrust by a portion of the lift block 9 when the lift block 9 reaches the lower most position.

Figure 54:
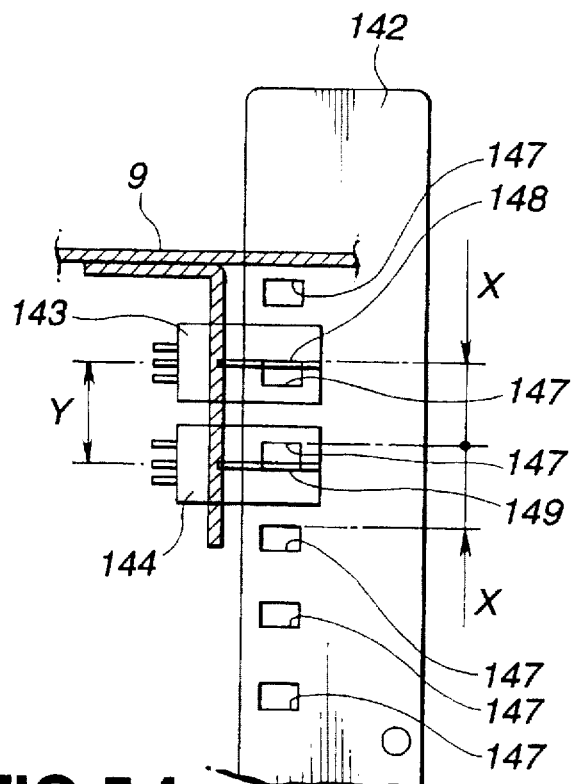
FIG. 54 is an enlarged schematic front view showing a position sensor of the lift mechanism.
Figure 55:
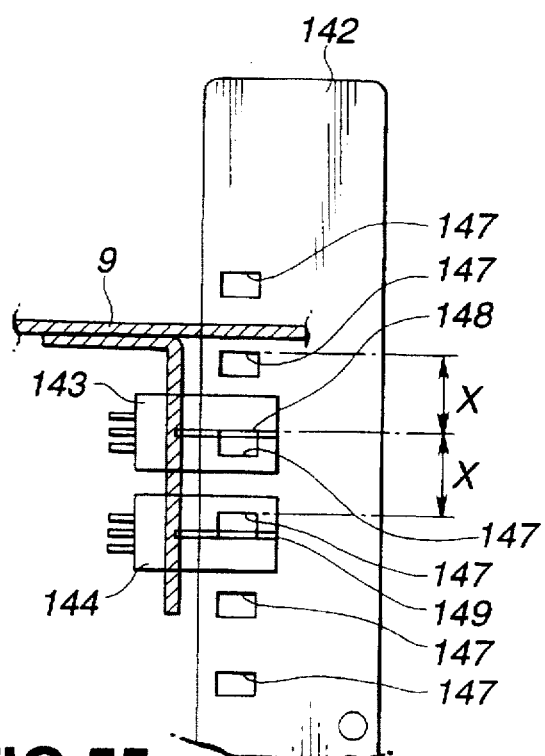
FIG. 55 is an enlarged schematic front view showing the state in which a lift block has been vertically moved by the lift mechanism.

A position detection scale plate 142 is mounted in the vicinity of and in parallel with the support pillar 7. The position detection scale plate 142 has plural detection holes 147 at an equal interval X along the direction of lift movement of the lift block 9 corresponding to the height of the support pillar 7, as shown in FIGS. 54 and 55. On the lift block 99 are mounted first and second photosensors 143, 144 making up a position sensor. Optical sensors, such as photocouplers, each having detection units 148, 149, are employed as the photosensors 143, 144. These optical sensors are mounted in position so that, when the detection unit 148 of the first optical sensor 143 is located at the upper edge of the detection hole 147, the detection unit 149 of the second optical sensor 144 is located slightly above the lower edge of the opposite detection hole 147. That is, the distance between the detection units 148 and 149 along the height indicated by arrow Y in FIG. 54 is selected to be slightly shorter than the distance X between the detection holes 147, 147 plus the height of one of the detection holes 147.

The detection output of the optical sensors 143, 144 is high (H) or low (L) when the detection units 148, 149 are or are not facing the detection holes 147, respectively. These detection outputs of the optical sensors 143, 144 are supplied to a control circuit.

Figure 56:
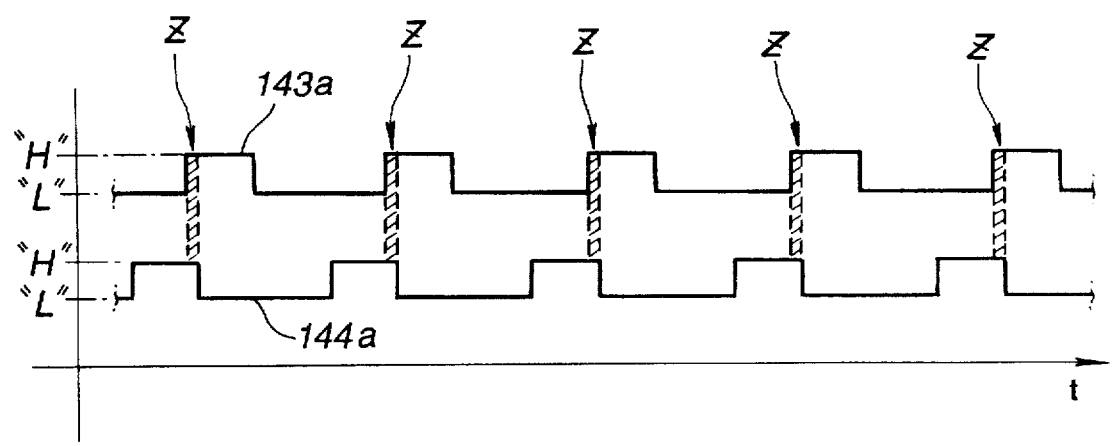
FIG. 56 is a waveform diagram showing a detection signal detected by the position sensor when the lift block is vertically moved by the lift mechanism.

If the detect outputs of the optical sensors 143, 144 are denoted 143a and 144a, respectively, the detection outputs 143a and 144a when the lift block 9 is moved along the support pillar 7 become H level and low level outputs, which are periodically issued with movement of the lift block 9, as shown in FIG. 56. At this time, the detection outputs of the optical sensors 143, 144 are dephased relative to each other, as shown in FIG. 56, such that the detection outputs of the optical sensors 143, 144 simultaneously become H level only during the short time interval Z in FIG. 56 when the detection units 148, 149 of the optical sensors 143, 144 face the detection holes 147 simultaneously. Consequently, the distance of movement of the lift block 9 may be detected by counting the events of the detection outputs of the optical sensors 143 and 144 becoming H level simultaneously. That is, by detecting the distance by which the lift block 9 is moved upwards after actuation of the reset switch 190 by movement of the lift block 9 having been moved to the lowermost position towards the main chassis 13, it becomes possible to detect the position of the lift block 9 and that of the disc driving units 8, 8 moved in unison therewith. On the other hand, by halting the lift block 9 at the position for which the detection outputs of the optical sensors 143, 144 become H level simultaneously, the lift block 9 can be halted at equally spaced apart plural stop positions along the height of the support pillar 7.

After the detection operation by the photosensors 143, 144 is reset by the reset switch 190, the control circuit supplied with the detection outputs of the photosensors 143, 144 counts the events of the detection outputs of the photosensors 143, 144 going H simultaneously for detecting the distance traversed by the lift block 9 for detecting the position of the disc driving units 8, 8 moved along with the lift block 9.

By vertically moving the disc driving units 8, 8 by the lift mechanism along the height of the support pillar 7, it becomes possible for the disc driving units 8, 8 to select one of the disc cartridges 320 or 321 accommodated within the magazines for the disc cartridges 11, 11 facing the disc driving units 8, 8. That is, by correctly halting the lift block 9 at one of plural pre-set equally spaced apart positions, the disc driving units 8, 8 may be correctly halted at the height position in which the engagement levers 100, 100 are in registration with the respective engagement recesses 312, 312 of the disc cartridges 320, 321 accommodated within the magazines for the disc cartridges 11, 11.

The reset switch 190 may be arranged at the uppermost position of the position detection scale plate 142 so that, on detection that the lift block 9 and the disc driving units 8, 8 reach the upper limit position for the lift mechanism, the detection operation by the optical sensors 143, 144 is reset.

With the disc recording and/or reproducing apparatus having the disc exchange function, according to the present embodiment, the information sills, such as music signalman be recorded on or reproduced from plural discs by accommodating a suitable number of the disc cartridges 320 or 321 in the toroidally arranged plural magazines 11 on the turntable 15, selecting one or two of these disc cartridges 320 or 321 and by sequentially loading the selected disc cartridges on the disc driving units 8, 8.

The operation of selecting the disc cartridges 320 or 321 accommodated in the magazines 11 and recording and/or reproducing information signal, such as music signals, on or from the discs accommodated within these selected disc cartridges 320 or 321, is hereinafter explained.

The recording/reproducing operation by the disc recording and/or reproducing apparatus is initiated by supplying an operation control signal to the control circuit by an operating unit, not shown. First, the desired one of the disc cartridges 320 or 321 is selected from among a number of disc cartridges 320 or 321 accommodated within the magazines for the disc cartridges 11 arranged toroidally on the turntable 15 by designating an M address which is an address number of from 1 to 8 for identifying one of the magazines 11 on the turntable 15, and by designating a D address which is an address number of from 1 to 10 for identifying the disc cartridges 320 or 321 in one of the magazines for disc cartridges 11.

With the disc recording and/or reproducing apparatus of the embodiment illustrated, the turntable 15 is rotated by driving the driving motor 18 adapted for rotationally driving the turntable 15 in accordance with the M address designating one of the plural magazines 11 on the turntable, while the disc driving units 8, 8 are lifted by driving the lift driving motor 135 by lifting the disc driving units 8, 8 in accordance with the D address designating one of the disc cartridges 320 or 321 accommodated within the designated magazine 11. The driving control of the driving motor 18 for the turntable 15 and the driving motor 135 for moving the lift block 9 may also be effected simultaneously. When the turntable 15 and the respective disc driving units 8, 8 are moved to the positions designated by the M address and the D address, the disc driving units 8, 8 are faced by the selected disc cartridge 320 or 321. At the respective disc driving units 8, 8, the movable blocks 73, 73 are spaced apart at this time from the housing section 39 of the magazine 11, while the engagement pins 110, 110 are engaged with the second engagement grooves 78, 78.

If, after the selection of the disc cartridge 320 or 321 has come to an end, the driving operation by the driving motor 80 for cartridge transfer is started, and the movable members 73, 73 are moved to the foremost position close to the housing section 39 of the magazine 11, the engagement levers 100, 100 are engaged with the engagement recesses 312, 312 of the disc cartridge 320 or 321 housed within the housing section 39. If the driving motor 80 for transfer of the disc cartridge is rotated in the positive direction, the disc cartridge 320 or 321, engaged with the engagement levers 100, 100, is transferred into the inside of one of the disc driving unit 8 and loaded on the cartridge loading unit on the attachment plate for the recording/reproducing unit 59.

The M address for designating the magazine 11 on the turntable 15 and the D address for designating the disc cartridge 320 or 321 accommodated within each magazine 11 may be individually designated for each of the disc driving units 8, 8. After the loading of the disc cartridge 320 or 321 on one of the disc driving units 8 has come to a close, the disc cartridge 320 or 321 is selected and loaded on the other disc driving unit 8.

After the disc cartridge 320 or 321 is loaded on the cartridge loading unit on the attachment substrate for the recording/reproducing unit 59 of each disc driving unit 8, 8, the information signals may be recorded on or reproduced from the disc accommodated in the disc cartridge. On the other hand, the disc cartridge 320 or 321 may be expelled, selected or loaded for one of the disc driving unit 8 while the information signals are being recorded on or reproduced from the other disc driving unit 8.

The disc cartridge 320 or 321 loaded on the disc driving units 8, 8 may be restored to the original position in the original magazine 11 in accordance with the designated M address and the designated address. That is, after the rotational position of the turntable 15 and the height position of the disc driving units 8, 8 have been restored in accordance with the M address and the D address to the original positions corresponding to loading of the disc cartridge 320 or 321, the driving motor 80 for the disc cartridge transfer is rotationally driven in the opposite direction to that for loading for restoring the loaded disc cartridge 320 or 321 to the original position within the magazine 11. The solenoid plunger 94 is driven at this time for disengaging the engagement levers 100, 100 from the engagement recesses 312, 312 in the disc cartridge 320 or 321, after which the movable blocks 73, 73 are moved towards rear away from the housing section 39. The engagement recesses 312 of the disc cartridge 320 or 321, restored into the magazine for the disc cartridge 11, are engaged by the engagement members 45 provided in the housing section 39.

With the disc driving and/or reproducing apparatus, it is possible to arrange the disc driving unit 8 on the turntable 15 and to provide the magazines for the disc cartridges 11 on the lift block 9 arranged on the main chassis 13. The disc driving unit 8 is rotated by the riving gear 26 via the ring gear 28, and is selectively faced by one of the disc cartridges 320 or 321 housed within the magazine 11 when the engagement lug 27 of the driving gear 26 is engaged with one of the engagement recesses 29a to 29h of the ring gear 28.

The lift mechanism may also be employed as a lift for lifting the magazines for the disc cartridges 11.

What is claimed is:

1. A disc magazine comprising:
    a casing substantially in the form of a parallelepiped for housing a plurality of disc cartridges so that the major surfaces thereof run parallel to one another, said casing having apertures on opposite lateral sides thereof for taking out and housing a plurality of the disc cartridges,
    holding means for engaging with recesses in the disc cartridges housed within said casing via one of the apertures in said casing for holding said disc cartridges in said casing, and
    stop means in the opposite aperture in the casing for prohibiting the disc cartridges from retreating from the casing via said opposite aperture.

2. The disc magazine as claimed in claim 1 wherein said holding means comprises a plurality of engagement members engaged with the recesses in the disc cartridges housed within said casing and a plurality of biasing members for biasing the engagement members in a direction of being engaged with the recesses in the disc cartridges.

3. The disc magazine as claimed in claim 2 wherein said stop means comprises a stop member movable between a position of being protruded at said opposite aperture and a position of being receded from said opposite aperture.

4. The disc magazine as claimed in claim 1 wherein:
    said holding means comprises a plurality of engagement members engaged with the recesses in the disc cartridges housed within said casing and a plurality of biasing members for biasing the engagement members in a direction of being engaged with the recesses in the disc cartridges; and
    said stop means comprises a stop member movable between a position of being protruded at said opposite aperture and a position of being receded from said opposite aperture.

5. The disc magazine as claimed in claim 1 wherein:
    said holding means comprises a plurality of engagement members movable between a position of intruding or receding a plurality of engagement portions into or out of the casing;

wherein the plurality of engagement members are engaged with the recesses in the disc cartridges housed within said casing and a plurality of biasing members for biasing the engagement members in a direction of being engaged with the recesses in the disc cartridges; and said stop means comprises a stop member movable between a position of being protruded at said opposite aperture and a position of being receded from said opposite aperture.

* * * * *